(12) United States Patent
Gillis

(10) Patent No.: US 6,523,026 B1
(45) Date of Patent: Feb. 18, 2003

(54) METHOD FOR RETRIEVING SEMANTICALLY DISTANT ANALOGIES

(75) Inventor: Herbert R. Gillis, West Deptford, NJ (US)

(73) Assignee: Huntsman International LLC, Salt Lake City, UT (US)

( * ) Notice: Subject to any disclaimer, the term of this patent is extended or adjusted under 35 U.S.C. 154(b) by 231 days.

(21) Appl. No.: 09/677,686

(22) Filed: Oct. 2, 2000

Related U.S. Application Data

(63) Continuation of application No. PCT/US00/03120, filed on Feb. 7, 2000.
(60) Provisional application No. 60/134,592, filed on May 17, 1999, and provisional application No. 60/119,134, filed on Feb. 8, 1999.

(51) Int. Cl.[7] ........................... G06F 17/30; G06F 15/00
(52) U.S. Cl. ................................................ 707/3; 712/2
(58) Field of Search .................. 707/1–8, 100–102; 712/2, 7; 345/708

(56) References Cited

U.S. PATENT DOCUMENTS 5,995,955 A * 11/1999 Oatman et al. ............... 706/45
6,389,405 B1 * 5/2002 Oatman et al. ............... 706/45

\* cited by examiner

*Primary Examiner*—Alford W. Kindred
(74) *Attorney, Agent, or Firm*—Nicole Peffer

(57) ABSTRACT

A process of identifying terms or sets of terms in target domains having functional relationships (roles) analogous to terms (contained in the query) selected from a source domain whereby queryrelevant but semantically distant (novel) analogies may be retrieved, corresponding to any user defined query. The process is capable of discovering deep functional analogies between terms in source and target domains, even where there is a misleading superficial matching of terms (i.e. same terms, with different meanings) between the query and the target domains. The process comprises the automated generation of abstract representations of source domain content, and application of the abstract representations of content to the efficient discovery of analogous objects in one or more semantically distant target domains. Said abstract representations of terms are preferably vectors in a high dimensionality space, encapsulating characteristic occurrence patterns of terms in the source domain.

39 Claims, 10 Drawing Sheets

$$E(i,j) = N(i,j) - T(j) \quad (1)$$

$$C(j) = \sum_{i}^{ws} (\|E(i,j)\| - \hat{\alpha}(i,j)) E(i,j) \quad (2)$$

$$\alpha(i,j) = 1 - I(i)I(j) \quad (3)$$

$$I(j) = B + (1-B)[1 - (\log(1/ND(j)))/(\log(1/TND))] \quad (4)$$

$$I(i) = B + (1-B)[1 - (\log(1/ND(i)))/(\log(1/TND))] \quad (5)$$

$$T(j)\{new\} = T(j)\{old\} + (\gamma/F(j)) \sum_{i=1}^{F(j)} C(j) - M \quad (6)$$

FIG.-2C

METHOD FOR RETRIEVING SEMANTICALLY DISTANT ANALOGIES

This Application is a continuation of PCT/US00/03120 filed Feb. 7, 2000 and claims benefit of Prov. No. 60/134,592 filed May 17, 1999, and claims benefit of Prov. No. 60/119,134 filed Feb. 8, 1999.

FIELD OF THE INVENTION

This invention relates to a computer implemented innovation process. More particularly, it relates to the automated retrieval of analogies useful in constructing innovative solutions to problems, and in identifying novel potential applications for existing products. The method of the invention identifies analogous structures, situations and relationships in semantically distant knowledge domains by creating abstract representations of content (vectors) which are characteristic of a given domain of knowledge (source domain) and searching for similar representations in semantically distant (target) domains. The process of this invention does not depend on symbol (i.e., key word) matching.

BACKGROUND

The ability to recognize novel but relevant analogies from other knowledge domains as clues to potential solutions of problems in a given domain has been a valuable skill in industry. It has long been regarded as a central feature of innovative thinking. Likewise, the ability to recognize new and practical applications for existing products has long been regarded as a valuable talent in marketing. People with such skills are expensive to produce, and can generally operate in a limited range of knowledge domains (i.e., those specialist domains in which they were trained, or had experience). Another serious limitation is in the ability to process large volumes of information, in order to identify relevant analogous situations which have not previously been recognized. Raw information must be analyzed in considerable detail, but there are limits to how much information human beings can process effectively. To make matters worse, most of the raw information used by people in technical and marketing fields is in the form of text. Reading of text is an especially slow and tedious means for acquiring new information. This has resulted in the problem of information overload.

Computer implemented processes for information storage, transmission, and retrieval have accelerated the pace of technological change and increased the intensity of competition in business. Such processes have made information of all kinds much more widely available, and greatly increased the speed at which information can be transmitted. However, most present day methods for retrieving electronically stored information rely on matching of symbols (such as key words) and, to this extent, such systems have made the problem of information overload worse.

Different knowledge domains use different symbols, and even those symbols which are common to most knowledge domains (such as the commonly used words in human languages—which account for most of the words in specialist text) can have different meanings in different areas of knowledge. Variations in the meanings of common symbols (such as most words in human languages) from one area of knowledge to another may be radical, or quite subtle. To make matters worse, these relationships are dynamic. As such, it is extremely difficult to pin down, at any particular time, what a given symbol means across a range of situations. Such domain specific variations in meaning, combined with a proliferation of new specialist terms, has forced people to specialize more and more narrowly over time. This increasing specialization has, in turn, accelerated the speciation of new meanings for existing symbols (i.e., words), and new specialist terms.

The trade-off between precision and recall in conventional "key-word" search technology is well known. These types of systems only retrieve records or documents containing exact symbol or word matches, but take no account of context. Unless one searches very narrowly (i.e., for a few domain specific terms, or other specific groups of words in close proximity), one obtains mostly non-relevant material. Because ideas can be expressed in many different ways using different words, a narrow keyword search can miss most of the relevant records. Searching more broadly may require domain specific knowledge on the part of the user (i.e., as to the relevant synonyms for words used in the query, and different ways of expressing related ideas in different domains). Broader searching, however, brings in additional irrelevant material. Searching broadly in several different semantically variant knowledge domains can easily bring in so much irrelevant material that the user is overloaded, and the information retrieved is therefore useless. Another significant disadvantage of systems which retrieve information by symbol matching is that they tend to retrieve only information that is already known. Unless the user is truly an expert in a range of different areas of knowledge, it is almost impossible to use this kind of technology to make connections that are both relevant and novel (i.e. innovative connections). For example, if one searches a large technical database in order to find applications of polyurethanes in telecommunications, one may enter the Boolean expression "polyurethanes AND telecommunications" as a rather broad search strategy. This will retrieve a handful of very well known applications of polyurethanes in the telecommunications field, plus a larger number of irrelevant records (where the two terms co-occur, but in unrelated ways). One might also use index based search techniques such as subject codes, or art groups, but these tend to focus the results even more tightly on the known applications. It is not possible, by these methods, to find records which although highly relevant do not contain both of the terms in the search.

The domains of telecommunications and polyurethanes are semantically distant, although there exists a small percentage of records in the telecommunications domain that do mention polyurethanes (or widely recognized synonyms thereof). It would be a simple matter to edit out these references to known applications (i.e., by employing the Boolean NOT operator, to create a limited set which excludes records in the telecommunications domain that mention polyurethanes). This would result in a very large and, from the viewpoint of a polyurethanes specialist, intractable mass of records dealing with telecommunications. A polyurethanes specialist who wishes to find novel and relevant applications in the telecommunications field would be faced with the choice of:

1) Becoming an expert in telecommunications,
2) Acquiring the services of a telecommunications domain expert (and bringing them up to speed on polyurethanes technology), or
3) Reading (or scanning) thousands of documents on telecommunications, with the hope of finding something relevant.

In practice, the polyurethanes domain expert would be able to take some shortcuts. He could talk to other people in the polyurethanes field who have had more experience in the telecommunications field (i.e., customers of the known applications). This is a variation of Option-2, above. The success of such an approach assumes the existence of contacts who are willing to share their knowledge. The polyurethanes expert could also limit his search of the extensive telecommunications literature by focusing on certain broad categories of applications (i.e. "foams") which are well known for polyurethanes. This is a variation of Option-3 above, which reduces (but does not eliminate) the chances of finding truly novel and relevant applications. This latter approach may still result in an intractably large body of records which must be read.

The above example is an illustration of the difficulties in finding semantically distant analogies which are both useful and novel, as a means for solving problems and developing new end use applications. In its present form, the process of innovation by analogy is highly dependent on chance associations (i.e., contacts between the right people with relevant expertise; coming upon relevant records "by accident"; seeing a "related" material, or procedure, or apparatus, in a different area of technology, etc.). These chance associations are difficult to control. Hence, innovation is difficult to control. Even the most ardent and well supported efforts at innovative problem solving are, at best, extremely high risk propositions. Although the value of innovation, and cross-domain ("interdisciplinary") collaboration is well known, recent trends have been towards sharper focus on narrower knowledge domains (i.e., focusing on "core competencies", and extremely short time horizons). Innovation is fundamentally a process of making and filtering connections.

There has been a proliferation of advanced systems for text retrieval during the 1990's. In spite of this trend, most of the larger commercial sources of on-line (electronic) text based information will only support the conventional "key-word" based retrieval technology. Given that most of the available content is only available in this form, advanced systems for text-processing must often be used to post-process intermediate sets generated from broad key word searches. These intermediate sets may be quite large, and their creation provides a convenient (albeit approximate) means for differentiating between different knowledge domains. Any general method for extraction of semantically distant analogies (from textual data) would need to be capable of operating in this two-step mode, if it is to be implemented in the foreseeable future.

Advanced text search tools are particularly helpful in post processing large intermediate results sets (i.e., by reducing the amount of material which must be read by the user). Likewise, the limited sets can sometimes help to further focus the output of an advanced search engine.

Unfortunately, most of the currently available "advanced" text search tools are limited in their ability to handle highly specialized subject matter (i.e., technical material). Most of the current systems contain fixed machine readable thesauri, which they use in order to identify words of related meaning (i.e., synonyms) to expand terms in user queries. Although these fixed, manually constructed thesauri sometimes contain different meanings (i.e., different definitions, or examples of differing usage) for the same words (which meanings can be selected by users, in constructing searches), the range of available meanings is predetermined and quite limited. Commercial systems of this type rarely contain specialized technical terms such as "polyisocyanurate", or "polyisocyanate", or "magnetohydrodynamic", or "elastomer". Thesaurus based search engines can be expanded, however, this requires considerable manual effort and often the services of experts from all the domains in which the system is expected to perform. Moreover, the user may be forced to make an inconveniently large number of word-meaning choices in constructing searches with such an "expanded" system. The user may not, however, always have the knowledge to choose correctly, since word meanings vary considerably between different specialist knowledge domains. Text search tools of this class are particularly well suited to non-specialist text domains such as databases of newspaper articles. Existing search tools give some consideration to word context, a major advance over simple "key symbol" (key word) matching.

A significant disadvantage of fixed thesaurus-based text search systems is their inherent bias (as to what words it considers to be "closely related"). As an example, in a popular search engine of this type the word "spider" is shown to be synonymous with the word "arachnid" although, strictly speaking, this is a generic relationship. The word "web", however, which most people immediately associate with the word "spider", is not listed as related. Most commercial thesaurus-based text search tools, although a significant advance over conventional "key word" based retrieval technology, operate on the principal of symbol matching.

Another class of advanced computer based text retrieval systems use abstract mathematical representations of symbols in text (symbols such as words, word stems, and phrases) in order to capture and quantitatively compare the context specific "meaning" of said symbols. Systems of this type reduce the individual symbols to vectors in a high dimensional space. The relationships between the vectors in this space ("semantic space") can capture information about the co-occurrence patterns between symbols that convey what those symbols mean in a given context (latent semantics). Once this co-occurrence information has been captured, it becomes possible to compare the "meaning" of individual symbols and/or higher order structures (such as groups of words or groups of word stems, sentences, paragraphs, whole documents, and even large bodies of documents) quantitatively, by using the known operations of vector mathematics. These operations include, for example, the summing and normalization of vectors (to represent higher order structures in text), the calculation of dot products between vectors, or the calculation of angles between vectors. Words and higher order structures in text are in effect replaced by a geometric representation, in which individual symbols and higher order structures become points in the high dimensional semantic space. The determination of the relative proximity of "meaning" of different terms, documents, etc., is thereby reduced to measuring the proximity of the corresponding points in this space. Information retrieval becomes a mathematical operation, which does not depend on matching of symbols. Relevant documents can be retrieved from a database, even if they do not contain any of the "key words" in the query statement. Vector based information retrieval systems can be used not only for comparing the similarity of meaning of records (such as pairs of documents), but also provide a convenient means, in principle, for the quantitative determination of the semantic distance between different domains of knowledge (i.e., wherein each of said domains is represented by a domain specific body of records, in a single "semantic space").

A number of different variations of the vector principal are known. Some systems do not depend on any other fixed (manually assembled, manually updated) sets of definitions for symbols (i.e., definitions for words in a body of text).

They require only an example of text (preferably a large example) from which word relationships are automatically extracted, and represented in vector form for use in subsequent information retrieval. The text example, from which word relationships are extracted in these systems, is commonly referred to as a training corpus.

Vector based information retrieval systems also provide convenient quantitative methods for representing "semantic distance" (i.e., between items of text such as different documents, or groups of documents). Vector representation methods are not the only tools in existence for representing the "semantic distance" between records (such as documents), but they have an advantage in that the measure of semantic similarity (or distance) is independent of exactly how the documents (or document segments, or document clusters) are related. There need not be any domain specific word matches between the documents. There need not be any specific "thesaurus mediated" word matches of the type described previously. The process of assessing semantic interrelatedness, or distance is driven by the natural and characteristic relationships between the words in the training corpus. Most of the words (and/or word stems) in the training corpus will be interrelated in some way, usually more than one way. Hence, there are no arbitrary boundaries to word relationships, such as those imposed by a thesaurus. If two words co-occur frequently in the training corpus [such as "spider" and "web" for example], then they will show up as related (having a similarity of meaning which is specific to the training corpus) in the outcomes of searches. Consequently, it would be possible to enter the term "web" in a search query and retrieve documents (or relevant segments thereof) dealing with spiders and arachnids—even if the term "web" does not appear at all in those specific records.

The relationships between symbols, in a vector based retrieval system, can be much more comprehensive because even the most arcane and specialized terms in the training corpus can be represented, automatically, in the high dimensionality vector space. The range of possible relationships is unrestricted (since most terms in the training corpus are interrelated), and natural (i.e., specific to the training corpus, or to a particular domain of knowledge which the Corpus may represent). The possibilities for making connections in such an environment are extremely rich. Moreover, the paths through this network of connections are prioritized (some more likely to be traversed than others) because domain specific (or, at least, corpus specific) "rules" are encoded, automatically, in the network of word relationships captured from the training corpus.

Several different variations of the context vector principle are known. One variation is described in U.S. Pat. No. 5,619,709, and the related case, U.S. Pat. No. 5,794,178. These two references are incorporated herein by reference, in their entirety. In the preferred embodiments of the inventions described in these two references, symbols (i.e., words or word stems) from a large and domain specific or user specific example of text (a "training corpus") are automatically reduced to vectors, said vectors representing the relationships between said symbols, which relationships are characteristic of the training corpus. Thereby, if the training corpus is a sufficiently large representative body of text from a given domain of knowledge, the relationships between the symbols in this training corpus will constitute a reliable representation of the symbol (word or word stem) relationships characteristic of that particular knowledge domain (i.e., polyurethanes). This representation will be a "snapshot" in time, but readily capable of being updated by repeating the training process at a later time, with an updated training corpus. In the preferred embodiments according to these references, the training (vector setting, or "learning") process is conducted using a neural network algorithm. In this vector setting process, an initial set of vectors are assigned randomly to the symbols in the training corpus. The vector values are then optimized by an iterative process, described in detail in the references, whereby the final values of the vectors come to accurately represent the relationships between the symbols in the training corpus. In the event that the training corpus is a body of text then the "symbols" are the words and/or word stems within that body of text. In the preferred embodiments described in the above cited references, the number of dimensions in the vector space employed is smaller than the number of words (and/or word stems) in the training corpus. This has a number of practical advantages, including the most efficient utilization of the computational resources of the computer hardware on which the system is running. Typically, a vector space of between about 200 and about 1000 dimensions is used.

Vectors are fundamentally numbers, having "components" in each of the dimensions of the vector space used. Reducing the "meaning" of words in a body of text to vectors in a space of limited (but sufficiently large) number of dimensions has a number of unique advantages. Among these, the relative similarity of word meanings can be represented quantitatively in Context Vector Technology, CVT, by the degree to which their vectors overlap [i.e., the "dot product" of the individual word vectors]. If the words have similar meaning within the context of the training corpus, the dot product of their vectors will be relatively high. If they have no similarity, the dot product of their vectors will be relatively low (zero, or very close to zero). Subtle gradations of meaning between different words in the training corpus and, hence, the knowledge domain it represents can thereby be captured. The "meaning" of words in the training corpus is encapsulated in the way they associate (i.e., the relationships between the words). If the training corpus for a given knowledge domain is sufficiently large, then the pattern of word relationships will be stable (i.e., will not vary significantly with sample size). This stable pattern may be captured quantitatively in the vectorization process as an accurate representation of the knowledge domain from which the training corpus was assembled. Context vector technology focuses on reducing the relationships between symbols (such as words) to mathematics (geometry). It is fundamentally different from other methods of text retrieval which are based, directly or indirectly, on symbol matching. Given that vectors can be added, it is possible to reduce the meaning of groups of words to vectors which represent the "meaning" of sentences, paragraphs, documents, groups of documents, etc. As with the individual words (and/or word stems), it is possible to quantitatively compare the domain specific "meaning" of such word groupings by calculating the dot products of their corresponding vectors. Likewise, queries on databases of documents can be reduced to vectors and said "query vectors" compared to the vectors of the individual documents (and/or document segments) in the database, by computation of vector dot products. The documents [or document segments] that are most similar in "meaning" (i.e., having the highest dot products with the query vector) are retrieved and displayed in ranked order. In addition to simple relevance ranking, the semantic (or "meaning") relationships between documents or document segments can be represented by relative positioning on a two or three dimensional graph (visualization). Documents (or segments) of similar meaning will be clustered together on the graph, whereas those of less similar meaning will be farther apart. The distances between documents, document segments, or even clusters of documents on the space of the visual graph will be a quantitative measure of the degree to which their content is similar. This method of visualization is one good way, although not the only way of visualizing the "semantic distance" (i.e., between individual documents, document clusters, or whole knowledge domains).

Some additional references which are highly relevant to the "context vector" principal for information retrieval include U.S. Pat. No. 5,675,819; U.S. Pat. No. 5,325,298; and U.S. Pat. No. 5,317,507. These patents are incorporated herein fully by reference.

As with CVT, latent semantic indexing, LSI, involves the automatic representation of terms (words, stems, and/or phrases) and documents from a large body of text as vectors in a high dimensional semantic space. The meaning (closeness in the semantic space) of documents and/or terms can be compared by measuring the cosines between the corresponding vectors. Items (terms or documents) which have similar "meaning" will be represented by vectors pointing in similar directions within the high dimensionality semantic space (as measured by the cosine values). As with CVT, LSI uses an automatic process to capture the implicit higher order structure in the association of symbols in a body of text, and uses this associational (co-occurrence) structure to facilitate retrieval without depending on symbol matching. The process and its application is described in greater detail in U.S. Pat. No. 4,839,853 and in J. Am. Soc. Info. Sci., Vol. 41(6), 391–407 (1990), which are incorporated herein by reference.

The LSI process uses the technique of singular value decomposition, SVD, to decompose a large term by document matrix, as obtained from a training corpus, into a set of orthogonal factors (i.e., on the order of 100 factors) which can be used to approximate the original matrix by linear combination. The optimum number of factors (dimensions) is determined empirically (i.e., the value of about 100 is said to give the best retrieval performance). In the LSI process the number of dimensions in the original term by document matrix is substantially reduced, and then approximated by smaller matrices. This is considered critical to the performance of the process. The number of factors (dimensions) must be large enough to model the "real structure" of the data (the implicit higher order semantics, encapsulated within the major associational structures in the matrix) without modeling noise or unimportant details (such as small variations in word usage). The optimum number of dimensions in the semantic space (in which terms and documents are represented by vectors) is therefore a compromise. This compromise value is similar in both LSI and CVT (from 100 to several hundred dimensions).

LSI, like CVT, can in principal be used as a method for representing the "semantic distance" between bodies of documents. Such a representation of distance could, in principal, also be approximated in a two or three dimensional space and displayed to the user as a cluster diagram.

Queries in LSI are handled in a manner similar to that described for CVT. A vector representation of the query is calculated from the symbols (terms) in the query, and the position of this "query vector" is located in the semantic space obtained from the original SVD operation. The query thus becomes a "pseudo document" in the vector space. The query vector is compared to the vectors of other documents in the space, and those documents which are "closest" to the query, in the semantic space, are retrieved. As in CVT, the retrieved documents may then be displayed, in ranked order of relevance, to the user. In LSI the measurement of "closeness", between query and document vectors, is performed by comparing the cosines between vectors. The precise methodology by which queries (and other pseudo documents) are placed in the high dimensionality semantic space, as obtained from the SVD operation on the original term by document matrix (from the training corpus), is described in greater detail in U.S. Pat. No. 4,839,853 and J. Am. Soc. Infor. Sci. Vol. 41(6), 391–407 (1990). In simple terms, the method involves placing the pseudo document at the vector sum of its.corresponding term points.

Vector based retrieval technology is not without its disadvantages. For example, a CVT system which has been trained on non-specialist text, such as a newspaper database (serving as the training corpus), may not perform as well as a "thesaurus" based text retrieval tool when applied to searches on technically specialized bodies of text. Likewise, it is known that LSI has difficulty handling words with multiple, domain specific, meanings (polysemy). This problem becomes especially noticeable if the LSI training corpus (the body of documents used in developing the term by document matrix) covers several disparate knowledge domains. It is due to the fact that individual terms are represented as single points in space. Therefore a word that has multiple meanings in the training corpus will be assigned a position in the semantic space which is a "weighted average" of all its different meanings, and may not be appropriate for any one of them. Similar types of problems may be encountered when using CVT. Use of a domain focused training corpus (in which most terms have stable patterns of association) is one way of minimizing such problems.

Although an extremely large number of different concepts may be encoded (learned) in the high dimensionality vector space, it is logistically impossible to train the system on "every concept". The technical consequences of training such a system on a very large number of diverse knowledge domains simultaneously are not, however, fully understood.

Another disadvantage of vector based retrieval systems is a tendency to over-generalize. This is especially problematic with queries containing multiple terms (words). It can result in some circumstances in the retrieval and inappropriately high relevance ranking of more non-relevant records (documents) than certain thesaurus-based text retrieval system. This tendency for over-generalization may be due to the large number of connections (word associations) open to the system—for each term in the query. For example, a query containing the term "hydrofluorocarbon" may find documents which contain specific examples of hydrofluorocarbons but no matches on the exact term "hydrofluorocarbon". This kind of generalizing can be an extremely valuable feature of vector based retrieval systems. Unfortunately, the same query may retrieve documents on hydrochlorofluorocarbons and chlorofluorcarbons, said documents not mentioning anything about hydrofluorocarbons. This kind of generalization can be quite unwelcome—if the user is interested specifically in hydrofluorcarbons.

The ability to generalize is extremely valuable in innovation. However, it is important to have some way of controlling the extent to which the system "generalizes." This control mechanism must be selective to allowing for more generalization on some query terms than on others. There are known methods for controlling the extent and direction of "generalization" in vector based retrieval systems. These methods involve user feedback, as to the relevance of intermediate search results. The user may, for example, select certain records which most closely approximate his needs and employ these records or selected portions thereof as a subsequent search query (a "more like" query). This kind of user feedback is also well known in thesaurus based text retrieval technology. Other kinds of user feedback actually involve a re-adjustment of vectors in response to the user's selections (i.e., user feedback "tuning" of categories in CVT). This kind of feedback has a lasting effect on the system and is a learning process. This form of user feedback learning can be of particular value in forcing a vector based retrieval system to "generalize" in directions which are most appropriate to the user's needs, but without restricting the system to specific symbol (i.e., key word) matches. It can also be used to force the system to retrieve only documents which fit a plurality of pre-tuned categories (i.e., fitting to beyond a desired threshold, for each category). Both types of user feedback are well known in the art.

It is important to recognize that the problem of "over generalization" which can occur in vector based retrieval systems is quite different from w-hat happens in simple "symbol matching" (i.e., "key word" search) systems. In the latter, errors result when the system retrieves records that have the right symbols, but in the wrong context. These "false drops" seldom have any conceptual relationship with the query. In the former case, errors result when the system retrieves records that have the wrong symbols in the correct context. The erroneous records are usually quite closely related (conceptually) to the query, but at variance with the specific needs of the user. These kinds of errors are "fixable" through techniques such as user feedback optimization and in fact, represent an over use of a "strength".

The value of semantically distant (or cross domain) analogies in problem solving is well recognized. There have been past attempts at the development of computer based processes for retrieving such analogies in a systematic (problem specific) way. One such method is disclosed by M. Wolverton in "Retrieving Semantically Distant Analogies" [Doctoral Dissertation; Department of Computer Science; Stanford University, May, 1994], which is incorporated herein by reference. Wolverton describes a process for the searching of large multi-purpose, multi-domain knowledge bases for cross domain analogies to specific problem situations. Many of the concepts Wolverton demonstrates in his process may potentially be applicable in the context of the instant invention. Foremost among these are means for representing semantic distance, the use of spreading activation, and the application of knowledge gained in an initial search in order to re-direct subsequent searching. However, it is unclear how one would apply Wolverton's process in the searching of raw data sources, such as text-based databases. The information (text) in these data sources is highly heterogeneous. Converting this raw data into a knowledge base format, appropriate to the Wolverton process (as described in the reference) would be an extremely labor intensive task. This would be particularly true for knowledge domains having many specialized terms and word meanings. It would be necessary to reconcile, in advance, all the different domain-specific meanings of all the terms in all the knowledge domains in which the system must operate. Clearly, this problem is closely analogous to the difficulties described above with using thesaurus-based text search systems on highly specialized bodies of text. It would be of much greater practical value to have a method for finding semantically distant analogies that could be used on highly heterogeneous bodies or raw text, without the need for manual pre-preparation or the need for defining any terms (words).

DISCLOSURE OF THE INVENTION

The invention is directed to a universal computer-implemented method for finding analogies to specific terms (representing compositions, relationships, structures, functions, or applications) in a first preselected (and well defined) knowledge domain (or set of knowledge domains) by searching a second preselected knowledge domain (or set of knowledge domains) which is semantically distant from the first. It is a feature of the invention that the content of said second knowledge domain (or set of domains) is retrieved in isolation from the first.

The method of the invention comprises the automated generation of an abstract representation of terms from a first user selected knowledge domain (source domain), said representations encoding (capturing, in abstract mathematical form) the co-occurrence patterns of terms characteristic of the source domain, and application of said representations to the efficient (selective) discovery of analogous objects [terms, or groups of terms, of similar meaning] in one or more semantically distant target domains. The abstract representations are most preferably vectors in a high dimensionality space. A small subset of terms (or groups of terms, such as phrases) is chosen from the source domain, said terms in the subset being substantially absent from the target domains and having substantially no known equivalents (such as synonyms) in the target domains. These source domain specific terms (in this user defined subset) are those for which "analogous objects" are sought in the target domains. These analogous objects are terms or groups of terms from the target domains, which are in some way related to the chosen source domain terms (i.e., having a similar semantic role, or "meaning"). The method of the invention is capable of efficiently (selectively) retrieving analogous content and ranking by degree of similarity, without any a priory specification of the nature of the analogy.

BRIEF DESCRIPTION OF THE DRAWINGS

FIG. 2C contains mathematical formulas used in the calculation of term vector updates according to an embodiment of the invention.

DETAILED DESCRIPTION OF THE PREFERRED EMBODIMENT

Figure 1A:
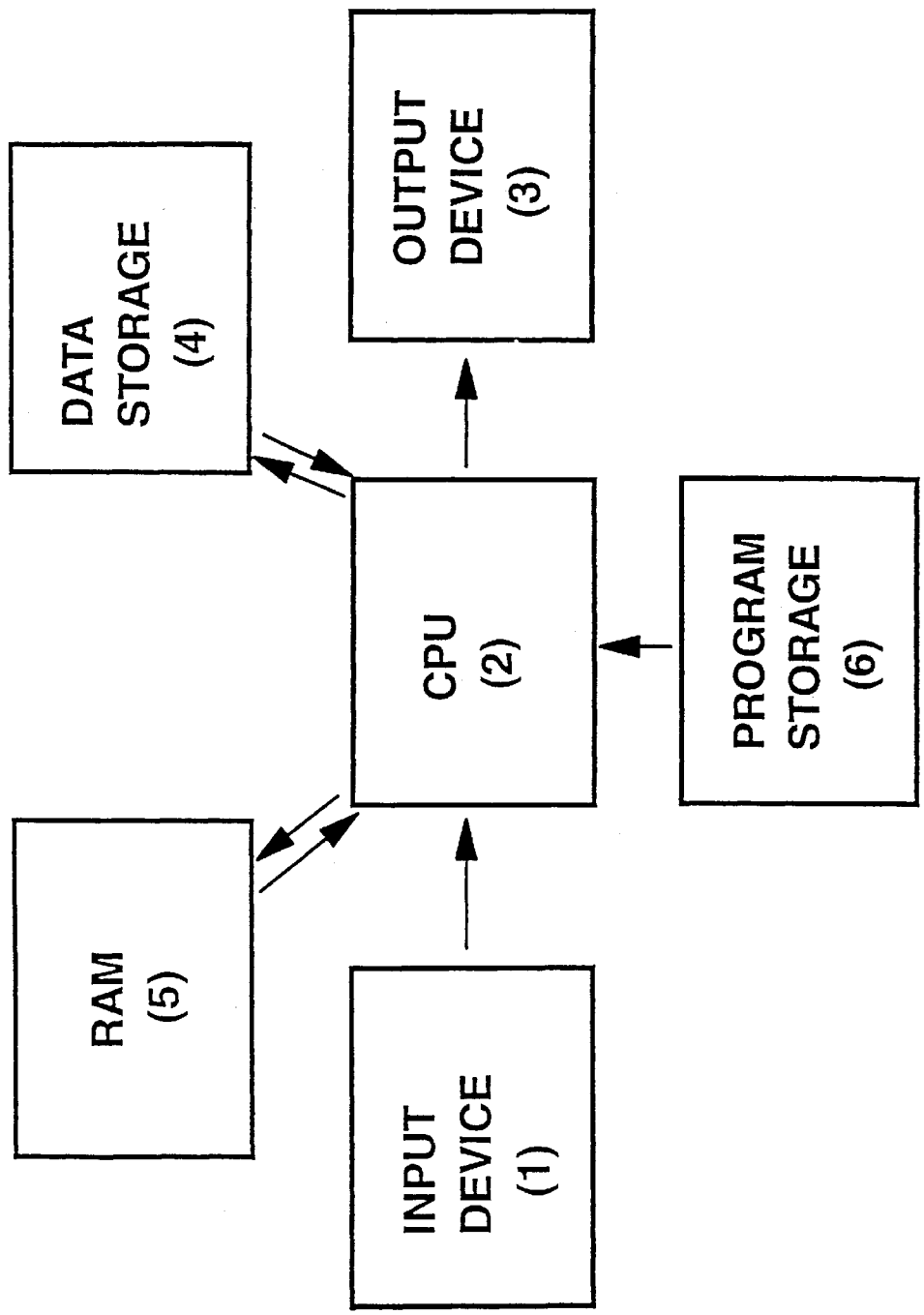
FIG. 1A is a block diagram illustrating one embodiment of the invention.

The method of the invention is suitable for retrieving analogies from the second (target) domain(s) which analogies are relevant to user defined queries about one or more specific terms (denoting structures, compositions, relationships, functions or applications) known in the first (source) domain(s). The method is particularly suitable for retrieving analogies which are novel, wherein there are substantially no matches within the preselected content of the target domain(s) to key symbols (such as key words), or known equivalents thereof (such as known synonyms to key words), used in the query statement. The method is useful in creative problem solving, and for the systematic discovery of new applications for existing products (or product categories). The method may also be useful in.the design of products or systems, wherein, for example, specific functional features of a new product (or system) may be arrived at by analogy to functional features of other products (or systems) in distant technical fields or applications.

In one embodiment of the invention, the method comprises the following steps:

1) Selecting one or more well defined source domains.
2) Assembling a first body of records form said source domains, wherein each record contains a plurality of information elements (terms), and storing said records in machine readable form.
3) Selecting one or more target domains, which are semantically distant from said source domains.
4) Assembling a second body of records from said target domains, wherein each record contains a plurality of information elements (terms), and storing them in a machine readable form in a location separate from said first body of records.
5) Assembling a single training corpus comprising records from said first body of records and optionally in addition a lesser proportion of records from said second body of records.
6) Computing a set of vectors [term vectors] for a large body of selected terms in the training corpus of step-5 said term vectors representing the domain specific relationships between the terms within the training corpus, and storing these in the computer.
7) Computing, using the term vectors of step-6, a set of summary vectors for each record in said second body of records (and optionally also for selected sub-portions within each of said records) and preferably storing said summary vectors separately, in a separate location in the computer.
8) Receiving one or more queries, each query preferably containing at least one chosen term from said first body of records which does not appear in said second body of records.
9) Computing, using the term vectors of step-6, a summary vector (query vector) for each query.
10) For each query, computing the similarity (closeness) of the query vector with the summary vectors from said second body of records (and any selected sub-portions within each of said records). This may be done, for example, by calculating dot products of said query and summary vectors.
11) For each query, alternatively displaying a relevance ranked list of records (and/or sub-sections thereof) from said second body of records or a visual cluster diagram thereof, by using the vector similarity information from step-10 in order to conduct the relevance ranking of the records (and/or their sub-sections) or to compute their relative positions on the visual cluster diagram. Said ranked list or cluster diagram being substantially free of records from said first body of records or from said source domain.

The ordering of the steps is not particularly important, so long as those steps which are dependent upon other steps are conducted subsequent to the steps upon which they depend.

An alternate embodiment of the invention comprises the following steps:

A) Receiving one or more specific terms from a source domain of interest to a user (said terms representing relationships, functions, materials, structures, compositions or combinations thereof, for which it is desired to find semantically distant analogies).
B) Assembling (by use of terms from step A and/or known synonyms thereof) a well defined body of records which support the domain specific terms (relationships, functions, etc.) of step A (i.e., by providing a domain specific context for them). This assembly of records is stored in the computer in electronic form.
C) Receiving one or more target domains which are semantically distant from the domain represented by the terms (representing functions, relationships, etc.) of step A.
D) Assembling a representative body of domain specific records from the target domains of step C, in order to create a search domain, said search domain being substantially free of records containing the terms (or known synonyms thereof) used to construct the assembly of records of step B. This search domain is stored in the computer in electronic form, in a separate location (separate file) from the assembly of records of step B.
E) Assembling a training corpus from the assembly of records in step B plus any optional minor (additional) portion of target domain records. This training corpus is stored in a separate location (separate file) in the computer from the search domain of step D.
F) Computing a set of term vectors for a large body of selected terms from the body of records in the training corpus of step E, and storing these in the computer, wherein said selected terms include the terms received in step A. Said term vectors representing domain specific relationships between terms within the training corpus.
G) Computing, using the term vectors of step F, a set of summary vectors for each record in said search domain of step D (and optionally also for selected sub-portions within each of said records) and preferably storing said summary vectors in a separate location in the computer.
H) Computing, for at least one (preferably each) of the terms received in step A, the similarity [closeness] of its term vector (obtained from step F) with the summary vectors of step G. This may be done, for example, by computation of dot products between said term and summary vectors.
I) For at least one (preferably each) of the terms received in step A, either displaying a relevance ranked list of records (and/or sub-sections thereof) from said search domain or else displaying a visual cluster diagram thereof, by using the vector similarity information from step H in order to conduct the relevance ranking of the records (and/or sub-sections) from said search domain or to compute their relative positions on the visual cluster diagram. Said ranked list or cluster diagram being substantially free of records from said body of records assembled in step B or from said source domain.

In this second embodiment, the "queries" received from the user are replaced by a few user-chosen "terms" from the source domain. The body of records chosen to represent the source domain is established using these terms, in order to provide a well defined domain specific context for said terms. This embodiment of the invention is preferred. The ordering of the steps in this alternate embodiment of the method of the invention is not particularly important, as long as those steps which are dependent upon other steps are conducted subsequent to the steps upon which they depend.

The method according to the invention is capable of identifying terms or sets of terms in the target domains having functional relationships (roles), and/or denoting structures, which are analogous to terms in the source domains, even where there are no direct matches of said source domain terms anywhere in the target domains (i.e., no direct symbol matches). The process is similarly capable of discovering deep functional analogies between terms in source and target domains, even where there is a misleading superficial matching of terms (i.e., same terms, with different meanings) between the source and the target domains. Consequently, novel and useful (i.e., query specific) functional and structural analogies may be forced to the surface by maintaining a high tension between semantic distance on the large scale (maximizing the semantic separation between source and target domains) and vector overlap on the micro scale (selecting records or sections thereof from the target domains, said records or sections having maximum vector overlap with the user-selected terms from the source domain).

In addition to the possibilities for ranking and/or visually clustering the records in the target domains according to their relevance to individual queries or to user-selected source domain terms, it is also possible to relevance rank or visually display sub-sections within the individual records by relevance to the same queries or selected terms. Particularly relevant portions within individual records may, for example, be highlighted. In this way, it is possible to quickly zero in on the most relevant analogies.

It is preferable that the query statement(s) or user-selected terms contain one or more terms which are present in the body of records chosen to represent the source domains, but absent from the body of records chosen to represent the target domains (i.e., the domains of the search). Likewise, it is preferred that the known equivalents of these same terms (synonyms, of the type which can be readily obtained from a thesaurus) should likewise be absent from the body of records chosen to represent the target domains (being searched). This can be accomplished by deleting from the target domain records all records (or portions thereof) which contain said terms (or equivalents). Such editing can easily be accomplished by using conventional key word search technology (the Boolean NOT operator), and is well known to anyone skilled in the art.

It is within the scope of the invention to include in the training corpus a minor portion of records from the target domain(s), in addition to the (major) portion of records from the source domain(s). However, the relative volume of information (i.e., as measured in bytes) in the training corpus taken from the target domain(s) should be substantially less than that taken from the source domain(s). This issue is described in greater detail below. The purpose of the training corpus is primarily to establish a set of term vectors which accurately represent the relationships of terms (i.e., words) which characterize the source domain(s).

Information (records) form the source domain(s) are substantially excluded (separated) from the body of target domain records. Preferably there should be zero records from the body of records representing the source domain(s) within the body of records chosen to represent the target domain(s). The purpose of this isolation is to prevent the computer from simply retrieving source domain records.

An important concept of this invention is that of creating and maximizing the tension between semantic distance (between source and target domains) and vector overlap (at the level of records or sub-sections of records) in order to force the system to make novel but useful (i.e., query specific, or user-selected-term specific) connections. Vector overlap is a quantitative principle which does not depend on the matching of specific symbols (such as words or word stems). Likewise, semantic distance can be represented quantitatively, and practical procedures exist for manipulating (i.e., maximizing) semantic distance.

It is also important that the source domain(s) be well defined. They should preferably not overlap with the target domains. The source domain(s) should preferably be broad enough to support any domain specific queries/terms of interest to the user by providing a sufficiently large corpus of records so that the domain specific meaning of the terms is represented in a stable way by term vectors in the high dimensionality semantic space. By "stable" it is meant that the vectors remain substantially invariant (constant) if a larger volume of representative source domain information (i.e., more records) are used in the training corpus (e.g. if the sample size is increased). Stability of vectors (especially for the subset of source domain terms which are of interest to the user) with respect to sample size [the amount of domain specific information in the training corpus] generally indicates that the source domain is well defined. The source domain is preferably not so broad that this condition of vector stability is violated. Further discussion of this matter is to be found below.

It has also been considered to employ known techniques of user feedback optimization, whereby highly ranked records or record portions from an initial search (query, or user-selected-term) on the target domains, which records the user selects as particularly relevant to his needs, are utilized in focusing the results of subsequent searches (i.e., by construction of subsequent queries on the target domains, or by tuning of categories).

EXAMPLE 1

This Example was designed to quickly and easily identify new potential applications for polyurethanes. The primary source domain was, therefore, the field of polyurethanes. No secondary source domains were used in this experiment. The fields of telecommunications and microelectronics were chosen as target domains. These fields are known to be semantically distant from the field of polyurethanes [i.e., showing very little overlap, in regard to the key terms which were used in assembling the body of records representing the source domain]. This Example is not to be regarded as limiting.

To represent the source domain, 27,626. U.S. patents were downloaded, covering the period from Jan. 1, 1980 through Mar. 17, 1998. All the patents were full text. Drawings, tables, structures, and formulas were excluded from this body of records. All "front page" information (i.e., references, assignees, inventors, priority data, field codes, etc.) except the titles, abstracts, patent numbers, and issue dates, were also excluded. Only the text portions were included. The patents were selected by applying the following Boolean "key-word" query on the claims field (only): "urethane" or "polyurethane" or "isocyanate" or "polyisocyanate" or "diisocyanate". Isocyanates are key raw materials used in the manufacture of most polyurethanes. The 5 terms in this query were treated as stems, which means that documents with either the singular or the plural forms of the words were retrieved. The output documents were listed chronologically, by issue date.

In a similar manner, 1466 U.S. full text patents were acquired [with non-text portions removed, as noted above] on telecommunications, by running the stem "telecommunication" on the claims field, over the time period from Jan. 1, 1994 through Mar. 17, 1998. 4767 full text U.S. patents on microelectronics were acquired for the time period from Jan. 1, 1990 through Mar. 17, 1998 by running the stem "microelectronic", in this case, on the Full-Text field [with the non-text portions of the patents removed, as noted above]. The output documents (for both target domains) were listed in chronological order by issue date.

Each of the three U.S. patent downloads were comprehensive (for the key-word sets and time intervals in question). The telecommunications and microelectronics sets were further supplemented with 2000 recent newsfeed abstracts, on each. The news feeds were obtained using the same key word stems as in the patent downloads, and acquired in chronological order, covering the period from roughly late Mar. 1996 through late Mar. 1998. The "search domain" [consisting of the sum of all records for both target domains] for this experiment therefore contained a total of 10,233 documents.

All of the text used in this experiment was in the form of ASCII text.

The degree of overlap between the source and target domains was assessed by running the key word set (plus known synonyms of the key words) for the polyurethanes domain [noted above] against the full texts of the body of records for each target domain. The key word (stem) list used for this overlap study was: "urethane" or "polyurethane" or "carbamate" or "polycarbamate" or "PU" or "isocyanate" or "polyisocyanate" or "diisocyanate". The overlap was found to be very small. Of the more than 10,000 documents in the search domain, less than 3.5% contained any of the key words (or known synonyms thereof) which were used in developing the body of records representing the source domain. Of these 3.5% of "overlapping" documents, manual inspection revealed that most either contained the key term or terms only in an incidental way, or else the key term had a meaning totally different from its "normal" usage in the polyurethanes domain. For example, the term PU is occasionally used as a synonym for polyurethane, in the polyurethanes domain literature. However, in the telecommunications and microelectronics domain literature the term PU usually means "processing unit". This alone accounted for 10% of the "overlapping" documents. It appeared, therefore, that less than 2% of the records in the combined target domains (i.e., the search domain) mentioned polyurethanes in any significant way. This small degree of overlap was deemed acceptable for the purposes of this experiment, and the overlapping records were therefore not edited out. It must be pointed out, however, that it would have been preferred to edit out all the overlapping records from the search domain.

The search domain for this experiment consisted of all the telecommunications and microelectronics records noted above. This search domain was isolated from (i.e., maintained in a separate file from) the polyurethanes records noted above.

A training corpus of 6000 documents was prepared consisting of 60% source domain material (i.e., polyurethanes patents), and 20% target domain material from each of the two target domains (telecommunications and microelectronics). The representative documents from each of the three domains were selected randomly. The volumes of information contributed by each domain to the training corpus were approximated by numbers of records included. Given that the patents were all about the same length (on average) and the newsfeeds were much smaller than the patents, it was expected that the actual volume of information contributed by the polyurethanes domain literature [which contained only patents] was larger than 60% of the entire training corpus.

Context vector [CVT] software was employed for the execution of this Example. Term vectors [term "context vectors", in the language of CVT] were obtained from the training corpus using a commercially available software from Aptex Software subsidiary of HNC Software, Inc. of San Diego Calif. The stop list contained a standardized set of short words (i.e., prepositions and conjunctions) which occur in most sentences and rarely if ever have domain specific usage. The standard stop list was supplemented with a list of words which invariably occur in all U.S. patents [i.e., words such as "patent", "invention", "claim", "assignee", "art", etc.] and therefore do not have any degree of domain specific usage in any of the domains selected for use in this experiment. All of the other words (not on the stop list) were selected terms for use in context vector generation. All the selected terms were subjected to a standardized stemming process. No exact phrases were selected during the preprocessing phase (i.e., no phrase list was used). All documents were treated alike during preprocessing and in the context vector setting process.

The context vectors generated from the training corpus were then fixed, stored, and used to calculate summary vectors for all the records in the search domain, and these summary vectors were also (separately) stored. In addition, summary vectors were calculated for the individual sentences and paragraphs within the content of each of the individual records in the search domain, and these "intrarecord" summary vectors were stored.

In this study, the two independently defined target domains within the search domain (i.e., microelectronics and telecommunications) were set up so that they could be searched separately (i.e., so the system would display results from any one at a time, in response to queries). This mode of operation is not essential to the invention, but is sometimes convenient.

Some simple queries were received, for use as triggers in order to extract and relevance rank the most "polyurethanes relevant" documents from the target domains (search domain), and to find the most relevant portions within said extracted documents [i.e., the points in the text wherein relevant connections exist to the polyurethanes (source) domain]. The first query was (by design) received from a person not skilled in the polyurethanes art. This query consisted of the single term "PU". A query vector was generated and its dot products with the records (and subportions thereof) in the search domain were computed. Using this information, a relevance ranked list of records was presented to the user, in descending order of relevance. The relevance ranked list consisted of the top ranked 200 records retrieved from each target domain (individually) in the search domain, displayed as lists of titles. Generally only the first 1–25, occasionally at most the top 1–50, titles were opened and inspected by the user. In addition, a visual cluster map of the same (highest ranked) 200 records from each target domain were displayed as cluster diagrams, and either the cluster diagrams or the ranked lists could be viewed alternatively at the choice of the user. Individual records were opened by selecting either the title in the ranked list or its representation as a point in the cluster diagram. Once opened, a bar graph was displayed for each record showing the most highly ranked sub-portions, with the higher bars representing the more relevant of said selected sub-portions. It was possible to jump to the appropriate sub-portion simply by selecting the individual bars in the bar chart. These sections were highlighted in the text. Thus, it was possible to very quickly navigate through individual documents (as well as the collective mass of documents) according to relative relevance of sub-sections, and to see exactly the nature of the connection(s) to the source domain that caused that document (and sub-section) to be retrieved. It is those connections which constitute the analogy.

A number of key observations concerning the results obtained from the "PU" query are summarized below. These observations also were found to pertain to the other queries used in this experiment. There are a number of points about the "PU" query discussed further below which make it valuable as an instructive Example of this invention. In general in this study, it was found most convenient to simply open and inspect individual documents by going down the ranked list one at a time and then inspecting its title and two to four of the most highly ranked sub-portions.

Some important points from Example 1:

i—Substantially all documents in the top ranked 25, and most in the top 50, from each target domain were highly relevant to the query.

ii—Most of the highly ranked (top 50) documents found in each target domain were not retrieved on the basis of matching of "key words" used to define the polyurethanes domain (or their known synonyms) as listed above. In other words, most of the relevant connections which the system made were not at the level of "word matches". There were, of course, some (a small minority) of hits on documents which did mention polyurethanes (etc.) in a significant way because of the small degree of domain overlap noted above.

iii—A significant number of unexpected potential applications for polyurethanes were discovered in this exercise (see discussion below).

iv—The system made relevant connections both at the level of end use applications and at the level of chemical compositions. It retrieved those end use applications and analogous compositions which contained definite and specific similarities to polyurethanes although polyurethanes were not mentioned in most cases. It generally did not retrieve applications or compositions which were unrelated (i.e., dissimilar) to polyurethanes. For example, of the many types of plastics mentioned in the target domains, the system retrieved those most similar to polyurethanes, namely mostly other thermoset materials with high aromatic content—such as phenolics, polyimides, and epoxies, and various block copolymeric structures such as polyamide-polysiloxane and polyamide-polyether block copolymers.

v—It was generally not necessary in this experiment to perform recursive searching or user feedback on initial query results in order to find the most relevant materials. It would, of course, be within the scope of the invention to employ such supplementary methods.

Results from searches representing the outcomes of the method of the invention are provided below (by target domain, using queries that were of particular interest to the user in respect to each target domain). Further discussion of results is also provided. The information following each patent number is not necessarily the title, but a brief description of the most relevant content.

Items marked "*" were deemed to be the most useful as potential new applications for polyurethanes, but all of the hits were relevant (as potential applications) to some degree. Items marked "*" contained one or more explicit references to the key terms or known synonyms thereof used in establishing the polyurethanes (source) domain. Note that these relatively few items are the results of domain overlap (explained above), and could easily have been edited out prior to searching. None of the other items (i.e., those not marked "-") contained any direct "key-word" matches. Many of these latter hits appeared to be novel applications as well as useful (relevant). The single term queries (shown) are preferred according to the invention. Some two or three term queries are also shown, and produced useful results. All the queries used in generating these results are specific to the polyurethanes domain:

I) Telecomunications Domain, Queries and Results

"PU": [Note: Only one document among the top 25 found with this query contained any matches to "PU", or its known synonyms; but all contained "PU-similar" (i.e., useful) subject matter, and include many potential new applications]:

*1) U.S. Pat. No. 5,563,377: Telecomm. cable (flame retardant polyolefin polymer insulation).

*2) U.S. Pat. No. 5,649,041: Cable utilizing wetted superabsorbent polymer and water soluble adhesive.

3) U.S. Pat. No. 5,635,673: Joining structures for telecomm. cables (seals and enclosures).

-4) U.S. Pat. No. 5,635,559: Underground waterproof structures for telecomm. cables.

5) U.S. Pat. No. 5,410,103: Fire retardant poke through wiring devices (floor apertures).

6) U.S. Pat. No. 5,339,379: Trays and support housings for fiber optic cables.

7) U.S. Pat. No. 5,383,091: Detachable elastomeric grips and protective casings for cellular phones.

*8) U.S. Pat. No. 5,563,377: Fire and smoke resistant polymers for cable design.

9) U.S. Pat. No. 5,393,930: Fire retardant poke through wiring device (disks).

10) U.S. Pat. No. 5,722,204: Junction assemblies for underground telecomm. installations.

11) U.S. Pat. No. 5,606,919: Channels for telecomm. cables.

*12) U.S. Pat. No. 5,550,916: Housings and mounts for telecomm. equipment (foam seals).

*13) U.S. Pat. No. 5,391,019: Penetrating concrete sealer (for environment enclosures; telecomm. equip.).

*14) U.S. Pat. No. 5,461,195: Cable filled with water absorbent gel (prevents shorting).

15) U.S. Pat. No. 5,422,434: In-floor wiring fittings, carpet flanges and flaps, etc.

*16) U.S. Pat. No. 5,530,206: Cable with fire retardant and EM shielding layers.

17) U.S. Pat. No. 5,544,273: Fiber optic cable storage cartridge and shelf.

*18) U.S. Pat. No. 5,384,427: Flood protection pedestal for telecomm. equipment.

19) U.S. Pat. No. 5,530,954: Fiber optic cable distribution bays and panels (channels).

*20) U.S. Pat. No. 5,319,732: Submarine repeaters and optical fiber storage means therein (foams).

21) U.S. Pat. No. 5,412,751: Enclosures; trays; supports; and connectors for fiber optic cables.

22) U.S. Pat. No. 5,589,557: Fluorinated polymers (for use in telecomm. equipment).
*23) U.S. Pat. No. 5,322,973: Aerial closures for cable splices, etc. (sealants).
24) U.S. Pat. No. 5,421,532: Device for storing bundle wires of glass fiber cables.

"Isocyanate"

-*1) U.S. Pat. No. 5,574,257: Telecomm. articles contg. gelled oil compositions.
2) U.S. Pat. No. 5,589,557: Fluorinated polymers (for use in telecomm. equipment).
-*3) U.S. Pat. No. 5,455,881: Hydrocarbon polymers (polybutenes, etc.) for absorbtion of hydrogen in optical fiber cables [H2 is an undesirable by-product of metal+ water interactions].
-4) U.S. Pat. No. 5,488,535: Arc suppressor.
*5) U.S. Pat. No. 5,649,041: Cable utilizing wetted superabsorbent polymer & water soluble adhesive.
*6) U.S. Pat. No. 5,424,901: Resilient rubberlike materials (plasticized polymers) as insulators.

"Isocyanate Adhesive"

*1) U.S. Pat. No. 5,649,041: Cable using wetted superabsorbent polymer & water soluble adhesive.
-*2) U.S. Pat. No. 5,688,601: Adhesive for electrical components (vinyl type).
3) U.S. Pat. No. 5,424,491: High frequency insulated cable.

"Polyisocyanurate": [Does not Occur Explicitly in any of the Documents Found]

*1) U.S. Pat. No. 5,548,086: Raised floor modules—for accommodating sub-floor cables.
2) U.S. Pat. No. 5,437,087: Underground conduits & enclosures (components and "saddle" joinings).
*3) U.S. Pat. No. 5,672,845: Raised floor, for accommodating sub-floor cables. "Polyurethane Coatings": [Does not occur explicitly in documents found].
*1) U.S. Pat. No. 5,461,195: Telecomm. cable insulation (filled with water-absorbent gel matrix).
*2) U.S. Pat. No. 5,319,732: Submarine transmission cables for optical fibers (seals).
*3) U.S. Pat. No. 5,649,041: Telecomm. cable contg. superabsorbent (water absorptive) polymer, and water soluble adhesives.
*4) U.S. Pat. No. 5,621,841: Water blocking coating and filling for optical fiber telecomm. cables.
5) U.S. Pat. No. 5,630,303: Enclosures for telecomm. equipment (anchoring for cables, etc.).
-*6) U.S. Pat. No. 5,384,427: Flood protection pedestal for telecomm. equipment.
*7) U.S. Pat. No. 5,574,257: Telecomm. articles contg. gelled oil filling (cables, junctions, etc.).
-*8) U.S. Pat. No. 5,455,881: Hydrogen absorbing polymers (hydrocarbon polymers) for submarine cables.
*9) U.S. Pat. No. 5,635,673: Housing (plastic) joining enclosures for telecomm. cables.
10) U.S. Pat. No. 5,636,436: Coaxial cable ejection device (plastic).
11) U.S. Pat. No. 5,530,206: Insulative matrix for telecomm. cable, based on polymeric conductor.
*12) U.S. Pat. No. 5,722,204: Resin sealants for telecomm. cables (seals and potting).
13) U.S. Pat. No. 5,319,732: Optical fiber storage arrangement; submarine cables; splices.
14) U.S. Pat. No. 5,589,557: Fluorinated polymers and copolymers (coatings).
*15) U.S. Pat. No. 5,326,281: EM shielding sheets (plastic plus metal composites) and plugs.

II) Microelectronics Domain, Queries and Results "PU":

*1) U.S. Pat. No. 5,519,752: X-ray debris shield (low dens. plastic foam)—poss. aerogel application.
2) U.S. Pat. No. 5,274,065: Polyorganosiloxane polyamide block copolymers.
3) U.S. Pat. No. 5,183,874: Polyorganosiloxane polyamide block copolymers.
4) U.S. Pat. No. 5,686,356: Reticulated conductor (not highly useful, but shows deep semantic link).
*5) U.S. Pat. No. 5,162,407: Room temperature vulcanizing one-component rubber formulation.
*6) U.S. Pat. No. 5,002,818: Reworkable electronic component (adhesive).
-*7) U.S. Pat. No. 5,224,363: High strength cut resistant material (mentions "polyurethanes").
-*8) U.S. Pat. No. 5,010,139: Copolymers of EO as antistat. additives (mentions "polyurethane" appls.).
9) U.S. Pat. No. 4,962,181: Heat stable polyamide.
10) U.S. Pat. No. 5,443,691: Cellulosic fibrous structures (paper; electrical appls.).
*11) U.S. Pat. No. 5,242,715: Systems for coating or bonding electronic components.
-*12) U.S. Pat. No. 5,644,837: Adhesives for assembling electronic components.
13) U.S. Pat. No. 5,368,993: Forming relief image with (phenolic) copolymer binder.
14) U.S. Pat. No. 5,547,601: Cloth (impregnated) for cleaning printed circuit assemblies.
-*15) U.S. Pat. No. 5,244,707: Coating or adhesive (having dessicant properties) for electronic devices.
-*16) U.S. Pat. No. 5,298,558: Polymer (polyether amide) having electrostatic dissipative properties.
17) U.S. Pat. No. 4,952,669: Copolyimide block copolymer (based on dianhydrides).
*18) U.S. Pat. No. 5,576,068: Packaging elements (thermoplastic or elastomeric polymers).
19) U.S. Pat. No. 5,166,038: Etch resistant pattern (from a photosensitive organic polymer+a silane).
20) U.S. Pat. No. 5,120,826: Polyamide-imides (for circuit boards; and as impregnants).
-*21) U.S. Pat. No. 5,494,562: Silicate+polymer emulsions (elastomers).
22) U.S. Pat. No. 5,306,789: Polyisoquinoline polymers; polyphthalazine polymers.
*23) U.S. Pat. No. 5,167,851: Hydrophilic (water washable) greases, for electronics applications.
24) U.S. Pat. No. 5,264,545: Aromatic polyimide (precursor) solutions.

"MDI": [An Acryonym for "Methylene Diphenylene Diisocyanate"]

-1) U.S. Pat. No. 5,686,541: Modified epoxy resins (isocyanate, including MDI, modified).
*2) U.S. Pat. No. 4,957,846: Radiation sensitive Novolac (aromatic phenolic) oligomers.
-3) U.S. Pat. No. 5,270,431: Radiation reactive oligomers (unsat. isocyanate based; mentions MDI).
-4) U.S. Pat. No. 5,446,074: Diphenylmethane based polyamic acid precursors.
5) U.S. Pat. No. 5,264,545: Polyimide forming starting materials (aromatic resins).
-6) U.S. Pat. No. 5,426,164: Novolac (aromatic phenolic) polyphenolic cpds. (photoactive resins).

7) U.S. Pat. No. 4,933,132: Aromatic polyimides.
*8) U.S. Pat. No. 5,605,763: Epoxy+phenolic resin adhesives (conductive films derived from).
9) U.S. Pat. No. 5,322,757: Phenolic resins (Novolacs), resist solutions from.
10) U.S. Pat. No. 5,354,839: Aromatic polyimides.
11) U.S. Pat. No. 4,980,447: Aromatic polyimides.
-12) U.S. Pat. No. 5,352,712: Optical fiber coatings (radiation cured urethanes; does not mention "MDI").
13) U.S. Pat. No. 5,516,875: Polyimide films and adhesives.
-14) U.S. Pat. No. 5,298,558: MDI based urethanes having electrostatic dissipative properties.
15) U.S. Pat. No. 5,296,330: Epoxy-novolac (phenolic) resins.
-16) U.S. Pat. No. 5,474,876: Radiation curable polymer mixtures.
17) U.S. Pat. No. Re.33,797: Polyimidosiloxanes (cured with toluenediamines).
18) U.S. Pat. No. 4,952,669: Copolyimide polymers (from amines and polyanhydrides).
19) U.S. Pat. No. 5,310,858: Polymers of p-xylylene, from p-xylylene diesters.
20) U.S. Pat. No. 5,114,826: Polyimides (amines+polyanhydrides).
21) U.S. Pat. No. 5,234,789: Radiation sensitive novolac (phenolic) resin composition.
22) U.S. Pat. No. 5,514,520: Acid hardening photoresists (based on amine-cured "Cymel" melamine resins).
23) U.S. Pat. No. 4,954,609: Polyimide resins (based on dianhydrides).
-24) U.S. Pat. No. 5,384,229: Phenolic resins (for photoacid labile photoresists).
25) U.S. Pat. No. 5,260,411: Dithiodianiline bismaleimide polymers.
26) U.S. Pat. No. 5,618,655: Novolac (phenolic) resins; resist materials.
27) U.S. Pat. No. 5,561,105: Novolac (phenolic) resins; resist materials.
28) U.S. Pat. No. 5,028,686: Epoxy-novolac (phenolic) resins.
-29) U.S. Pat. No. 5,217,843: Novolac resins.
30) U.S. Pat. No. 5,446,074: Photosensitive polyimides (aromatic).
-31) U.S. Pat. No. 5,206,111: Novolac (phenolic) resins.
*32) U.S. Pat. No. 5,686,541: Semiconductor encapsulation (by aromatic epoxy resins).
33) U.S. Pat. No. 5,114,826: Photosensitive polyimides (aromatic).
34) U.S. Pat. No. 5,248,734: Polyphenylene polymer.
35) U.S. Pat. No. 5,362,600: Novolac (phenolic) resins.
-36) U.S. Pat. No. 5,120,633: Liquid resist materials (certain urethanes and polyesters are mentioned).

"Polyisocyanate Adhesive"

*1) U.S. Pat. No. 5,002,818: Reworkable electronic adhesive.
*2) U.S. Pat. No. 4,975,221: Conductive adhesive (having flexibility).
*3) U.S. Pat. No. 5,714,238: Conductive adhesive; and circuits prepared therewith.
-*4) U.S. Pat. No. 5,717,054: Flexible epoxy cpds.
*5) U.S. Pat. No. 5,328,087: Thermally & electrically conductive adhesive.
-*6) U.S. Pat. No. 5,489,637: Low temperature flexible die adhesives.
7) U.S. Pat. No. 4,983,250: Electrical interconnects (adhesion layers).
-*8) U.S. Pat. No. 5,270,431: Unusual adhesive resins—derived from MDI (new MDI use).
-9) U.S. Pat. No. 5,061,549: Adhesives for electronic components.
*10) U.S. Pat. No. 5,358,992: Die-attach adhesives (cyanate trimers).
*11) U.S. Pat. No. 4,997,517: Dielectric epoxy-based adhesives (and adhesive tapes).
12) U.S. Pat. No. 4,916,805: Photocurable adhesives for circuit boards.
13) U.S. Pat. No. 5,506,446: Adhesive polymer; which remains rigid at 240.C.
14) U.S. Pat. No. 5,690,766: Adhesive for bonding chips to lead frames.
*15) U.S. Pat. No. 5,319,244: Dielectric adhesive for films (triazine based).
16) U.S. Pat. No. 5,516,418: Adhesion promoter, and adhesive resin system.
-*17) U.S. Pat. No. 5,122,858: Polymers for increased adhesion (electronic packaging).
-18) U.S. Pat. No. 5,302,458: Azidosilanes—as adhesion promoters for inorganic substrates.
-*19) U.S. Pat. No. 5,298,558: Polymer (polyether polyurethane) having electrostatic dissipative properties.
-*20) U.S. Pat. No. 5,527,835: UV curable urethane adhesives for optical fibers.
*21) U.S. Pat. No. 5,132,351: Chemical solder (polymers contg. metal acetoacetate additives).
22) U.S. Pat. No. 5,352,712: Radiation curable urethane coatings for optical fibers.
*23) U.S. Pat. No. 5,362,679: Chip encapsulation (plastics), electronics packaging.
*24) U.S. Pat. No. 5,601,678: Anisotropically conductive adhesives (metal-plus-polymer film laminates).
*25) U.S. Pat. No. 5,587,341: Tape automated bonding (adhesive bonding); for stacked IC packages.
-26) U.S. Pat. No. 5,536,529: Coated optical fiber; urethane photocurable adhesive.
27) U.S. Pat. No. 5,701,032: Die-attach adhesive resins.
*28) U.S. Pat. No. 5,638,597: Flexible circuit board; dry film adhesive.
*29) U.S. Pat. No. 5,561,322: Chip packaging; protective encapsulants.

"Polyisocyanurate Adhesive"

*1) U.S. Pat. No. 5,242,755: High temperature adhesives from di-phthalonitrile polymers.
*2) U.S. Pat. No. 4,975,221: Die-attach adhesives.
-*3) U.S. Pat. No. 5,270,431: Polyoxazinedione adhesives (made from diisocyanates—including MDI).
*4) U.S. Pat. No. 5,002,818: Reworkable electronic adhesive.
*5) U.S. Pat. No. 5,328,087: Conductive adhesives.

"Urethane Foam": [No Direct Key-word Matches]

1) U.S. Pat. No. 5,686,356: Reticulated conductors (not highly useful, but makes a "deep semantic connection" between "reticulated" and "foam". This connection was "learned", automatically, from the PU training set).
*2) U.S. Pat. No. 5,519,752: X-ray debris shield (low density foam). Potential "aerogel" application.

"Polyisocyanurate or Triazine Coating"

*1) U.S. Pat. No. 5,319,244: Triazine thin-film adhesives.
*2) U.S. Pat. No. 5,250,347: Triazine resin dielectric circuit packages.

-3) U.S. Pat. No. 5,352,712: Radiation curable coatings for optical fibers.
4) U.S. Pat. No. 5,234,789: Alkali-soluble binder resins (polylactide based).

* Items marked "*" may be particularly relevant as potential applications matches for PU technology.

The results were generally the highest ranked, or near to the highest ranked, results from each query (usually among the top 25; almost always among the top 50 hits). In this regard, it is important to remember that there are thousands of documents in each of these "target" domains.

1) The System makes relevant connections between semantically distant domains activated by these types of simple queries, where no matches would otherwise be found. The system interprets the query words from a "PU perspective", rather than looking for simple matches. This "perspective" is generated automatically by virtue of the system's "training" on the polyurethanes source domain data. The use of "PU" as a simple key word query in these domains, by contrast, would produce nothing of value. The use of the "PU" query in the "context vector" system is equivalent to asking: "Give me the documents in the target domains which are conceptually most similar to polyurethanes technology, broadly defined, and rank by relevance". These types of "fuzzy analytic" questions could hitherto be answered only by human beings (experts). It is this type of concept-level (rather than word level) matching which makes possible the easy identification of new applications opportunities from any domain of interest. The system, in effect, tells the user what he/she is looking for.

2) The system automatically handles spelling variations (and errors), synonyms, and words having multiple (domain specific) meanings. Nothing needs to be "programmed in" manually. The weightings of word relationships are entirely natural (domain specific), not "forced" by reference to a fixed thesaurus.

3) Queries can be entered as "natural language" sentences or paragraphs, but preferably as single words or short phrases, in the context of this invention.

4) The user need not have any prior conception of what he/she "wants". This is a pure connection making process directed by the vectors developed from the training corpus and the content of the target domains (in plain text). The user can query the system by applying common words or phrases from domain-A (i.e., polyurethanes) applied to isolated target domains B, C, D, etc. In many cases, the queries give overlapping results, in the highest ranked documents found (as shown above), which suggests that these simple queries are merely acting as triggers for flushing out and ranking the natural semantic connections (analogies) between the otherwise semantically distant knowledge domains.

5) The text of the source and target domains need not be formatted or prepared in any special way although ASCII text is preferred. Any "symbols" can be used provided that they "co-occur" somewhere in the data sets. Any language will work. Special "symbols" can be created, if desired.

6) The system directs the user to the most relevant portions of the documents found, so that searching or reading through documents is not necessary.

7) Documents found (and portions within documents) are relevance ranked, and may be viewed in order of rank.

8) The "context vector" technology [CVT] used in this Example can support "machine learning" by user feedback. Consequently, the user can "fine tune" results by providing both negative and positive feedback as to its "relevance" [to user needs]. It is possible, in principle, to set up or select categories which can be tuned (with respect to the relevance of new content) by user feedback learning. This feature is of particular interest, inasmuch as it provides a mechanism for "continuous improvement" and proprietary differentiation [i.e., the system can "grow" in any direction required]. User feedback and tuning of categories were not employed in this experiment.

Additionally, the first query was selected by a non-expert in polyurethanes technology and, as such, was not a very good query (i.e., not as widely used in the source domain as the word "polyurethane", and much more likely to have different domain-specific meanings in bodies of text from other knowledge domains). Nevertheless, the quality of results obtained were remarkable. Most of the connections (analogies) were made at the level of semantic content rather than word matching. As noted above, most of the highest ranked hits were relevant (to the polyurethanes domain), and a number of them were surprising and unexpected (even to polyurethanes domain experts), and suggestive of potential new applications for polyurethanes.

The fact that "PU" has a different usage pattern in the target domains (i.e., signifying "processing unit" etc., rather than polyurethanes) did not result in any false drops [inappropriate hits on the key term] among the highest ranked (top 50) hits returned. This was unexpected and surprising in view of the fact that no attempts were made to explicitly disambiguate these (or any other) terms in the experiment.

For most of the documents retrieved in the Example shown above (i.e., for all those documents not containing any explicit mention of the exact query term or its known synonyms), retrieval was triggered by the existence of one or more specific features (i.e., chemical structures and/or end use applications) which were identifiably similar to one or more specific feature of the polyurethanes domain. These "feature matches" were quickly identified by using the bar chart to view the most highly ranked portions within the text of each document retrieved.

As a further illustration, in the case of U.S. Pat. No. 5,649,041, retrieved under the "PU" query, from the telecommunications domain, the primary feature matches were in respect of water-soluble adhesives and superabsorbent polymers. Water-soluble adhesives are a very well known class of applications for polyurethanes technology. Superabsorbent polymers have been used as adjuncts (additives) in polyurethane formulations, in other specialized applications of polyurethanes such as personal hygiene devices, designed to absorb large quantities of aqueous fluids. Nevertheless, the '041 patent does not mention polyurethanes or isocyanates, or any known synonyms thereof. The '041 patent was among the top three hits retrieved by the "PU" query from the telecommunications domain set. The specific applications in telecommunications described in this patent were completely unknown prior to the query. Given the large number of sub-applications in the polyurethanes domain, it is unlikely that this specific new application opportunity could have been discovered, other than by chance, using conventional search methodology. The feature matches are both apt (relevant) and deep (not based on simple symbol matches). This specific example is typical of the results produced by the method of the invention. The general problem of how to find information which concerns, as in this case, an application unknown to the user is not addressed adequately in the prior art. The success of this method, in its ability to efficiently and reliably discover such unknown applications from a semantically distant domain, as represented by a large body of text containing substantially no relevant "key word" matches, was unexpected.

Context vector technology, as described in the prior art, strongly indicates that optimum performance was to be expected only when the system was trained on a corpus of documents taken from and focused on the specific domain in which the system was intended to be used representing the same domain as the body of records being searched. More specifically, the context vector product performed about half as effectively as a well known thesaurus based search tool in a relevance ranking exercise against 1300 chemistry related documents dealing with crystallization inhibitors, wherein the context vector system had been trained only on "general-interest" literature (i.e., a body of newspaper articles) not specific to the domain of chemistry (and covering a broad range of domains). The queries in this earlier trial, not according to the invention, did not contain any specialist terms, and could therefore be run effectively on a thesaurus based search tool for comparison purposes. The same relatively unsatisfactory performance was observed with 5 separate queries against which the 1300 chemistry articles were relevance ranked. Optimum performance for most context vector systems is not to be expected unless the system is trained on domain-specific subject matter (i.e., subject matter taken from, and focused on, the same domain as the body of material being searched). The results of the current trial according to the invention are, by contrast, very surprising.

What was especially unexpected and surprising about the results obtained from the Example according to the invention (compared to this earlier experiment, and the prior art) is the high level of performance (i.e., essentially all of the top 50 hits were relevant for each query used in spite of the fact that the source domain was semantically quite distant from both target domains). Based on the earlier trial results, much poorer outcomes were expected than were actually realized.

It should also be understood that a trial of this nature would not have been practical on a thesaurus based search tool without extensive manual modification of the system. This is because the queries used to generate the results presented above were all highly domain specific. Given that the word relationships in a thesaurus based tool are "programmed in" manually and generally very limited, it cannot be used in the manner demonstrated above. That is, a thesaurus based tool cannot be used to extract and rank the natural connections (analogies) between semantically distant knowledge domains, as elicited by use of domain-specific terms as "trigger" queries (as demonstrated in the Example according to the invention, shown above). A fixed, manually constructed, thesaurus based tool will find only what its limited and static set of word relationships permits it to find.

The method of the invention is preferably applied to simple queries (i.e., single words or short exact phrases) which are highly source-domain specific. The query terms are received from a user, and "grounded" (as to their domain specific usage, or "meaning") in the source domain. Such precise terms, suitable for use as queries, may be received from human source domain experts (i.e., users), or optionally extracted automatically from representative bodies of domain specific text (i.e., as received from said experts) by means of "key wording" [key word extraction] software programs.

A preferred embodiment of the invention involves the extraction of semantically distant analogies from bodies of text wherein all records from said source and target domains are written in the same language (i.e., English). In this preferred embodiment, the general term "records" as used hereinabove is understood to be documents, and the general terms "symbol" or "term" or "information element" as used interchangeably hereinabove are understood to be words (and/or word stems, if a preprocessing step involving word stemming is involved, and optionally also certain preselected phrases) in said documents.

The expression "analogous objects" used hereinabove refers to real world things as denoted by terms (or sets of related terms) identified in the target domains, which identified terms individually or collectively convey a meaning similar to different terms or sets of terms (said terms denoting other real world things) chosen from the source domain and contained within the query statement. The "real world things" (as represented by terms or sets of terms in bodies of records) mentioned above may be physical things such as specific materials, compositions, structures, and the like, but may also be specific relationships, functions, end-use applications, people, organizations, and the like. In short, anything that can be represented by terms in a body of records. However, the method of the invention operates at the level of terms in bodies of records (i.e., text) and does not "see" the underlying real world objects represented by said terms.

Figure 4:
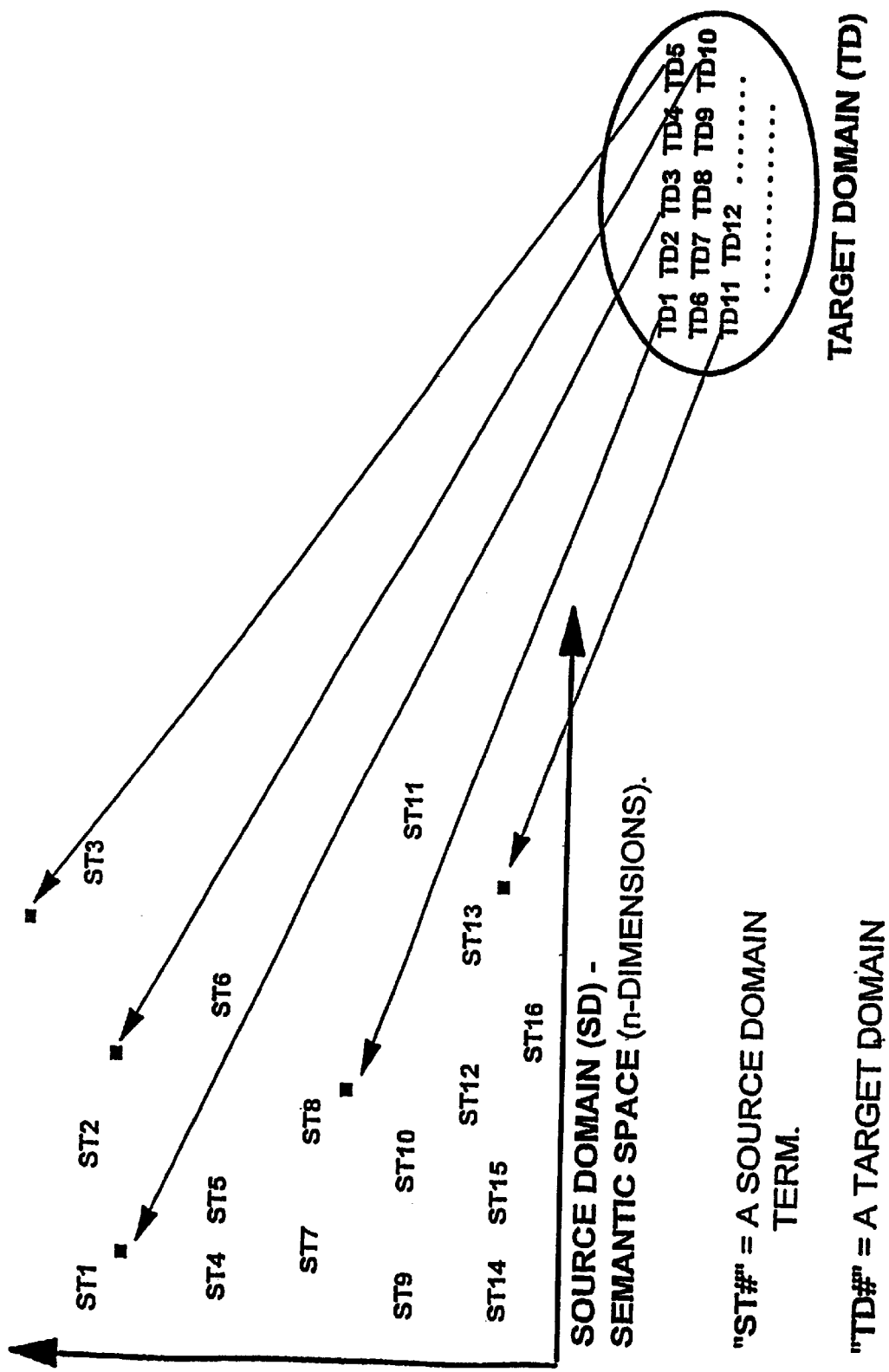
FIG. 4 is a schematic representation of an embodiment of the invention.

In order for two different objects (as represented by terms in text) to be considered analogous, they must have at least one (preferably several) specific features which are identifiably held in common. The features of objects are also represented by terms or sets of terms in text. A closer degree of analogy generally means that a greater number of features are held in common, but may sometimes mean that a particular commonly held feature is quite unique to a narrow class of objects. Such information is embedded in the characteristic co-occurrence relationships between terms in text. This embedded information may be exploited, according to a method of the invention, in order to find analogous objects and rank them by degree of analogy. In one embodiment of the invention analogies between target domain objects from the perspective of the source domain are automatically determined. This is discussed in greater detail hereinbelow and is presented graphically in FIG. 4.

It is within the scope of the invention to operate on a mixed language assembly of documents, provided that the vectors of the words in all the various languages used can be related in some reliable and systematic way, such that documents (or document segments) in any of the languages included in the assembly of documents can be retrieved accurately by queries in a language understood by the user.

Means for handling bodies of text in multiple human, languages are described in U.S. Pat. No. 5,794,178 and U.S. Pat. No. 5,619,709, which are both herein incorporated fully by reference.

It is also within the scope of this invention to use media other than text including but not limited to images, video, audio (i.e., speech), or any other source of raw data wherein "meaning" is represented by co-occurrence of information elements of some description (i.e. symbols, images, or the like). Whichever media are used, it is preferable that at least one of the following criteria are met:

1) The same medium is used to represent all records within source and target domains in use, or
2) A method is employed for interrelating the vectors of information elements from different media if more than one medium is used.

Use of a single medium for all records is preferred wherein text is the more preferred medium and single-language text is most preferred.

A fundamental idea behind the context vector concept is the observation that many large bodies of real-world data have the property that the statistics of proximal co-occurrence of their basic (information) elements are fixed. Further, frequent proximal co-occurrence of two basic elements can, in almost all cases, be interpreted as implying a strong similarity of usage or "meaning" between those elements. Human languages, for example, (both spoken and written), wherein information elements (words or word stems) that appear frequently near one another have a strong associational linkage which could be called a similarity of usage or "meaning".

Patterns of word usage in text (within any single human language) are knowledge-domain specific, and can vary considerably from one domain of knowledge to another. It is possible to exploit an abstract vector representation in order.to identify novel but relevant (useful) analogies to objects (i.e., terms or sets of terms representing real world structures, compositions, materials, relationships, etc.) taken from a source domain in a second and semantically distant target domain. In a preferred embodiment of the invention, the information elements (words or word stems) selected to represent the things (i.e., structures, compositions, materials, relationships, etc.) of interest from the source domain(s) are not present and have no known equivalents in the target domain(s).

FIG. 1A is a block diagram showing a system according to an embodiment of the invention. Queries are entered into this system via the input device [1]. A central processing unit (CPU), represented as block [2] runs software program instructions preferably stored in the program storage [6]. These instructions direct the CPU [2] to perform the functions of the system. The software may be written in any suitable programming language. A preferred program language is the C programming language, run on the UNIX operating system. Various hardware platforms may be employed in practicing the invention. The various bodies of data which constitute the source and target domains (i.e., bodies of text documents) are preferably stored in electronic form in the data storage [4]. The data storage [4] is also preferably used to store the data describing the various sets of vectors employed in the method of the invention. It would, of course, be within the scope of the invention to store all or any portion of the data (i.e., bodies of text documents) in a remote location, electronically linked to the system shown in FIG. 1A.

The CPU [2] accepts the input (such as queries) from the input device [1] and accesses data from data storage [4], using the RAM [5] as a work space. The CPU [2], data storage [4], and program storage [6] perform together to generate term vectors from the source domain training corpus and use said term vectors to compute vectors representing higher order text structures in the target domain records stored (i.e., summary vectors for documents and sub portions thereof). The term vectors are also used by this system to compute the query vectors. The CPU [2], data storage [4], and program storage [6] further provide the means for comparing the similarity of query vectors and summary vectors, and using the resulting information in retrieval and ranking of target domain records in response to queries. The output device [3] may be any device for printing out and/or displaying the ranked records [and/or selected sub portions of said records] retrieved from the stored target domain documents in response to queries. This output data may be presented to the user on a video display terminal (using a window based interface). Alternatively, the output device [3] may be used for displaying visual representations, such as clusters of dots or icons, of the output records (and/or sub portions of said records) on a video display screen. The system depicted in FIG. 1A may use as its CPU [2] a mainframe computer, a sufficiently powerful personal computer, an intermediate sized computer, or any other computer device known or used in the art. The RAM [5] may be any type of RAM known or used in the art. Data storage 4 may be ROM and/or disk storage apparatus, for use with the CPU [2].

The system is preferably capable of handling very large bodies of documents (particularly from multiple target domains), perhaps extending into the millions or tens of millions. A preferred architecture supports operation in a distributed data/distributed processor environment. It may be operated on any platform operating system and user interface of suitable flexibility and power, such as for example: XWindows/MOTIF, Sun/OS Sun View, Microsoft Windows, VAXNMS, and like systems.

The training corpus used to generate the source-domain-specific term vectors is preferably sufficiently large and well defined so that the vector relationships are stable with sample size. The training corpus is preferably large enough so that the statistics of word co-occurrence (which the vectors represent) will not change significantly if measured on a larger training corpus of domain specific material.

The corpus is preferably chosen randomly from the domain and should constitute a "sizable subset" of the records available from the (source) domain. Suitable criteria for selection of the size of the training corpus are discussed in U.S. Pat. No. 5,794,178 and No. 5,619,709. Although these references pertain to conventional text searching applications, and do not mention the specialized application according to one embodiment of the invention, some of the basic principles provided in the references in regard to training corpus selection extend to the preferred embodiments of the instant invention. It has been observed that a training corpus size of between about 20 and about 1000 megabytes of ASCII text is suitable to the practice of this invention [wherein a "byte" has its standard meaning of 8 bits]. Preferably the training corpus size is between 50 and 500 megabytes, more preferably between 75 and 400 megabytes, still more preferably between 100 and 400 megabytes, even more preferably between 150 and 350 megabytes, and most preferably between 150 and 300 megabytes of text. The preferred form of text is ASCII. It is preferred to convert other forms of text into ASCII text before use in the instant invention.

Although the number of individual records (i.e., documents) in the training corpus is not critical, this corpus should preferably be divided into a plurality of records, more preferably at least 100, and most preferably between 1000 and 50,000 (depending upon their length). The records in the training corpus should most preferably be different in content (i.e., all distinct individual records).

The major portion of the training corpus text is preferably taken from the source domains, although a minor portion may optionally be taken from the target domains in order to supplement the training corpus. If target domain material is used in the training corpus at all, it is preferable that it constitute a minor portion relative to the source domain material (as compared in relative numbers of bytes of ASCII text). The training corpus consists of at least about 55% source domain material, more preferably at least about 60% and even more preferably at least about 75% and most preferably at least about 80% source domain material. If the overall size of the training corpus is small, then the proportion of source domain material (measured in bytes of ASCII text) should be even higher. If the training corpus contains less than 100 megabytes of (ASCII text) material, then source domain material preferably composes at least about 70% of the training corpus, preferably at least about 80%, and most preferably at least about 85% of source domain material. The absolute and relative volumes of information in the training corpus may be approximated by the absolute and relative numbers of documents in the training corpus, if all the documents within the source and target domain samples selected for use in the training corpus contain about the same average volume of information in the form of text (measured in bytes of ASCII text) per document.

If more than one target domain is used and it is decided to supplement the training corpus with material from target domains at all then, it is additionally preferred that all target domains be represented and that material (i.e., ASCII text) taken from any single one of said multiple target domains not constitute more than about 25% of the information in said training corpus and most preferably not more than about 20% of the information in said training corpus (as measured in bytes). It is important to note that this latter restriction on the representation of individual target domains from within a plurality of target domains is in addition to (and separate from) the former limitations (discussed above) on the total amount of target domain information (from all target domains combined) which may be included in said training corpus.

The training corpus is used to obtain the source-domain-specific term vectors used in subsequent searching, and is distinct from the body of information being searched. Except for the possibility of using a minor relative proportion of target domain material in the training corpus, the body of material being searched is distinct from the training corpus. In most practical situations, the body of target domain material being searched will be much larger [as measured in bytes of ASCII text] than the training corpus (although this need not always be the case). This body of target domain material for searching [hereinafter the "search domain"] may be quite large. The upper limit on its size is determined by the information processing and storage capacities of the computer hardware used. The lower limit on search domain size will be determined by the needs of the user. The hardware may be scaled to match the size of the search domain. The composition of the search domain need not be static. Additional target domain material, and/or new target domains, may be added to the search domain and searched after the term vectors have been set. This is because it is the training corpus that is used to set the term vectors, and the training corpus is a separate (representative) body of information.

The search domain preferably contains at least 1000 distinct individual records and may contain several million. Each target domain within the search domain preferably contains at least 100 distinct individual records, preferably at least 1000, and may contain a million or more records.

It is preferred that the search domain always be substantially free of material from the source domains. Otherwise, the system will simply retrieve the source domain material, and rank it higher in relation to the target domain material, in response to user queries formulated with terms from the source domains. This would overload the user with known (i.e., source domain) material, and would not provide an efficient (selective) process for discovering semantically distant analogies. Therefore, the initial composition of the search domain, as well as any subsequent additions to it, should be substantially free of source domain material. This exclusion extends to, but is not limited to, those source domain materials used in constructing the training corpus. There is a considerable degree of freedom as to how said source and target domain materials may be kept separated. Preferably, source domain materials should be kept out of the search domain materials during the assembly of the latter. However, it is within the scope of the invention to search a combined corpus and then extract the source domain records from the output after the fact, provided that the source domain records are indexed or otherwise made clearly identifiable from the target domain materials. Source domain materials might thereby be easily and systematically removed from a ranked list obtained from a query on a combined corpus, leaving behind a ranked list of only target domain records (i.e., prior identification, in this case, amounts to separate handling). This mode of operation, however, can detract from the efficiency of retrieval from the target domains.

The selection of source and target domains and the assembly of bodies of records from said domains for use in this invention is described in greater detail hereinbelow. It is preferred that the search domain be "substantially free" of source domain material. Specifically, it is preferred that the number of source domain records in said search domain is always less than about 10% of the total number of records in said search domain. Preferably, the number of source domain records in said search domain is always less than about 8%, more preferably always less than about 5%, still more preferably less than about 2%, even more preferably less than about 1%, still more preferably less than about 0.1%, and most preferably about 0% of the total number of records in the search domain. Note that the restriction in this instance is measured in relative numbers of records, as opposed to relative volumes of information in bytes. The composition of the training corpus (discussed above) is defined in terms of relative numbers of bytes (i.e., of ASCII text) and not in terms of numbers of records. The focus on numbers of records in this instance (defining the search domain) is due to the fact that it is records (i.e., individual documents) that the user actually retrieves (and ranks, or clusters). Records are the discrete packets of information which the user retrieves, ranks, and/or clusters by employing the computer-implemented method of the invention. In order to avoid information overload (i.e., to focus on novel connections, while avoiding being buried in known material) it is important to minimize or eliminate from the search domain records which pertain to the source domain. The search domain is preferably substantially free of records containing characteristic terms from the source domain (or any synonyms thereof), and said search domain is most preferably devoid of records containing said characteristic source domain terms (or any synonyms thereof). The characteristic source domain terms are those used in constructing the body of records which represents the primary source domain (discussed further hereinbelow) in the training corpus, are also the terms for which it is sought to find semantically distant analogies (in the selected target domains).

There is considerable latitude within the scope of the invention in defining what constitutes a record (i.e., the individual information packets.-which the user searches through and manipulates) in setting up the search domain. The definition of individual records should suit the needs of the user. Records may optionally therefore be non-uniform in terms of the volumes of information (in bytes) which they individually contain. In the preferred embodiments of the invention (wherein records are documents, in ASCII text), the documents (records) may be selected from any available sources and used as is. They may also optionally be combined into larger groups, rearranged and reassembled into new documents, or broken down into smaller documents (optionally of a uniform length), or any combination thereof. It is most common and generally preferred to use documents on an as-is basis, combined with provisions for optional ranking and/or highlighting of selected sub-portions within the individual documents (as discussed hereinabove, and further below). Such optional ranking/highlighting of sub-portions is preferred, since this generally avoids the necessity of having to read whole documents once they are retrieved.

Documents used as records in the context of the present invention are preferably constructed or defined so as to contain a plurality of terms (words). Preferably, they should contain a plurality of sentences. Examples of suitable types of documents which may be used as individual records in practicing the instant invention include (but are not limited to) patents, scientific papers, professional journal articles, magazine articles, newspaper articles, book chapters, abstracts, reports, combinations of these, and the like. These types of records may be used in compiling the search domain or the training corpus. The documents are preferably available in electronic form or are capable of being rendered in electronic form in a reliable way.

The selection of source and target domains is largely determined by the needs of the user. Moreover, a plurality of source domains and/or a plurality of target domains may be used. In the situation wherein more than one source domain is used, it is preferred that the source domains be related. The source domain(s) are preferably areas of knowledge with which the user of the system has some familiarity. They may, for example, be areas of knowledge in which the user is an expert and/or for which the user seeks to find new practical applications (i.e., for products or classes of products within the source domain). An example, as discussed above, is the domain of polyurethanes. The source domain may be as broad or as narrow as the user's needs require, provided that it can be clearly distinguished from target domains, is well defined, and further provided that a sufficiently large training corpus can be assembled (as per the training corpus size requirements described above). Once a source domain is selected it may sometimes be advantageous to select other closely related domains as additional source domains, and to include records from these related domains in the training corpus. For example, the domain of polyurethanes is included within the broader domain of polymer technology, which is in turn included within the still broader domain of chemistry. The training corpus should, however, support the terms which the user is likely to employ in constructing queries on the target domains. For example, if the user is primarily interested in the domain of polyurethanes [i.e., in finding analogies to terms from that domain] then the terms characteristic of the polyurethanes domain should be well represented in the training corpus, so that domain-specific term vectors for those terms are generated as abstract representations of those domain terms for application in subsequent searching.

The domain of primary interest (as source domain) to the user is the domain from which he will be constructing queries [or from which he has selected terms of interest, for finding analogies]. This will hereinafter be referred to as the "primary source domain", as distinct from "supplemental source domains" (as alluded to hereinabove). The supplemental (or secondary) source domains are optional and, when used, are preferably domains which encompass the primary source domain [i.e., in the same sense that polymers encompass polyurethanes, and chemistry encompasses polymers].

A preferred embodiment of the invention uses one source domain which supports the terms to be used in constructing queries, and no supplemental source domains.

Supplemental source domains, when used, should be semantically distant from target domains, but semantically close to the primary source domain. Supplemental source domains are not to be confused with the minor amount of target domain material which is optionally used to supplement the training corpus (as discussed hereinabove). The latter is not source domain material.

Supplemental source domain material may be distinguished from primary source domain material (as discussed hereinabove) in that the records (i.e., documents) which comprise said supplemental source domain material do not comprise any of the specific terms (i.e., words or word stems) used in defining the primary source domain or known equivalents of those terms. These terms (or known equivalents thereof) used in defining the primary source domain are the terms which the user desires to employ in constructing queries on the target domains. Supplemental source domains, when used, are preferably closely related to the primary source domain in an indirect way, and most preferably this indirect relationship is a generic/specific relationship (as in the above example of polyurethanes as a specific domain of polymers within the larger domain of all polymers).

When supplemental source domain materials are used, it is preferred that they constitute a relatively minor portion of the total source domain material in the training corpus. In other words, of all the source domain materials in the training corpus, the primary source domain materials should account for a significant portion thereof. Specifically, primary source domain records preferably constitute most of the information (in bytes) within the total body of source domain records selected for use in the training corpus, preferably at least about 60% of said information, more preferably at least about 70% of said information, and most preferably at least about 75% of said source domain information—the preferred form of the material (information) being ASCII text documents. If the size of the training corpus is smaller than 100 megabytes (of ASCII text) then the primary source domain information should comprise at least about 75% of said source domain information selected, and preferably at least about 85% of said total source domain information selected. Note that the focus here in defining the composition of the source domain [as was the case with other aspects of the overall training corpus, discussed previously] is at the level of information content (in bytes) and not on relative numbers of records (i.e., documents). Relative numbers of records may optionally be used to approximate information content if the information content of the individual records used is, on average, constant. However, when this approximation is used, care must be taken that document sampling does reflect the information content of the various categories defined above. This is more likely to be the case when large numbers of documents are used. The primary source domain records used in the training corpus should preferably be a plurality of records, more preferably at least 100, and most preferably between 1000 and 50,000 individual records.

The target domains are any areas of knowledge of potential interest or value to the user, wherein the target domains are semantically distant from said source domains. The materials (i.e., records, preferably ASCII text documents) from the target domains together constitute the content of the search domain. A plurality of target domains may be used, if desired. The various target domains need not bear any a priori relationships to each other, except that they are of possible interest or value to the user. All target domains are preferably semantically distant from all source domains, and particularly from the primary source domain. Unnecessary target domains (or extraneous materials in general, even if it is semantically distant from all source domains) which are not relevant to the needs of the user should not be included in the search domain, as this can detract from the efficiency of the system in finding the most useful semantically distant analogies. Preferably, the individual target domains should be narrowly defined, and capable of being searched independently of each other.

Selection of target domains need not be related in an a priori way to the content of said target domains [except that whatever content is ultimately selected must be semantically distant from the source domains]. Target domains may, for example, be selected based on economic criteria such as the market sizes for and/or the selling prices of products represented therein. Target domains may likewise be selected on the basis of which companies are known to be active (i.e., to be selling products or doing research) in said domains. Target domains may also be chosen completely at random (provided that the requirements for semantic distance thereof from the source domains are met). Target domains may be selected automatically and continuously (optionally in real time) from any available external sources of information such as news feeds, trade literature, company literature, patents, scientific papers, or like materials, provided that provision is made for selecting only those materials (i.e., preferably whole records as provided by the supplier, but optionally also portions thereof) from said continuous information feeds which are semantically distant from the source domains, and in some way user relevant.

As noted in the Background section, there are several methods which can be used to facilitate the automated generation of the abstract representations of terms [term vectors] from the source domain (as represented by the training corpus). In principal, any automatic (and computer based) method which is capable of creating an abstract (quantitative, mathematical) representation of the selected source domain terms which accurately encapsulates their domain specific co-occurrence patterns (as a approximation to their "meaning" in the domain) would be suitable for use in the instant invention. Some preferred methods are described in U.S. Pat. No. 5,619,709 and in related U.S. Pat. No. 5,794,178. It is important to note that the term vectors described in these references [called "context vectors", or "CV"s] are fixed length vectors (preferably all unit length vectors) in a high dimensionality space. The CVs typically are made up of 200 or more components. The preferred ranges on the number of components (orthogonal dimensions, in the high dimensionality space) are described further below. It is also important to note that the absolute orientations of the preferred term vectors in the high dimensional space is not relevant; rather, it is the relative orientations (i.e., of the individual vectors with respect to each other) that captures the unique relative proximity of meaning (semantic content) between terms which is characteristic of the source domain [domain specific term co-occurrence patterns]. In this way the relative meaning of terms is represented in a quantitative (geometric) way. Relative meanings of terms in the context of the source domain can be quantitatively compared simply by calculating the dot products (inner products) of their vectors. Geometrically this is equivalent to comparing the relative alignment of the vectors in the high dimensionality space ["semantic" space]. A high overlap (corresponding to a high dot product) indicates a close similarity of meaning. On the other hand, terms having dissimilar meanings have term vectors which are orthogonal (or nearly orthogonal) in the semantic space (i.e., have dot products of zero or close to zero). Likewise, quantitative semantic comparisons between higher order text structures (i.e., documents, paragraphs, etc.) can be made by calculating the dot products of their corresponding vectors. The vectors corresponding to these higher text structures (compound structures) are, in turn, calculated from the individual term vectors (by summing). The preferred processes described in the two references cited above efficiently and accurately capture the critical domain specific information about term cooccurrence patterns by finding [automatically from the training corpus] a set of fixed length vectors whose relative orientations in the high dimensionality semantic space encapsulates this information. These preferred methods are also preferred for use in term vector generation in the context of the instant invention.

Figure 1B:
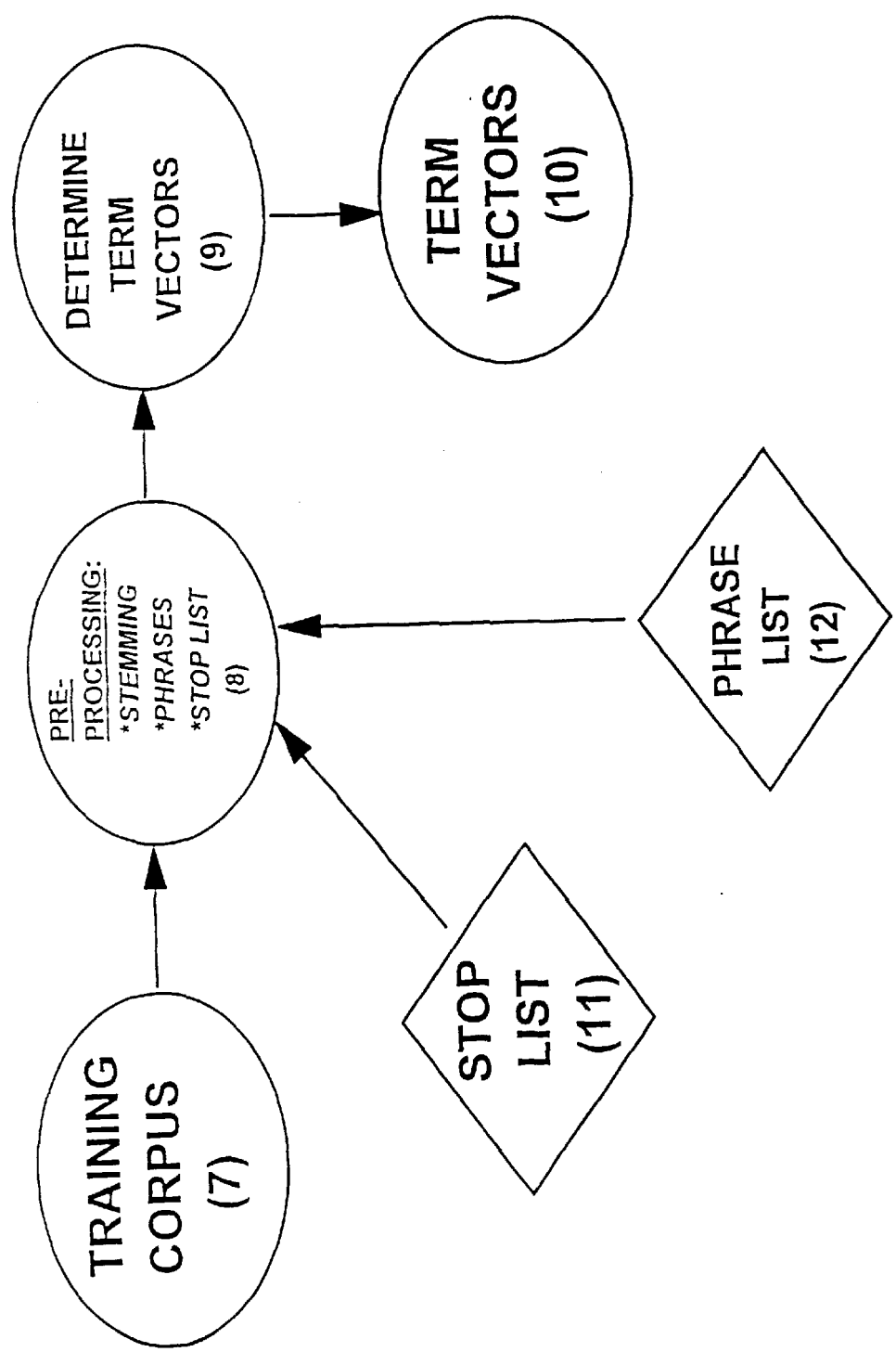
FIG. 1B is a flow diagram illustrating a process for extraction of term vectors according to one embodiment of the invention.
Figure 1C:
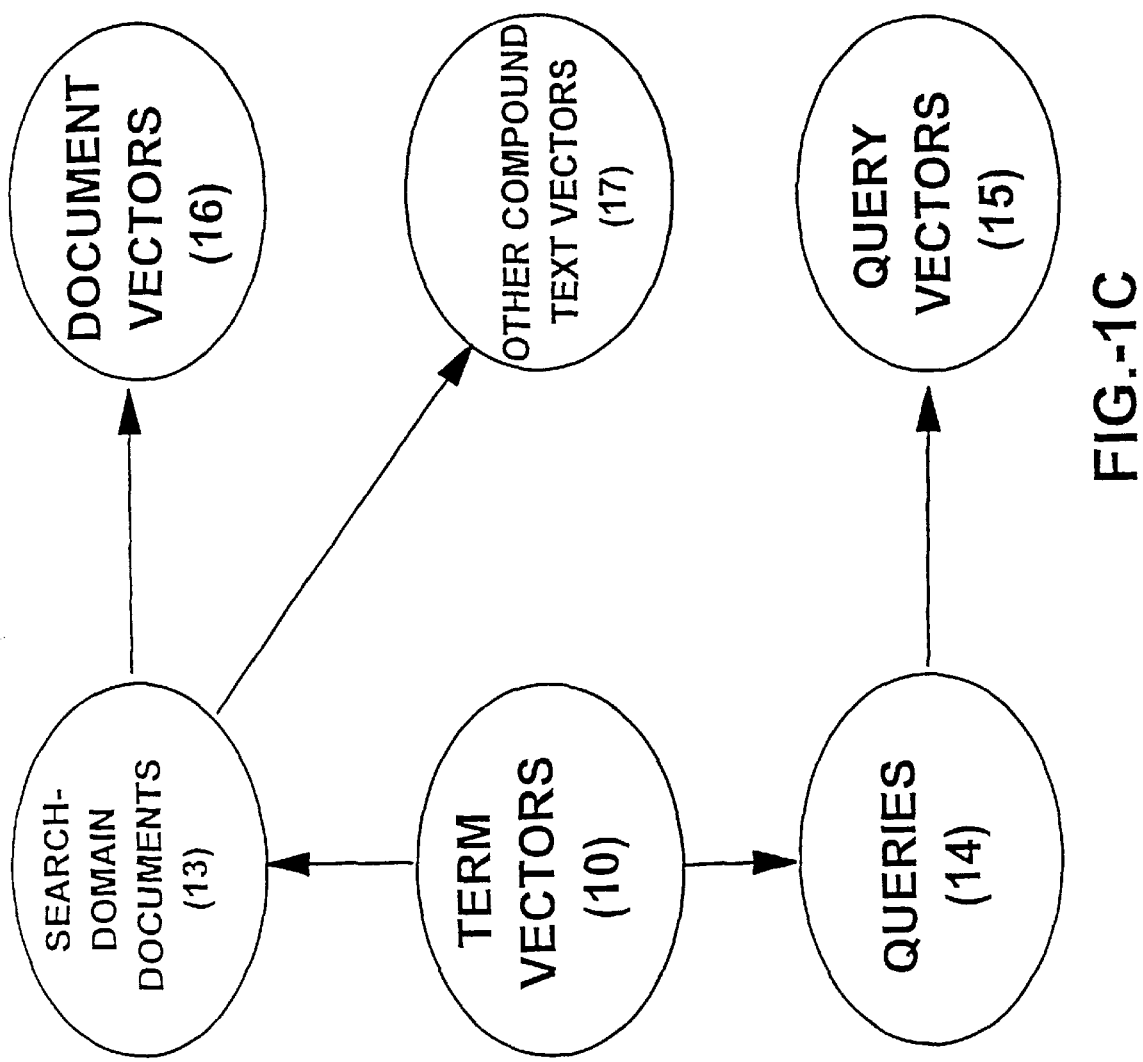
FIG. 1C is a flow diagram illustrating a process for determining vectors of higher order text structures according to an embodiment of the invention.

FIG. 1B is a schematic of the process for extraction of term vectors from the training corpus [7].

The training corpus [7] is first pre-processed in a preprocessing step [8] to remove "stop words", conduct "stemming" of words, and consult a "phrase list" [12]. This preprocessing step is not essential to the practice of the instant invention, but is highly preferred. The purpose of the "phrase list" is to specify certain compound expressions (phrases) which the user may desire to treat as single terms. These compound expressions often have domain specific meanings and, to this extent, their inclusion on the phrase list [12] is highly preferred. The phrases on the phrase list [12] are identified for treatment as single words and will therefore receive individual term vectors as if they were single words. The individual words that make up the compound expressions (phrases) will themselves be treated as independent terms when they are used outside the compound expressions (concurrently with, but separate from, the compound expressions). A phrase list may optionally be employed in any embodiment of this invention.

"Stemming" is a term well known in the field of text searching and refers to the process of reducing words to their stems (i.e., the word "processing", "processor", and "processed" share the common stem "process" and may sometimes be treated alike). Stemming generally increases the effectiveness of the vectorization (term vector generating) process but is not essential. If stemming is employed, it is not essential that all words in the training corpus be reduced to their stems. In some cases (i.e., when certain specific words are of particular importance to the user) designated individual words may be treated (i.e., assigned term vectors) without stemming, while other words in the same training corpus may be stemmed prior to vectorization. All "word senses" (found in the training corpus) of words not stemmed (unless they are on the stop list) will be assigned separate term vectors. A list of words which are to be exempted from stemming is called an "exception file" (not shown in FIG. 1 B). There are varying degrees of "stemming" known in the art. A preferred form of stemming in the context of the instant invention is a limited form which involves only the removal of inflectional suffixes from words (i.e., reducing plural words to the singular form).

The "stop list" [11] is a list of very common words ["stop words"] which are deemed uninteresting and therefore not to be considered in the vectorization (term vector setting) process. Use of stop lists is preferred. A stop list is not, however, essential to the practice of this invention. Examples of preferred stop list words include prepositions, conjunctions, and other common words that occur in most sentences and rarely if ever have any domain specific usage. It is preferred to stop list such words. A typical stop list contains from about 50 to about 300 of the most frequently used words in the language (i.e., English). All words, stems, and/or designated exact phrases [defined at user discretion] in the training corpus which are not on the stop list make up the "selected terms" for use in the generation of term vectors. These are the selected terms for which term vectors are generated. It is critical that all domain specific terms for which it is desired to find semantically distant analogies be among the "selected terms" [which will therefore be used in the vectorization process] and therefore not on the stop list. It is preferred that most (ideally all) terms in the training corpus which have any source domain specific meaning be among the selected terms (i.e., not among the stop listed words). Preferably, any term which is even suspected of having a domain specific usage should be among the selected terms (i.e., not a stop word). If any doubt exists about the importance of a term in a source domain, it should not be stop listed.

The set of "selected terms" used for generation of term vectors (i.e., all those terms not on the stop list) is a very large body of terms, usually consisting of a majority of the terms from the original (un-preprocessed) training corpus. This set of "selected terms" for generation of term vectors (i.e., those not on the stop list) is usually much larger than the "user chosen subset" of terms intended for the determination of semantically distant (cross domain) analogies. The size of the former set of terms is typically in the thousands, whereas the latter (subset) is typically less than about 100 and may be just one or two terms. Many of the terms in the former (larger) set of "selected terms" will be common to both the source and target domains, whereas the latter small "subset" of user-chosen terms are most preferably unique to the source domain. The former set includes, but is larger than, the latter.

After the (optional) pre-processing stage [8] [FIG. 1B] the training corpus is used to compute term vectors for selected terms (i.e., terms not on the stop list, if a stop list is used) in order to capture the source-domain-specific relationships between the terms. As noted before, the expression "terms" encompasses stems, unstemmed words, and any exact phrases (from phrase list [12]) remaining in the corpus. The term vector computation process (vectorization) is box [9] in FIG. 1B. The computation yields term vectors [10]. A vectorization process is described in U.S. Pat. No. 5,619,709 and may be used in the vectorization process of the present invention. A preferred vectorization process for use in the instant invention is described below. The preferred process is an iterative "bootstraping" process which uses a neural network operating on the training corpus, to develop term vectors for individual terms based on proximity to other terms.

Figure 2A:
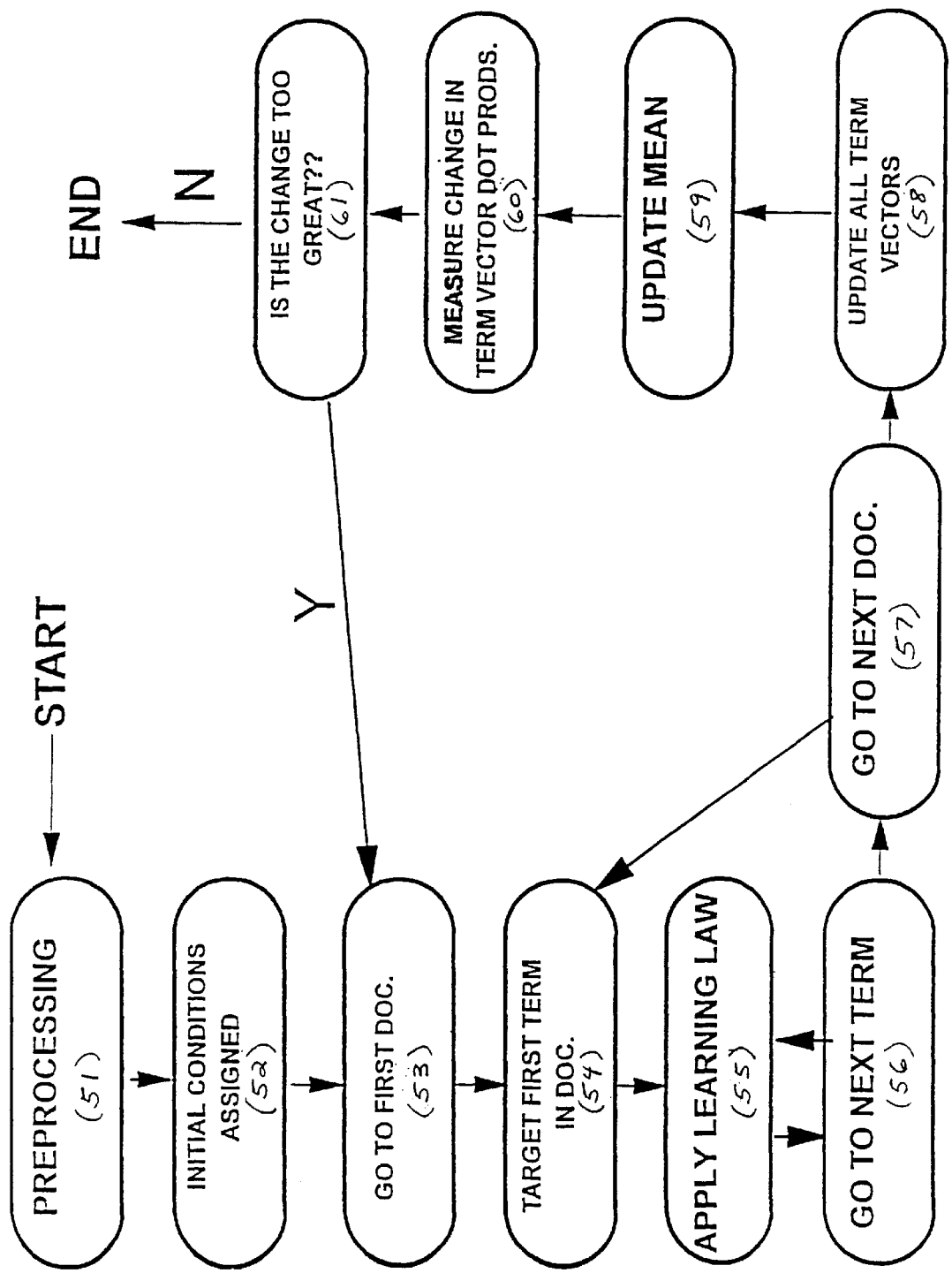
FIG. 2A is a flow diagram illustrating a process according to an embodiment of the invention.

The preferred vectorization process, in one embodiment of the invention, is shown in the flow chart of FIG. 2A. After.preprocessing [51], which corresponds to box 8 of FIG. 1B, the system assigns initial conditions to each term remaining in the corpus [52]. The initial conditions are a set of preliminary term vectors which consist of randomly assigned component values (for each vector) in each of the dimensions of the high dimensionality vector space [semantic space]. The random component values are generated using a random number generator such as a zero mean, unit variance Gaussian random number generator. The randomly assigned preliminary term vectors provide an initial condition which closely approximates mutual orthogonality of all vectors in the semantic space. The number of components of the term vectors (i.e., the number of dimensions in the semantic space) is preferably between about 200 and about 1000, more preferably from about 280 to about 800.

The system then targets the first document [53] and the first term in the first document [54], applying a learning law [55] to the first term. The system moves on to the second term [56] and again applies the learning law [55], moving term by term until it reaches the end of the first document. The system then goes to the next document in the corpus [57] and targets the first term therein [54], applying learning law [55] and then moving to the next term [56] in the document, etc. This process is repeated, document by document [57], until the entire corpus has been processed once. At this point an update [58] is applied to all the term vectors and the process is repeated at 53 using the updated (intermediate) term vector values.

It is within the scope of the invention to compute vectors for compound text structures in the corpus (i.e., document vectors) concurrently with, or subsequent to, the process for setting term vectors. However, it is not essential to compute vectors for compound text structures in the training corpus since the purpose of this invention is not to conduct retrieval from the training corpus or the domain which it represents. Vectors for compound structures in the training corpus (such as document vectors) may sometimes be helpful in determining if a condition of vector stability has been achieved, but this determination can be made in other ways discussed below.

The overall cycle in FIG. 2A, 53–61, is repeated until stable vector values, representing the natural term co-occurrence relationships in the corpus, are obtained. Various methods may be used to determine if sufficiently stable term vectors (i.e., stable from one iteration of the cycle to the next) have been obtained. One suitable method is to pre select a set of terms (important to the user) and calculate the dot products between pairs of different terms in this selected group at the end of each iteration [60]. The change in these dot product values from one iteration to the next can be compared [61] to some predetermined value, perhaps as an average of several different dot product measurements for several term pairs, and the result used to trigger another iteration (i.e., if the change in the average dot product is larger than some pre-set value) or stop the process. The process proceeds until stable dot products are obtained. The change in the dot product values between selected term vectors (said change measured between the last two iterations of the training cycle) should be as small as possible, in order to ensure that the natural term co-occurrence relationships in the corpus are accurately represented in the abstract representation (set of term vectors). The absolute values of the percentage change in the dot product values for the selected term pairs should not be more than about 20%, in the last two iterations of the cycle. Preferably these dot product values should not change more than about 15% between the last two iterations of the cycle, more preferably not more than about 10%, still more preferably not more than about 5%, yet more preferably not more than about 2%, still more preferably the change should be less than about 1%, and most preferably less than about 0.1%. More iterations should be conducted if the term vectors are not stable (as indicated by excessive change in dot product values between iterations). Optionally one may also look at dot product stability (between successive iterations) for selected pairs of documents (by comparing the dot products of the corresponding document summary vectors) in order to help determine if vector stability has been achieved. It is not essential, however, to use document vectors in this stage.

Figure 2B:
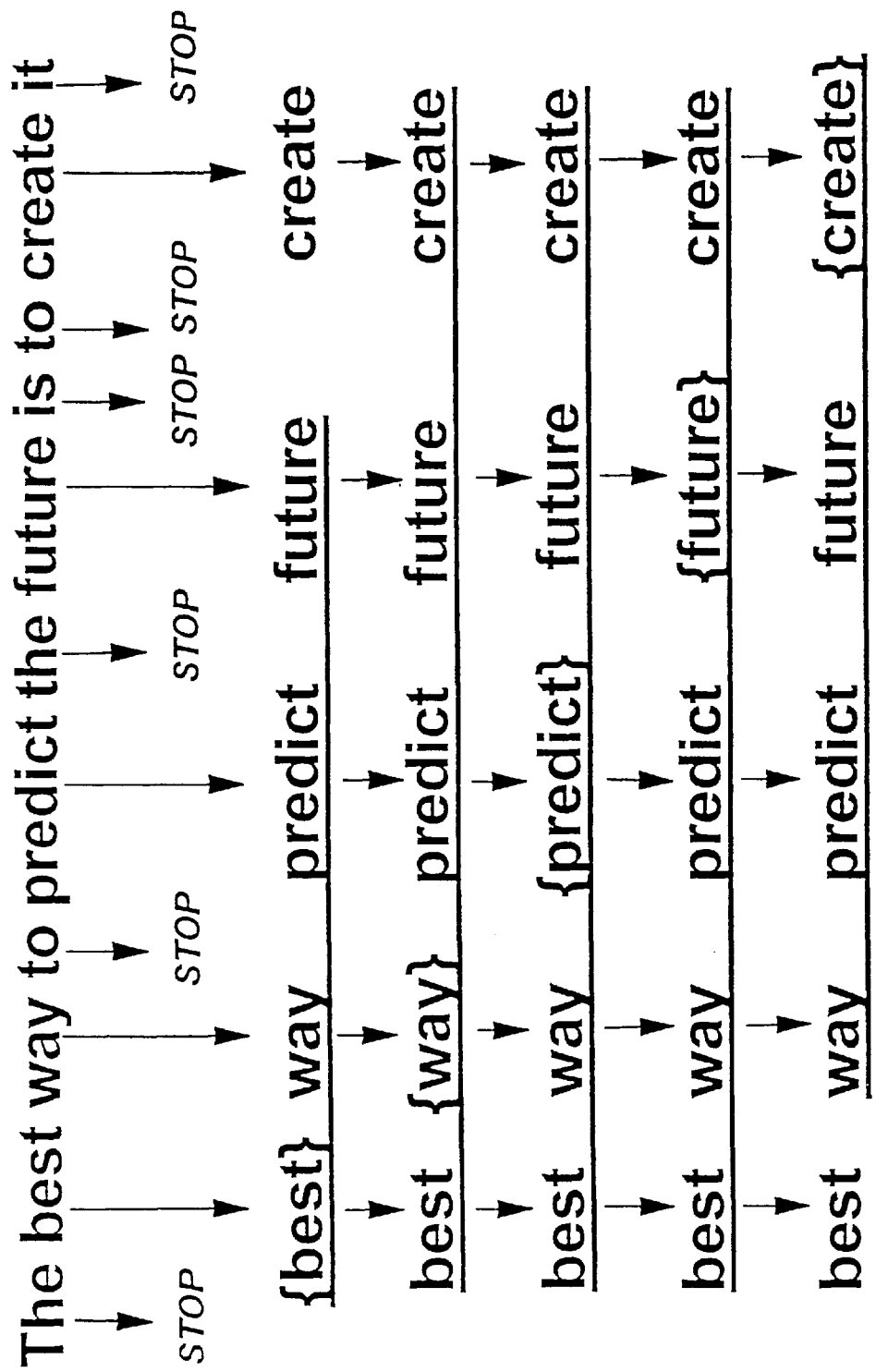
FIG. 2B is a flow diagram illustrating another process according to an embodiment of the invention.

As each term is targeted by the system in the process of FIG. 2A, a learning law [55] is applied to the term. The learning law is used in calculating an adjustment to the intermediate vector for the term prior to the next iteration of the cycle. In a preferred embodiment this step of the cycle involves a number of substeps. These are outlined for the processing of a very short sample document in FIG. 2B. A window is first placed around the first targeted term. The window consists of a fixed number of terms on either side of the targeted term. In a preferred case, this window includes three terms on either side of the target, although windows of other sizes (preferably wider ones) may be used. If the targeted term is at or near the beginning or the end of the document, then the number of neighboring terms in the window may be less than three [as shown for the short document in FIG. 2B]. In FIG. 2B the window is the set of words underlined and the term in brackets is the targeted term. The other words in the window are the neighbors of the targeted term, which are considered as "influencing" the term vector of the targeted term. As seen in FIG. 2B, the window moves through the document as successive terms are targeted. Any exact phrases (specified in pre-processing) are treated as single terms. Words on the stop list ("stop words") are ignored.

For each targeted term the term vectors of the neighbors in the window are used to calculate an adjustment (i.e., to influence) the term vector of the target. The relative influence (adjustment) due to each neighbor in the window is determined by a combination of proximity to the targeted term [closer proximity means a stronger influence], and the frequency of the neighbor term in the corpus [lower frequency in the corpus translates into greater influence].

The preferred mathematical formulas used in the calculation of term vector updates (at the end of each iteration of the cycle) are provided in FIG. 2C. These six equations comprise the "learning law" used in FIG. 2A, 55. It is to be understood that other types of learning laws are known and may be used (instead of those discussed here) in practicing the instant invention.

In Equation 1 of FIG. 2C an "error", $E(i,j)$, is defined for the i th neighbor of the j th target term. In this equation $N(i,j)$ is the term vector for the i th neighbor in the window of target term j, and TO) is the term vector of target term j (i.e., the intermediate term vector, for which an update is being calculated). This error is the difference between the neighbor term vector and the target term vector.

Equation 2 of FIG. 2C is used to calculate a correction $C(j)$ for the target term vector TO). This correction depends on the error $E(i,j)$ and, a proximity constraint alpha (i.e., $a(i,j)$) which limits the correcting effect of the error ($E(i,j)$). The limit to the summation, "WS", is the window size (in terms). A proximity weight for each neighbor term may be applied if desired, in calculating the correction, CO).

Equation 3 of FIG. 2C is used in determining the proximity constraint alpha [$\alpha(i,j)$], as input to Equation 2. The constraint alpha prevents collapse (convergence) of the term vectors during multiple iterations through the corpus. Alpha determines the minimum angle between the vectors of the terms i and j and thus the maximum dot product, or overlap, between them. Alpha is in turn related to the overall frequencies of the j th term and the i th neighbor in the training corpus. Terms which occur less frequently in the corpus are said to have higher "importance", and exert a greater influence on the term vectors of targeted terms to which they are neighbors. In general, this helps to assure that, if two terms are both "important " and co-occur, that their term vectors should have a high dot product (indicative of high vector overlap, and therefore a strong similarity of usage or "meaning" in the domain represented by the corpus).

Equations 4 and 5 of FIG. 2C are used in computing the "importance" values for the j th term and the i th neighbor term, which are in turn used as input to the calculation of alpha (proximity constraint) in Equation 3. The numbers NDO) and ND(i) are the numbers of documents in the corpus in which the j th and the i th terms respectively appear. The number TND is the total number of documents in the training corpus. The number B is a predetermined lower bound to the "importance" metric in each of these expressions. The "importance" metric may vary from the predetermined lower bound B to a maximum value of 1.0.

Equation 6 of FIG. 2C is the formula used for computing the "new" value of each term vector $T(j)$ from its "old" value, in going from form one iteration of the cycle to the next. Input for this formula include the old value of $T(j)$ from the previous iteration, the correction value $C(j)$ from Equation 2, the "mean" term vector M (for all unique term vectors in the corpus), the total number of occurrences of term j in the training corpus, $F(j)$, and a predetermined step size (learning rate), gamma. This updating formula for term vectors is not actually applied until the end of a given iteration (i.e., the end of a complete pass through the corpus). Corrections are summed during a given iteration and then applied (updated, using this formula) at the iteration boundary [FIG. 2A, 58]. The mean term vector M is then updated (i.e., using the new term vector values), at the iteration boundary [Step 59, of FIG. 2A]. The updated values of all term vectors and M are then used in the next iteration (if there is one).

The iterative process is automatically terminated when an acceptable condition of vector stability has been reached (see above). This determination is shown in FIG. 2A, 61. The final values of the term vectors are then stored.

The iterative bootstrap method (described hereinabove) is the preferred method for computation of term vectors from the training corpus, for use in the practice of the instant invention. Nevertheless, it is within the scope of the invention to use alternate methods for computation of suitable term vectors.

Alternative methods for the development of term vectors from the training corpus include the method of "singular value decomposition" [SVD]. More detailed information on the use of this method in generating term vectors of terms from a corpus of records is provided in U.S. Pat. No. 4,839,853; U.S. Pat. No. 5,619,709 (Column-16 Line-5, through Column-24); and *J. Am. Soc. Infor. Sci.*, 41(6): 391–407, 1990. These.documents are incorporated herein fully by reference. According to one example of this general method, a large term-by-document [t X d] matrix is first created from the training corpus, containing terms remaining in the corpus after the post processing step (described above). The terms used may include all the terms which remain after post processing, a subset of several thousand (i.e., 2000 to 8000) core terms which are believed to be particularly important in the domain represented by the corpus and/or which occur with high frequency in the corpus, those terms which occur in more than one document in the corpus, or any combination of the latter two options. The training corpus serves its usual role as large "cooccurrence example" In view of the fact that a typical training corpus will generally contain thousands of documents (i.e., 1000 to 10,000), it is clear that the size of the initial term by document matrix may be quite large.

The objective of SVD (as in the case of the iterative bootstrap process described above) is to determine from the corpus a set of fixed (equal) length term vectors in a high dimensionality vector space [semantic space], wherein the relative orientations of said vectors encapsulates the domain specific cooccurrence statistics of the terms. The degree of similarity of usage (or "meaning") of the terms can then be directly determined by measuring the degree of overlap of the corresponding term vectors (i.e., by calculation of dot products between the vectors). Likewise the semantic similarity of compound text structures (such as documents) can be determined by computing normalized summary vectors for each document (from the term vectors) and measuring the degree of overlap (dot products, for example) between the summary vectors of the records (documents) to be compared. It is the relative orientations of the vectors (with respect to each other) in the semantic space, rather than the absolute orientations, which is important. It will be appreciated by those skilled in the art that many variations of the SVD process exist.

The following is an exemplary description of an SVD process suitable for use (in computing term vectors) in the instant invention. An initial term-by-document [t X d] matrix, X, can be decomposed into the product of three other matrices:

$$X=T(0)S(0)D(0)'$$

This is the "singular value decomposition" of X. T(0) and D(0) have ortho-normal columns, and are matrices of left and right singular vectors (sometimes referred to as eigenvectors). S(0) is called the diagonal (i.e., the diagonal matrix of singular values, sometimes referred to as eigenvalues). The diagonal elements S(0) are constructed to be positive and arranged in decreasing order of magnitude.

The power of SVD resides in the fact that it provides a simple means for reducing the dimensionality of the initial very large matrix "X", by generating smaller matrices (of considerably lower dimensionality) which approximately fit the initial one ("X"). The dimensionality of the new (approximate) matrix can be selected so as to be large enough to fit all the "real" structure in the data (i.e., the domain specific co-occurrence patterns of the terms in the training corpus), but small enough to avoid modeling unimportant relationships (i.e., minor variations in word usage, sampling errors, etc.). This is done by selecting only the first (largest) "n" of the singular values in S(0), and setting all the other (smaller) values to zero. The dimensionality of the new matrix is thus "n". The optimum value of "n" has been determined empirically to be on the order of 100 to several hundred. This optimum dimensionality is about the same as that used in the "iterative bootstrap" process. Selecting only the "n" highest values in S(0) gives the closest approximation (for any given value of "n") to the original matrix "X". The rows and columns in S(0) which have been set to zero are deleted, as are the corresponding columns of T(0) and D(0). This gives the new matrix of rank (dimensionality) "n":

$$X=TSD';$$ which is approximately equal to X, but of lower dimensionality.

The rows of the reduced matrices of singular vectors are interpreted as coordinates of points representing terms (or documents) in the new "n" dimensional space. Terms are in effect represented in the "n" dimensional semantic space as a linear combination of (orthogonal) components from all the dimensions (i.e., as vectors). Semantic similarity of terms is compared by computing vector overlap (i.e., the dot products of the term vectors). The degree of overlap of the vectors reflects the degree to which two terms have a similar pattern of usage (or "meaning") in the training corpus. Vector representations of higher order text structures (such as documents, and multitrerm queries) are computed from the term vectors, etc. Documents (such as queries, and updates to the original data set) can be added to (i.e., assigned positions in) the semantic space according to their summary vectors (as calculated from the terms contained in each document), without repeating the SVD analysis. In this way, new data objects, not present during the initial SVD analysis, may be assigned to the semantic space and compared [as to their similarity of "meaning", in the domain of the training corpus] in the usual way (i.e., by computation of dot products) to objects already present in the space, or to each other. Queries and new documents, added to the semantic space in this way "after the fact", are sometimes called pseudo-documents.

U.S. Pat. No. 5,619,709 describes in column 16, line 5 through column 24, a particular variation of SVD which can be used to construct a hybrid process for setting of term vectors from a large training corpus. The hybrid process may, for example, use SVD to compute vectors for a set of core terms and then use the resulting core term vectors in the iterative bootstrapping process (described above). These core term vectors may be used as the initial condition (i.e., instead of the purely random initial term vectors, normally used) for the subset of terms in question. It is claimed that this improves the efficiency of the iterative bootstrapping process by reducing the number of iterations required in computing useful term vectors for the other terms in the corpus. A hybrid process such as this one would also be suitable for use in the practice of the instant invention.

Once the desired term vectors are computed [FIG. 1B], the system uses them to compute vector representations (known as summary vectors), in the same high dimensionality semantic space, for compound text structures (i.e., documents, selected portions of documents, groups of documents, or multitrerm queries). In the instant invention this operation is performed on the contents of the isolated search domain (as defined previously), and on query statements. The summary vector of a search domain document ["document vector"], in the instant invention, is an abstract representation of its "meaning"—from the "perspective" of the knowledge domain represented by the training corpus. The search domain documents and selected portions thereof are, in effect, projected into the semantic space of the source domain (created from the training corpus). The process is outlined in FIG. 1C, and the underlying concept is presented schematically in FIG. 4.

The training corpus, which is itself well defined to accurately represent the term co-occurrence patterns characteristic of a selected knowledge domain, is semantically distant from and substantially non overlapping with all of the individual target domains (said target domains as represented in the content of the search domain). In the preferred case there are no direct matches on query terms (or any known synonyms thereto) anywhere in the content of the search domain. The fact that useful results can be obtained, under such radically different circumstances, is unexpected and surprising. It often leads to the discovery of useful and novel (completely unexpected) connections, as opposed to the simple "retrieval" of known information from a database.

Summary vectors which were computed for source domain (training corpus) records, in conjunction with optional embodiments of the term vector computation process described above, are preferably kept separate from the summary vectors computed for the search domain records.

Although pre-processing (of search domain and query statements) is not essential, it may become necessary if pre-processing of the training corpus has been used to generate stem terms therefrom. In this eventuality, it is necessary either to pre-process records in the search domain and queries in the same way as those in the training corpus (i.e., using the same stemming protocol), or else to provide some other means of ensuring that individual terms in the search domain and query statements will be properly matched to the corresponding terms from the training corpus for which term vectors have been computed. Once this has been accomplished, the search domain records [Item 13 of FIG. 1C] and query statements [14] are processed term by term, and each term is compared to the set of terms for which term vectors [10] have been computed. All terms found to be matches for terms in the training corpus for which term vectors [10] have been computed are assigned the corresponding term vectors. Any terms found not to be matches are ignored. In the most basic embodiment of the instant invention, all the term vectors assigned to the individual search domain records and multitrerm queries are added up, and normalized (i.e., the vector sum is divided by the total number of terms in the record to which vectors have been assigned). This simplest embodiment is equivalent to calculating a centroid for the record (or multitrerm query). A centroid of a record is computed by taking, in each dimension, the average of all the component values from all the term vectors assigned to the record. The position of the record or multitrerm query may then, in this simplest embodiment, be viewed as the position of its centroid (i.e., the record is said to be located at the centroid of its terms). In this way document summary vectors [16], query vectors [15], and vectors corresponding to other compound text structures [17] (i.e., sub-portions of individual documents) may conveniently be determined.

Although not essential to the successful practice of the invention it is within the scope of the invention to apply frequency related weightings to terms in the computation of summary vectors for records and queries. In a preferred weighting scheme, the vectors of terms that occurred less frequently in the training corpus are weighted more heavily in the calculation of summary vectors of search domain records (and queries). This is called inverse frequency weighting. Preferred formulas for inverse frequency weighting factors include the logarithm of the ratio of the total number of records in the training corpus to the number of records in the training corpus which contain the subject term; or alternatively the log of the ratio of the total number of words in the training corpus (all occurrences thereof) to the total number of times that the subject term appears in the training corpus. If one of these more complex embodiments is to be practiced, it is important to be consistent with regard to the weighting formula employed.

Once the summary vectors of the records in the search domain have been computed by the system, they are stored. In order to reduce search time in subsequent searches on the search domain it is preferred-to employ an automatic process which groups related summary vectors together into cluster trees. A suitable process which does this is described in the '709 patent reference [column 9, line 47 through column 11, line 4]. This process, known as centroid consistent clustering, is outlined below.

The summary vectors of search domain documents are initially contained in a single node (the top of the tree). A series of sub-nodes (child nodes) is created defining a next (lower) level. A centroid consistent clustering algorithm is used to distribute the summary vectors among the sub-nodes. A group of clusters is defined as "centroid consistent" if every member of every cluster is assigned to the cluster in the group with the nearest centroid. Centroids are computed by calculating (for each dimension of the semantic space) the average of the component values from all the summary vectors in the group. A preferred centroid consistent clustering algorithm is called "convergent k-means clustering", which is conducted as follows:

a) Start with any initial partition which groups the vectors into k clusters (i.e., using the first k summary vectors as single element clusters with the initial centroid values of the clusters set equal to its member vector). Assign each of the remaining summary vectors to the cluster having the nearest centroid and, after each assignment, recalculate the centroid for the cluster that gains a vector;

b) Look at each summary vector in sequence and compute its distance from the centroid of each of the k clusters. If the vector is not already in the cluster with the closest centroid, move the vector to that cluster and then update the centroids of the clusters that have gained or lost a summary vector.

c) Repeat step b above until convergence is achieved (i.e., until a pass through all the summary vectors produces no new assignments).

Since the process of achieving convergence may be lengthy, it is acceptable to simplify the clustering algorithm by limiting the number of repetitions of step b above. After a predetermined number of repetitions (a figure of 99 is recommended in the reference) the cluster centroids can be "frozen". A few additional passes through all the summary vectors can then be made, distributing the vectors to the appropriate clusters without updating centroids. The centroids will then be approximate (but a sufficiently close approximation for practical purposes). The final pass through the summary vectors ensures that the clusters are centroid consistent (with the approximate centroids). Each node is identified with its centroid, for use in searching.

A next level of clusters is then formed. The nodes in the level above become the parent nodes to a set of child nodes (below). Only the summary vectors assigned to a parent node are used in the clustering algorithm to form the child nodes branching from that parent. This process is repeated across the level of parent nodes and on subsequent (lower) levels, such that fewer vectors are assigned to the child nodes on each level down. The nodes thereby form the pattern of a tree. Each summary vector is ultimately assigned to a node on each level of the cluster tree. Each node has a centroid. The lowest level node assignments for each summary vector, and the centroids for all the nodes, are stored for use in searching. The bottom level nodes are sometimes called "buckets", which contain the individual normalized summary vectors assigned to them. Further details are provided in the above cited reference.

Computation of query vectors is made from the term vectors of the information elements (i.e., words or word stems) which the query contains. If the queries are, as in the most preferred embodiment of this invention, single terms which are specific to the primary source domain, then the query vectors are the term vectors of those specific terms as determined from the training corpus. If multitrerm queries are used, they preferably contain at least one term that is specific to and characteristic of the primary source domain. Selected terms within a multitrerm query may be weighted, if desired, to reflect their importance to the user. Methods for comparing the query vectors with individual records (or sub-portions thereof) are described in the prior art references cited, but the critical idea is the computation of the degree of vector overlap (between query vectors, and summary vectors from the search domain). The relative degree of overlap of the query and summary vectors may then be compared (higher overlap being indicative of greater semantic similarity, or overlap of "meaning", and hence greater query relevance). In a preferred embodiment of this invention this "overlap" is simply the dot products of the query and summary vectors. The dot product information can then be used to generate relevance ranked lists of records and optionally also to indicate the most query relevant portions within the individual records, and/or to display results in visual form (wherein records of similar semantic content appear close together, and those with very different content appear relatively far apart).

Most preferably the whole documents in the search domain are searched and ranked first. This is done by comparing the overlap in semantic space [dot products] of the summary vectors of the (whole) documents with the query vector. Display of a relevance ranked list, containing the first 50 to 200 (top ranked) whole documents, is a preferred and particularly simple method of displaying the results of a given query. The list can be scanned, in ranked order, by the user in order to identify those documents in which the closest analogies are likely to be found. Whether ranked lists or cluster diagrams (or both) are used to display results, it is preferred to rank and graph (or highlight) internal portions (such as paragraphs) within each record (i.e., document) found, from the initial whole-document retrieval stage, so that the user can quickly see the most relevant portions within each document retrieved. These most relevant portions are the most direct connections to the query, and therefore contain the most succinct and compact statements of analogies found. These "intra-record" rankings are preferably made against the same query used in generating the list (or diagram) of individual (whole) records, but without changing the initial ranking of the individual (whole) documents. The methodology for "intra-record" ranking is the same as that used in generating the initial ranked list of records. Pre-selected portions of each record (such as paragraphs and/or sentences in the individual documents) are ranked or graphed according to the relative magnitudes of the vector overlap in semantic space [dot product] of each such document sub-portion (within a given document) with the query vector. Various methods may be used to represent the comparative relevance of internal portions within individual documents. A preferred method is to have the system highlight the most relevant portions of the text of each document retrieved, optionally with a bar chart or numbering system to display the relative relevance of several different sub-sections within each document.

Figure 1D:
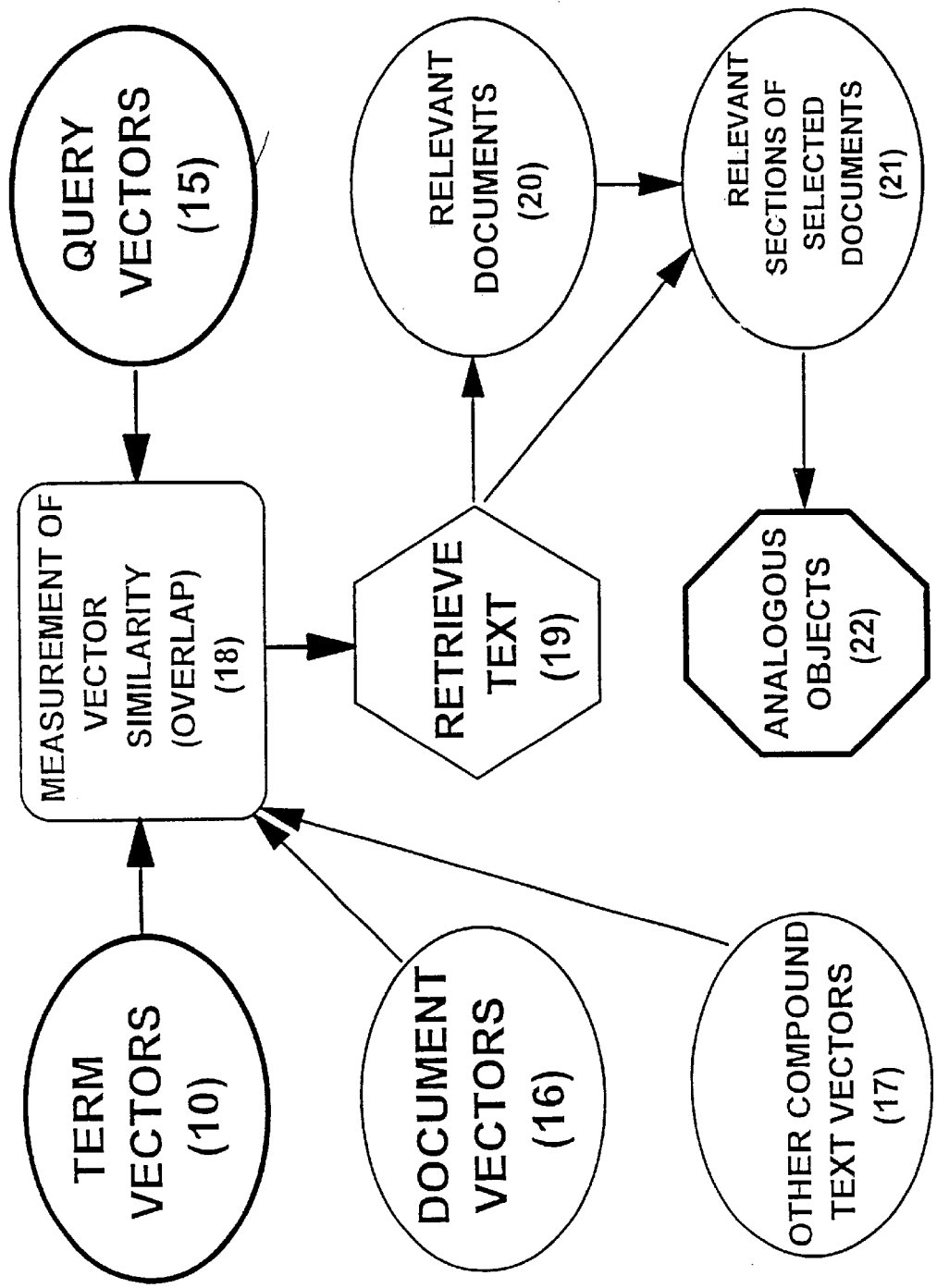
FIG. 1D is a flow diagram illustrating a retrieval process according to an embodiment of the invention.

The retrieval process according to one embodiment of the invention is outlined in FIG. 1D. The system stores term vectors [10] computed from the training corpus, query vectors [15] for queries that contain more than one term, document summary vectors [16] computed for documents in the search domain, and summary vectors of other compound text structures [17] such as pre-defined sub-portions of the documents in the search domain. Query vectors [15], which in a preferred embodiment of the invention are the term vectors [10] for a user-selected sub-set of source domain terms, are first compared [18] to the document summary vectors [16]. The document summary vectors [16] are ranked in the comparison process [18] by computation of some suitable measure of vector overlap with the query (such as vector dot products). The document summary vectors [16] are ranked according to relative degree of vector overlap with the query, and preferably are arranged in descending order (of overlap degree). At this point a subset of the highly ranked document summary vectors [16] may optionally be saved and the rest ignored in subsequent processing. Preferably, only the first few hundred (i.e., 200) document summary vectors (those having a high relative degree of vector overlap with the query vector) are considered further. This cuts down on unnecessary processing. The system then uses the ranked list of document vectors in order to retrieve [19] a similarly ranked list of actual documents from the search domain. The retrieved documents [20] may then be displayed in any number of ways (i.e., as a list of titles and/or abstracts, arranged in descending order of relevance rank).

The summary vectors of pre-defined sub sections [17] of the documents in the search domain (or preferably the highly ranked sub-set of documents) are then compared [18] to the query vector in order to determine the degree of vector overlap of these sub section vectors (compound text vectors [17]). The same or similar measure of vector overlap [18] may be used here as was employed in the initial ranking of the document summary vectors [16]. The document sub-section vectors [17] are then preferably ranked according to degree of vector overlap with the query (and preferably arranged in descending order of relevance rank), but most preferably only within the individual documents. In other words, the ranking of sub section vectors [17] is preferably conducted only in relation to the vectors of the other sub sections which occur within the same document and not to all the sub section vectors from all the documents in the entire search domain corpus. The system then preferably retrieves [19] the sub-sections of each document and displays them (according to some pre-determined display system) in a manner which indicates their relative significance [21] to the query, as each of the (highly ranked) documents is opened and scanned by the user. As the user scans the most highly ranked sub sections of the most highly ranked documents, the closely analogous objects which the system has discovered [22] are made apparent.

It will be appreciated by those skilled in the art that other methods of ranking, based on the principal of comparing relative vector overlap values, may be used alternatively. It will also be appreciated from what has been said that it would be straightforward to make modifications to the system (i.e., add post processing modules) which make explicit (and rank) the most closely analogous objects [22] in relation to the query, and also extract (and rank) the individual features of the analogous objects that caused the system to consider them to be analogous.

The search task may be made more efficient by using the preferred cluster tree storage method described below and in the '709 patent (and summarized above).

A preferred search method includes a query vector used to identify the summary vectors that are nearest in the semantic space to the query vector (i.e., by dot product computation). This search is performed with high efficiency by using a procedure known as "depth first tree walk". In this procedure a branch is followed down the tree taking the node at each level having the centroid closest to the query vector. This continues until a bottom level node (bucket) is reached. The summary vectors in this bottom node are compared with the query vector, to identify the closest summary vectors. Before a subsequent node in the depth first tree walk is checked, a determination is made as to whether the node can be completely ignored ("pruned"). ,A node is ignored if it is impossible for a closer normalized summary vector to be found (relative to the closest normalized summary vector found so far) without violating centroid consistency. If the node cannot be ignored, the nodes which depend from it (sibling nodes) are checked one by one either until a node which can be ignored is identified or until a bottom node is reached. In the latter eventuality the individual summary vectors in this "bucket" are all compared to the query, and any summary vectors which are closer than the closest summary vector thus far found are "remembered". The depth first tree walk then proceeds further with the new "closest" summary vector as the new benchmark. The depth first tree walk continues, pruning off branches of the cluster tree wherever possible, until all branches have either been checked or pruned. After the entire tree has been examined, the closest summary vector (or vectors) have been identified. The records corresponding to those summary vectors can then be retrieved and displayed as output. The most relevant sections of retrieved documents can be highlighted if desired. This is accomplished by dividing each retrieved record into several sections (i.e., representing paragraphs, etc.). A summary vector of each section is computed based on the terms in that section. The vector overlap of the section vectors with the query is then computed and compared to identify the sections within each document that are most relevant to the query.

The user may then optionally search recursively on selected individual portions of documents retrieved (or whole documents or selected groups of documents), by using them as queries in order to extract additional material with similar content to that selected. These recursive searches are sometimes referred to as "more-like" queries. These supplemental methods can be particularly helpful in the context of the instant invention since the invention may retrieve a wide range of different kinds of analogies, some more suitable to the user than others.

Although not essential to the practice of this invention, it is also within the scope of the invention to employ other user feedback techniques, in which the user's appraisal of the value of individual records (or portions thereof) retrieved in a given search is used to focus subsequent searches more narrowly onto material that the user considers relevant. The feedback may be of a positive and/or a negative nature (i.e., bipolar feedback). User feedback optimization may optionally also involve the application of vector techniques applied to the user's selections of intermediate search results (i.e., in which said intermediate selections may become incorporated into a new and separate "training corpus", in order to re-focus subsequent searching (via user-feedback "learning"). Such techniques may be applied to the target domain materials, after a user has identified (via the instant invention) a preferred set of semantically distant analogies.

A preferred embodiment of the invention uses single-term queries. Multitrerm queries may be used, but are most preferably handled by means of a categorization process. If the user is interested in finding analogies to certain source domain specific compositions or materials or relationships or functions, etc. [real world "objects"] having a combination of domain-specific features simultaneously [assuming there are no known domain-specific "exact phrases" which express the combination] an independent category for each individual term in the multitrerm query may be set up. The categories may then be individually tuned by user feedback (i.e., using selected known examples from the source domain). Each term (category) then represents an individual feature of the real object of interest. The categorization system can then easily be set up so as to return only hits on analogous objects in the search domain that are analogous in respect to all of the specified feature categories (simultaneously), beyond some predetermined threshold applied to each. In other words, all the categories must be simultaneously satisfied in order for the system to retrieve a hit (record, or record sub-portion). The individual "terms" in the multitrerm query may be individual words or stems, or exact phrases. Term vectors for each term in the query are developed in the usual way in accordance with the invention (from the training corpus). Searching of the target domains (i.e., which make up the overall search domain, as defined previously) is performed in the manner described previously according to the invention, for each term category. Ranking (or clustering) of individual hits (i.e., documents, or preselected sub-portions thereof) would be done by calculating the dot product of the summary vector for each hit with the query vector, except in this case, the query has multiple terms and so the query vector is preferably computed using term vectors from the terms in the original query. This may be done by adding up the term vectors in the query and normalizing.

The user may then consult the highly ranked output records (which, by definition, must contain only records describing analogous objects which objects satisfy each term category simultaneously) and select those of particular interest. He may optionally then search recursively (i.e., execute "more like" queries, etc., as mentioned above) using records (or sub-portions thereof) describing each new object found that is of interest. Results from said subsequent (recursive) searches could likewise be constrained by the system to fit all categories simultaneously. This procedure can greatly simplify the process of finding analogous objects which are analogous in respect of several features simultaneously to a selected real world object from the source domain. The categorization process compensates for the tendency of vector based retrieval systems to "over generalize". It forces the system to "focus" on analogous objects which have the features the user requires.

The following is an example of a search for semantically distant analogies according to the invention, involving a multitrerm query. If a user is interested in searching a set of semantically distant target domains for analogies to "polyurethane foams made with hydrofluorocarbons", he may use the exact phrase "polyurethane foam" as one term, and the term "hydrofluorocarbon" as a second term. He may then use these terms to build separate categories in the categorization system and train the system on each term independently by using selected examples taken from the training corpus. An appropriate training corpus, in this case, would contain mostly documents on polyurethane technology. A large training corpus on this area of technology would contain many domain specific examples of both terms, and would therefore be suitable for the setting of term vectors for both terms. Alternatively, a user may set up a smaller training corpus focusing on records which pertain to rigid polyurethane insulation foam technology [a sub-domain of polyurethanes technology]. It would then be preferred to make sure there are no records in the combined target domain records (i.e., the search domain) which contain any exact matches on both of the search terms simultaneously, and edit them out (if found). Alternatively, a user could insist that the search domain contain no records which mention either of the search terms individually (the choice depending on the user's needs). The editing process is described below. Term vectors would then be generated to support the two search terms (using the training corpus), and results applied in accordance with the invention (as previously described) to the identification of analogies for said terms. The categorization system would then be set up so as to accept only records [or sub-portions thereof] that describe objects which are analogous in respect of both terms (simultaneously, in the same record or record portion). These records [or sub-portions] would be ranked and displayed to the user as a relevance ranked list and/or as a cluster diagram. It is important to note that the final ranking or clustering would only be done on the records that match all the categories beyond some minimum threshold of category membership (i.e., the records or sub-portions that the system actually retrieves). Ranking or clustering would be conducted in the manner described previously (for single term queries), namely, by computation of vector dot products of summary vectors for individual records (or sub-portions thereof) with the query vector. Because this is a multitrerm query, however, the query vector must be computed from all the terms used in the multitrerm query (i.e., in this case, "polyurethane foam" and "hydrofluorcarbon").

An example of a categorization system, suitable for use in practicing this embodiment of the invention, is a software product, which operates on the "contect vector" principle. The product is designed for use in document routing applications wherein documents are automatically sorted into different categories, each category defined by terms (or groups of terms) based on a training corpus and then tuned by user relevance feedback. In this system, documents are routed (categorized), and optionally also ranked within each category, according to how well their content matches the category defining terms (or groups of terms). This matching and optional ranking is done on the basis.of vector dot products, in the manner described previously.

The words "portion", "sub-portion", "sections", or "segments" are used herein interchangeably in referring to compound text structures within records (i.e., records preferably being documents) which are less than the whole document. Said parts are preferably pre-determined (user selected) and may be relevance ranked within the whole record (against the same search queries which are applied to the full body of records which constitute the target domain(s)).

The term "analogy" as used herein, in referring to semantically distant analogies, is to be understood as: "resemblance in some particulars between things otherwise unlike" (i.e., similarity). This definition is particularly well suited to the instant invention, given that the purpose of the invention is to provide a universal method for identifying objects (as denoted by terms or sets of terms) in semantically distant knowledge domains which resemble selected objects (denoted by different terms or sets of terms) in a selected source knowledge domain. The nature of the analogy (resemblance) between objects is not specified a priori. Vector based information "retrieval" technology provides a preferable medium (i.e., a "universal meaning space") through which analogies in distant knowledge domains can be extracted by using the method according to the invention. Analogies which are closer (i.e., in the sense that the resemblance between the source domain and target domain objects may be in regard to a plurality of "particulars") are likely to be ranked more highly than analogies which are more distant (i.e., a resemblance based on only a single "particular"). The user is generally more likely to discover analogous objects which are useful to him by scanning those which are highly ranked. The user can also employ techniques of recursive searching and user-feedback to focus on particular analogies of interest once these are discovered, via the method of the invention. Finally, by insisting that the semantic distance between the source and target domains be large (as described further hereinbelow), the user can increase his chances of finding analogies (resemblances) which are not previously recognized (hence novel). It is such undiscovered analogies which can be particularly valuable in innovation. Such analogies are rarely, if ever, found by simple "key word" matching techniques, or even by thesaurus mediated word matching techniques. Given the nature of vector based "retrieval" technology, the user may be reasonably certain that he is retrieving the "closest" available analogies within any given target domain (regardless of how semantically distant the target domain is from the source domain). This is the "tension" between semantic distance and vector overlap.

By using the method of the invention it may be possible to transform the process of innovation from an active process which requires wide ranging expertise, significant talent, and hard work on part of the user, into a passive process which requires little more than a large volume of information. This potential is demonstrated in the Working Examples according to the invention discussed above.

The corpus of text chosen to represent the source domain is preferably a stable representation (i.e., stable with respect to sample size, in accordance with a single consistent method of sampling that can be used to construct text samples if different sizes) of the domain specific term co-occurrence patterns characteristic of the source domain at large. When this condition of stability with respect to sampling size is met, the domain is "well defined". A preferred formulation of a well defined source domain suitable for use in the present invention is represented by a body of records (chosen to represent the "primary source domain", as delimited above, for use in the training corpus). Said body of records is preferably a plurality of records selected according to the following criteria:

1) Each record in the body of records contains one or more, preferably at least two, key terms (words, word stems, and/or exact phrases) of user interest, which terms are received from the user to be employed in queries against the target domains. More preferably, the terms of user interest, and their known synonyms, are represented (contained) in each record. Still more preferably, all the terms of user interest are represented in each record. Most preferably, the terms of user interest and at least one known synonym of each term is represented in each record.

2) Each of the terms of user interest (i.e., for which the user is interested in retrieving semantically distant analogies) are individually represented (contained) at least 50 times in the body of records (considered as a whole) constituting the primary source domain as used in the training corpus; preferably at least 100 times; more preferably at least 200 times; still more preferably at least 500 times; still more preferably at least 800 times; still more preferably at least 1000 times; and most preferably more than 1200 times. This criterion applies irrespective of the number or records in the primary source domain materials within the training corpus.

3) The body of records meets the size ranges (defined in terms of information content, in bytes) for the primary source domain as defined above (both in regard to the composition of the training corpus in terms of the relative information-contribution of primary source domain records, and in regard to the size of the overall training corpus in bytes).

4) The body of records is substantially distinct from (substantially non-overlapping with) the collection of records in the search domain. Specifically, the body of records (which constitute the primary source domain records) contain less than about 10%, preferably less than about 8%, more preferably less than about 5%, still more preferably less than about 2%, even more preferably less than about 1%, still more preferably less than about 0.1%, and most preferably about 0% of records which are also present in the search domain (in whatever form). Most preferably none of this body of records which defines the primary source domain is present in the search domain, either individually or as part of any larger (user defined) composite records in said search domain (i.e., as prepared from said primary source domain records).

These operating criteria have been found to be suitable for the successful practice of the invention, by insuring that the source and search domains are distinct and that the (user selected) terms of interest are grounded in a suitable body of context which at least minimally represents their source-domain specific usage. It is preferred that all the key terms (and preferably their known synonyms) be as well represented as possible in said body of primary source domain records. The higher the frequency of representation, the better the likelihood of achieving a body of term vectors (i.e., for the key terms) that are stable with respect to sample size (i.e., number of records). This stability is an important consequence of using a well defined source domain. It is particularly helpful if at least one of the user defined key terms, employed in the assembly of the body of records to represent the source domain, is a specialized term (i.e., like polyurethanes, isocyanate, microelectronics, telecommunications, etc.). In practice, this will usually be the case. Such specialized terms are usually quite characteristic of the domains from which they originated (i.e., they are unique). If the frequency of key term representation, in the body of records which defines the primary source domain, is suspected to be low (and no better domain-specific representation of the terms in a body text can be arranged), then it is preferable to operate toward the high end of the size range (in bytes) defined above (for the primary source domain). In this situation, a larger training corpus [within the previously defined ranges], a higher proportion of primary source domain information in the training corpus, and/or a combination of these alternatives is preferably used.

It is generally not essential that the target domains be this well defined (only that they be separate, and exclusive as defined previously). It is preferred however (in order to focus the results), that target domains also be well defined. One exception (i.e., where target domains must be "well defined") is in the measurement of semantic distance. Measurement and comparison of semantic distances (i.e., between source and target domains) is discussed in detail further on. Methods suitable for ensuring that a target domain, or any domain, is well defined are the same as described herein.

An alternate means for determining if the source domain [or, more specifically, the body of records chosen to represent the source domain said records being the primary source domain records] is well defined is to directly determine if the co-occurrence patterns involving the key terms (of user interest in finding semantically distant analogies), especially the co-occurrence patterns for the key terms with respect to each other (as determined from their term vectors) are stable with respect to sample size.

The vectors for terms in the training corpus are "the quantifications of the statistics of proximal co-occurrence". These vectors are determined from a "large" representative data set (i.e., representing a domain), wherein: "By large it is meant that if the statistics of the structures (i.e., information elements such as words or word stems, which we collectively call terms) we will study are determined using a (randomly chosen) sizable subset of the database that these statistics will not, with very high probability, change significantly if re-measured on the whole data set". Given that the term vectors represent these statistics, the above stated idea of statistical (co-occurrence) stability can be applied to the user defined terms of interest in this invention (i.e., the terms of interest for finding semantically distant analogies) in order to ensure that their co-occurrence patterns are stable. In this respect, it is important that the degree of overlap of the term vectors of the user defined terms be stable as determined from (i.e., wherein said term vectors are extracted from) the body of records selected to represent the primary source domain; preferably as determined from the overall body of source domain records (which, as defined above, constitutes the primary source domain records plus any optional secondary source domain records); and most preferably on the entire training corpus (as defined previously). Although there may be several methods for determining if the degree of term vector overlap for said user selected key terms is stable with respect to sample size, a preferred quantitative method has the steps comprising:

a) Selecting the representative body of records which provide support for said user defined key terms from the source domain. These are preferably the primary source domain records, more preferably the total body of source domain records, and most preferably the total training corpus as defined hereinabove. This body may be selected for example by using well known Boolean key word set creation methods (discussed further below), and then randomly choosing records from within the Boolean set.

b) Generating a set of term vectors for selected terms from step a, said selected terms comprising at least two of the user defined terms of interest, said term vectors representing the statistics of the proximal co-occurrence of the selected terms within the body of representative records of step a. The methods for term vector generation are preferably those disclosed in the above cited prior art references (particularly the '709 patent), and most preferably the more preferred methods taught in those references. Preferably, the user defined term(s) for which term vector(s) are determined in this step comprise at least one (preferably more) of the key term(s) used in defining the body of domain representative records of step a (i.e., by means of the Boolean key-word set creation method discussed below).

c) Determining the degree of overlap (i.e., vector dot product) for the term vectors of at least two of said user defined key terms from step b. Said vector overlap information providing a quantitative representation of their domain-specific co-occurrence statistics and hence their similarity of usage, or "meaning", within the domain, as represented.

d) Selecting a preferably larger domain sample of records (i.e., a larger, or smaller, representative body of records, than in step a). The relative (percentage) composition of the larger or smaller domain sample should be the same as the initial domain sample (step a) with respect to the proportion of information (in bytes) contributed by primary source domain records, optional secondary source domain records (if any), and optional target domain records (if any). The method of sample selection should also preferably be the same.

e) Repeating the term vectorization process of step b (using the same procedure as in step b) on the larger (or smaller) body of records obtained in step d.

f) Determining the degree of term vector overlap as in step c (using the same procedure and the same user selected terms as in step c) using the new term vectors obtained in step e.

g) Comparing the percentage change of the term vector overlap values (i.e., dot products, for the same terms), if any, between steps f and c (that percentage change may be defined as: 100 times the ratio of the difference between the dot product values in step f and step c, to the dot product value of step c, or "100(f−c)/c").

The absolute value of the percentage change seen in step g is preferably not be more than about 20%, more preferably not more than about 15%, still more preferably not more than about 10%, still more preferably not more than about 8%, even more preferably not more than about 5%, yet more preferably not more than about 2%, still more preferably not more than about 1%, and most preferably between zero and about 0.1%.

The terms selected for use (for comparison of term vector overlap as a function of sample size) should preferably be terms which are related in a domain specific way. For example, the terms "polyurethane" and "isocyanate" are known to be related by a fixed co-occurrence pattern in the domain of polyurethanes. Likewise the terms "telecommunications" and "cable" have a domain specific co-occurrence relationship in the domain of telecommunications. Inherently related term pairs such as these are therefore extremely unlikely (within their respective domains) to give a term vector dot product near zero. Some overlap is expected. These types of domain related terms would be examples of good choices for use in the "vector overlap stability test" defined above provided that they are also terms of user interest (for developing semantically distant analogies). Smaller sensitivity of vector overlap (dot product) values to sample size, for key terms is preferred.

If the above "vector overlap stability test" is failed when the sample size is increased [or decreased] by about 20% (as measured in terms of information content in bytes, which may optionally be approximated by numbers of records if the records are of about the same number of bytes on average) from its original size (of step a), then the domain, as represented by this body of records, is not well defined. It should not be used. By "failed" it is meant that the minimum requirements of the test (specified above) are not satisfied. Preferably, at least the minimum requirements of the "vector overlap stability test" should be met even if the sample size is increased [or decreased] by about 25%, more preferably about 30%, even more preferably about 35%, still more preferably about 50%, and most preferably if the sample size is increased by about 100% or more.

The source domain is well defined if such large changes in sampling size produce little or no change in the vector overlap (dot product) values of key domain specific terms. For the purposes of this invention a change in sample size of plus [or minus] about 20% is preferred (i.e., that such a change satisfy the minimum requirements of the "vector overlap stability test" defined above). It is important in applying this test that sample sizes be prepared and tested under the same conditions.

It is preferred that the vector overlap (dot products) between the term vectors representing the key terms selected by the user is stable with the size (in terms of information-content in bytes) of the sample of records assembled to represent the source domain (preferably the primary source domain, and most preferably the entire training corpus). In this regard, it does not matter how the sample of records is assembled, what hardware/software products are used to practice the invention, what else is being run on said hardware/software, what source domain is being represented (or how it is represented), or what the exact composition of the training corpus is.

If a particular representation is found to be unstable (i.e., source domain not well defined), then it is usually possible to find an alternative body of records to represent the domain adequately, to the needs of the user, and in a well defined way. This may involve use of (or incorporation of) alternative key terms which are more domain specific. This may occasionally require some consultation with experts in the source domain area and with the user. Key terms which are highly domain specific are always the more preferred (as long as they meet the requirements of the user). In general, one should endeavor to define (represent) the source domain(s) as narrowly as will accommodate (support) all the key terms of user interest, while providing a sufficiently large body of material (as defined before) to represent them well. These considerations apply to both types of source domains (primary and secondary), but most strongly to primary source domains.

Other suitable supplemental means for verifying that the source domain is well defined include the use of visualization (clustering) techniques, described hereinbelow (sections dealing with representation and visualization of semantic distance). Using these techniques, the relative positions of individual records in a domain representative set (i.e., a set of documents assembled to be representative of a knowledge domain) may be represented on a computer screen in two or three dimensions. This approximate (low dimensionality) representation will generally show a single highly symmetric (i.e., spherical) pattern of dots, each dot representing the position of an individual record, if the domain representative set is well defined. A poorly defined domain representative set may show a plurality of widely separated clusters.

The term "domain" as used herein is intended to mean "knowledge domain". It is recognized that knowledge domains are not inherently discrete categories with well defined boundaries. Knowledge domains usually overlap with many other knowledge domains, and the same domain may be defined in different ways. People may not agree on what any given domain contains (i.e., how it should be defined), or the extent to which they overlap, or even how many knowledge domains there are. Consequently, the selection of domains is somewhat (although not entirely) arbitrary. This vagueness need not be a problem with regard to the practice of the instant invention, provided that there are ways of insuring that source and target domains (as used in the practice of this invention) are semantically distant.

There are countless subject areas which people would intuitively agree are semantically distinct (hence distant), and therefore constitute fair ground for the selection of different "knowledge domains" suitable for use in the context of this invention. Key word based subject categorization schemes, known in library sciences and in "key word" based information searching, provide one convenient means for differentiating between knowledge domains (i.e., selecting domains which are semantically distant). For example, most people would agree that the information categories of "telecommunications" and "microelectronics" are (considered as whole categories) semantically distant from "polyurethanes" or "dog grooming". These categories may be set up (roughly) as Boolean key-word sets in a key-word searchable text database. For example, all the patents (i.e., U.S. full-text patents) which contain the words "microelectronics", "polyurethanes", and "telecommunications" in their claims field could be pulled up on-line and stored electronically as separate categories each representing its namesake knowledge domain. These categories will not be mutually exclusive or comprehensive, but they will be large enough to provide sufficient representative material for use as source or target domains in the context of this invention.

Such key-word based large categories (as approximate semantic categories) may subsequently be edited (i.e., by using the Boolean NOT operator) to eliminate direct overlap. For example, a key word search for "telecommunications" conducted in U.S. Patent claims going back to Jan. 1, 1974 produced 3582 hits. The full texts of these 3582 U.S. patents could easily be acquired and downloaded into a computer file (or CD-ROMs; diskettes; digital tape; or like storage means) to represent the telecommunications domain. [Note: This file was created using telecommunication as a "stem" word which covers both the singular and plural forms of the word]. If one were interested in finding analogies to "polyurethanes" within this domain of telecommunications, one could ensure that no direct overlap exists by searching the full texts of the 3582 patents for the stems of the word "polyurethanes" and any known synonyms thereof (i.e., the word stems for "urethanes", or "carbamates", or "polycarbamates", or "PU"). By searching this category for all 5 stems as alternatives in a simple Boolean expression, one extracts 45 records which contain one or more of these terms (anywhere in the full text). One could easily eliminate these 45 patents from the set—to create a smaller set with 3537 full text U.S. patents, and store this second set for use as a "target domain". It is now clear that the second set will contain no direct overlap (i.e., no records with the stem of "polyurethanes" or any of the stems of its known synonyms). Alternatively, one might use the original set of 3582 full text patents directly given that only 1.25% of them directly overlap on the key terms. This low degree of overlap is not likely to cause overwhelming difficulties, if the full set of 3582 hits is used as a target domain in the context of the invention. In fact, most of the records comprising the 1.25% of overlap are not really relevant as it turns out that the usage of the key terms in this small subset of documents is either incidental, or else they have domain specific meanings which differ significantly from the meaning that these key terms have in the polyurethanes domain. In other words, most of the 1.25% of the documents which seem to overlap with the polyurethanes domain really don't belong in the polyurethanes domain. Nevertheless, key word based categories are a suitable approximation to the "true" semantic domains in this case (and, in fact, in most cases such that they can be used successfully in practicing the instant invention).

In a similar manner one might go about setting up a training corpus for the domain "polyurethanes" as a source domain. A search of the U.S. patents database claims field back to Jan. 1, 1974 for the word stem of "polyurethanes" identifies 20,641 records. Given that the stem appears in the claim field, there is a high probability that most of these 20,641 full-text patent documents pertain to the field of polyurethanes. A brief random inspection of the records confirms this. It would be quite acceptable to use a sampling (for example, a randomly generated sampling) of these full-text documents to serve as a training corpus. About 3500 to 6000 would be a good sample size. One need not be highly rigorous about the sampling method, however, a preferred method would be to choose the (3500 to 6000) documents in which the key word stems (i.e., "polyurethane", and its known synonyms) occur most frequently in the text.

Accordingly, there is considerable latitude in selecting and setting up key-word sets from on-line sources of textual information, by using broad key-word searches and then editing out areas of overlap (as necessary). This can all be accomplished with technology that is known to one of ordinary skill. A distinction from prior art methods is that the large sets need not be read "by hand" (which would be totally impractical in most circumstances). Sources of textual information which may be used for setting up domain categories for use in the invention include any source of text which can be stored and searched in electronic form. These include, but are not limited to, the internet (World Wide Web), on-line patents databases, on-line (commercial) text databases, newsfeeds, private collections of electronically stored (key word searchable) text documents, CD-ROMs of books, etc. It is preferred that the output from these sources (i.e., the sets created) be converted to ASCII text prior to use if the text is not already in that form.

As an example of the flexibility in creating representative sets (as useful approximations of knowledge domains), it should be pointed out that a set representing the "telecommunications" domain could just as easily have been set up by searching the full texts of U.S. patents for that word stem (as opposed to just searching the claims field). One would, of course, obtain a much larger set. Assuming one wishes to find new applications for (hence materials and applications analogous to) polyurethanes in this field by using this set as a representative target domain, then any direct (key word) overlap between this set and the polyurethanes domain should preferably be identified and edited out. This can be done by using the same key word search techniques noted previously (i.e., by looking for and eliminating documents from the telecommunications set that contain the word stems corresponding to "polyurethanes" or its known synonyms). The resulting edited set could then be used directly as the target domain. Alternatively, a representative subset of that edited set could be used as the target domain (i.e., say half of the documents in the original edited telecommunications set in which the stem of "telecommunications" occurs the most frequently).

Other domain categories may be constructed in a like manner. For example, the optional "supplemental source domains" defined hereinabove, from which material may optionally be used in the training corpus, may be created by selecting at least one key term which defines (or approximately defines) a category that is known to encompass (at least approximately) the primary source domain material (for example, the term "polymer", will define a category which at least approximately encompasses "polyurethanes"). The key word (or its stem) can then be used to create a large body of documents on an electronic search system (such as a key word searchable patents database). This intermediate set of records can then be edited (by employing the Boolean NOT operator) to delete all records which contain the stems of the terms that were used to define the primary source domain (i.e., the term "polyurethanes" or any of its known synonyms). The latter set will be different from the primary source domain (as discussed in the definitions provided hereinabove) and can therefore be used as a source of material for representing the secondary source domain in the training corpus. For example, one might choose an appropriate number of records (according to the definitions of relative information volumes, provided previously) from said latter set in which (for example) the stem of the term "polymer" occurs with highest frequency.

Domain categories and sets of records for use in the instant invention may be (as shown above) defined by using single key words (or word stems). They may also optionally be defined by using more than one key word or word stem, optionally with additional controls on word proximity (i.e., the spacing, or number of intervening words, between the key words). An exactly analogous procedure would be used during the subsequent step of editing the intermediate sets of records, in order to remove unwanted overlap. Such techniques are well within the prior art, and would be known to one of ordinary skill. In a preferred embodiment of this approach, it is possible to define one category in terms of a set of several key words (or stems) in predefined proximity (i.e., "polyurethane NEAR/3 composite", indicating that the two words must have a proximity of at most 3 intervening words) and use it as the basis for creating a training corpus; then to create one or more target domain sets (such as for example on electronics by using the key word stem "electronic"); and finally eliminating all records from said target domains which contain the key stem "polyurethane" (or its known synonyms). In this way, one creates the opportunity for discovering composite materials within the electronics domain that are analogous (in ways not defined a priori) to polyurethanes (but are not exact matches to polyurethanes). When multiple key words (or stems) are used in defining a category (set of domain specific records) it is preferable to use between two and five unique words [by "unique word" it is meant that the word is not just a synonym of one of the other words used in the same Boolean statement], more preferably two or three words. Larger numbers of words can be difficult to manage (especially during the subsequent set-editing step to eliminate unwanted overlaps).

The methods described above for creating and editing large Boolean key-word sets to represent knowledge domains, and for extracting bodies of records from electronic databases to represent said domains, are suitable for use in implementing the present invention. Said methods can, as exemplified above, be used to represent domains which are "intuitively" semantically distant from each other. They do not however provide any quantitative measure of the semantic distance between domains.

Vector based information "retrieval" technologies of the type discussed above provide a powerful and universally applicable method for the quantification of semantic distance between domains. This can be done by assembling a training corpus from a large mixed body of records in which all the domains of interest are adequately represented (i.e., preferably wherein each of the individual domains represented in the mixed corpus is "well defined", in the sense described above, and each individual well-defined domain-representative sub-corpus contains at least about 100 individual records). Ideally, the various domain specific bodies of records (within the mixed corpus) contain only records which are each uniquely assignable to just one of the domains represented in the mixed corpus. This can be assured, for example, by creating Boolean key word centered sets for each domain and then editing out overlaps (as discussed in the previous section). It should be noted that the term "training corpus" in this mixed domain context has its broader meaning, and should not be confused with the training corpus according to the instant invention as defined previously.

The mixed-domain training corpus can then be used to create a set of term vectors encompassing all the domains in the corpus. The "selected terms" (i.e., terms not on the stop list) for inclusion in the vectorization process should be as large as practical limitations will permit. The stop list should be small (encompassing only the most commonly used words in the language, which lack any domain specific usages in any of the domains represented by the mixed corpus). All terms in the mixed corpus should be stemmed in the same way (same stemming protocol). The term vectors thus created can be used to compute normalized summary vectors for all the records in the mixed corpus (i.e., using the same procedure for all the records in the mixed corpus!), and these record summary vectors can be used to compute centroid vectors for each of the domains represented in the mixed corpus. The record summary vectors derived from the mixed corpus are such that for any subset of summary vectors corresponding to a subset of records from the mixed corpus there is a single logical relative orientation of the summary vectors that defines the relative meaning of the records in the mixed domain corpus. It is important to note that all these term, summary, and centroid vectors are together in the same high dimensionality semantic space. Each can be thought of as a point position in this space (the coordinates of the point being the vector components, in each of the dimensions of the space), and distances between these point positions can thereby be easily computed and compared. Most preferably each individual domain-representative sub-corpus within the mixed corpus is well defined and contains at least about 1000 individual records.

The semantic distance between two domains then can be represented quantitatively by the simple Euclidean distance between the positions of the corresponding centroid vectors in the high dimensionality semantic space.

The semantic distance between a domain and an individual record can likewise be represented as the Euclidean distance between the position of the domain centroid and the position of the summary vector of the record, in the semantic space.

Clearly the distance between any two points in the semantic space, regardless of what they represent, is readily computable using the Euclidean distance formula in the appropriate number of dimensions:

If the space has "n" dimensions then for any two points having the coordinates $\{x11, x12, x13, x14, x15, \ldots x1n\}$ and $\{x21, x22, x23, x24, x25, \ldots x2n\}$; *the Euclidean distance between the two points in this space is D:*

$$D=[(x11-x21)^2+(x12-x22)^2+(x13-x23)^2+(x14-x24)^2+(x15-x25)^2+\ldots+(x1n-x2n)^2]^{(1/2)}.$$

Wherein the symbol "^" indicates that the following number is an exponent.

This is the preferred formula for the quantification of semantic distance. Given that all the records in the common semantic space can be uniquely assigned to one domain (i.e., to one domain centroid), by using the Boolean key word set method (with editing of overlaps) as described above, it becomes easy to represent the relative "size" of each domain in the semantic space. This may be done preferably by summing the absolute values of the Euclidean distances between the position of each record and that of its respective domain centroid, and then dividing the sum by the total number of records assigned to the domain. This is just the average of the distance between a given domain centroid position and the positions of the records assigned thereto. This is one possible measure of domain size, which can be used in making comparisons.

It will be apparent to those skilled in the art that other quantification methods for the semantic distance are possible and may, in principle, be used here. What is important to remember is that it is relative semantic distances (rather than "absolute" values) that are important. Any other method which yields the same relative values in a given situation (wherein a comparison is required) as the method defined above would be equivalent in a functional sense, and therefore suitable. Any of the various vector based information retrieval technologies discussed above, and possibly others, may be used in order to create the abstract representation of knowledge domains and records (as described above) provided that all of the domains and records in the mixed corpus can be assigned points reliably in a single semantic space. A particularly preferred vector based information retrieval system suitable for use in creating abstract representations which can be used in the quantification of semantic distances between domains [as well as between domains and records, etc.], and in making relative comparisons of said distances, is the system described in U.S. Pat. No. 5,619,709.

As long as the domain specific bodies of records, used to represent the individual knowledge domains in the mixed corpus (above), accurately encapsulate the domain specific co-occurrence patterns of the terms in their respective domains (i.e., such that said patterns remain stable as a function of the sample size for each domain representative sub-corpus), then each domain sample can be said to be an accurate representation of the "real" domain. Under these conditions, the relative semantic distances (i.e., comparative distances between the positions of different pairs of domains centroids, in the common semantic space) can be regarded as an accurate rendering of the "true" values of the relative semantic distances between the "real" knowledge domains. Methods for ensuring that a representative body of records truly (stably) represents the characteristic term co-occurrence patterns of the domain it represents (i.e., that it is "well defined") have been discussed previously. It is important also to recognize that although each individual domain-representative sub-corpus is well-defined (in the sense defined previously), the mixed corpus in most cases will not be.

As noted above, it is relative (comparative) semantic distances, rather than absolute distances, that are the most useful. Accordingly, it is most useful to define the preferred semantic distance, between the source and target domains used in the instant invention, relative to the "sizes" of the domains themselves (in the same semantic space). It was noted above that the "size" of a domain can be represented as the average of the absolute values of the semantic distances between the position of the domain centroid and the positions of all the records within the domain (as represented). This average distance is "d". It may be viewed as the "domain radius". A definition of when two domains may be regarded as "semantically distant" [as measured in the common semantic space discussed above], suitable for use in the context of this invention, is "D(p)":

$$D(p) > d(S) + d(T);$$

Wherein;

D(p) is the preferred semantic distance (minimum) between the primary source domain and each target domain;

d(S) is the "radius" of the primary source domain; and d(T) is the "radius" of a target domain, in which it is desired to locate semantically distant analogies.

More preferably D(p) is greater than 1.25 times the quantity {d(S)+d(T)}; still more preferably D(p) is greater than 1.5 times {d(S)+d(T)}; even more preferably D(p) is greater than 2 times {d(S)+d(T)}; and most preferably D(p) is greater than 2.5 times {d(S)+d(T)}. Preferably, the source and target domains should be farther apart than any two records within either domain (as represented in the common semantic space), in which case they are completely non overlapping. In making these kinds of distance comparisons, it is important that one be consistent in regard to the methods used for computing the individual distances.

The comparison of the semantic distance between source and target domains is made in a "common" space, which is different from the semantic space used to represent the source domain in practicing the invention (as described earlier). This "common" semantic space is used merely for the purpose of computing semantic distance between domains, and, as such, is generated from a mixed-domain corpus. Such a mixed domain corpus would not be suitable for practicing the instant invention because it is not "well defined" with respect to the source domain. Word co-occurrence patterns will probably vary considerably across such a mixed corpus, and are not likely to be stable as the sampling size of any (domain representative) sub-corpus is varied.

Figure 3A:
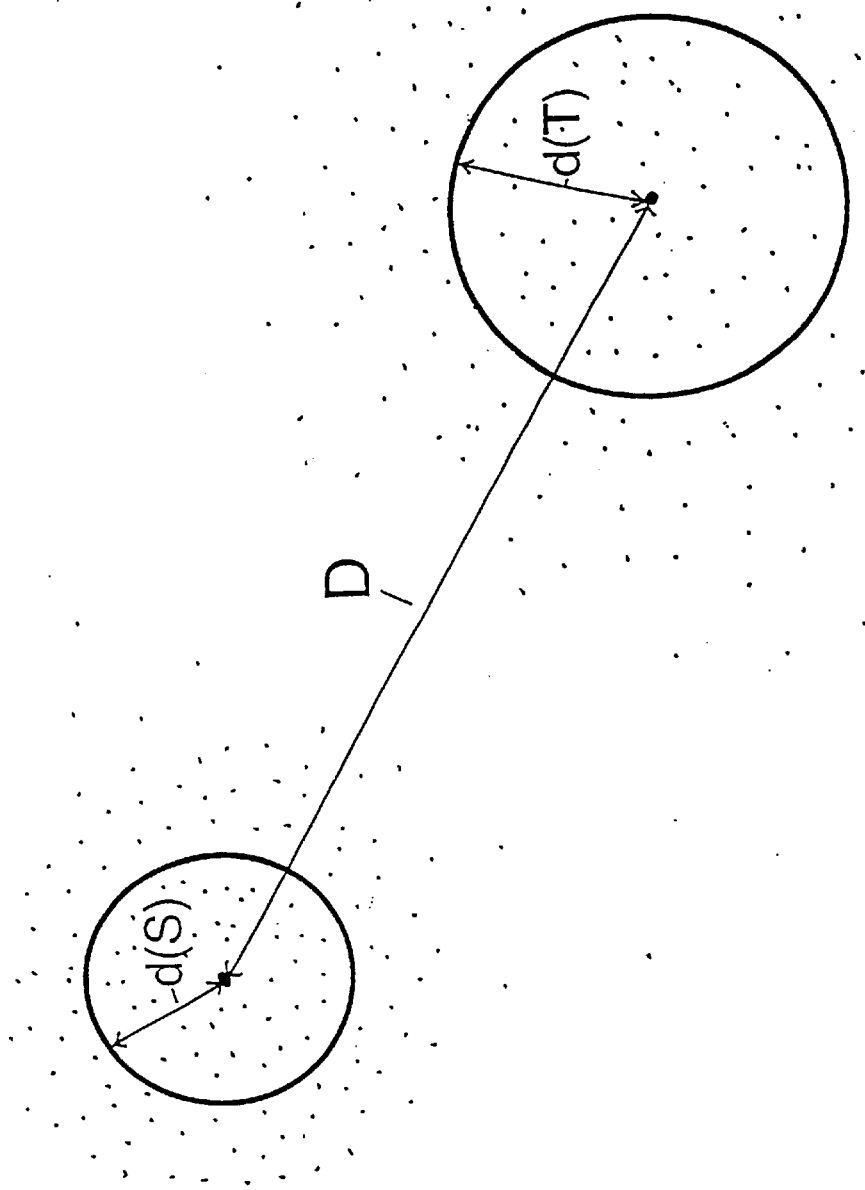
FIG. 3A is a schematic representation of semantically distant domains according to an embodiment of the invention.

FIG. 3A provides a schematic example (shown in two dimensions) of what a representation of two semantically distant domains within a common semantic space would look like. The individual small dots are the positions of records within each of the respective domains and the heavy dots are the positions of the centroids for each domain.

Semantic distance may be manipulated by a number of simple procedures. Achieving a tighter focus on the primary source domain is most preferred. This can generally be accomplished by selection of key terms which are more specific to the primary source domain, and then using the Boolean set method (discussed previously) to build up a representative corpus of records around these terms. Increasing the domain specificity in this way will have the effect of reducing the diameter, d(S), of the primary source domain and thereby reducing overlap in the common semantic space with other domains (i.e., increasing semantic distance). A similar procedure may be used for sharpening the focus of target domains. Editing out overlap by eliminating records which contain the domain-defining key terms of other domain-representative sets (i.e., by using the Boolean NOT operator, as discussed above) will likewise increase the semantic distance.

A preferred approach to achieving a tighter focus on a domain (i.e., a primary source domain), which amounts to improving the definition thereof, is to employ a combination of two or more domain terms together in setting up the set (i.e., by using the AND operator, in the Boolean set creation method described above). The use of two domain terms together in this way can dramatically improve the focus. For example, in the lumber industry the term "OSB" means "oriented strand board". Unfortunately, "OSB" has many other very different meanings in totally different domains. The focus of the set can be dramatically narrowed (definition improved) by using the Boolean expression "OSB" AND "wood" to define a set (or, alternatively, "OSB" AND "board"). This expression requires that all records in the domain-representative set will contain both terms, and thereby eliminates most of the extraneous material. This improvement of set definition (domain specificity) will have the effect of increasing the semantic distance from other sets. In subsequent editing of target domain sets, it is preferred to eliminate all those records from the target domain sets that contain the narrower of the two (or more) terms, in this case "OSB", in the combined expression (used to create the primary source domain set).

An alternate approach would be to apply the Euclidean distance formula D (defined above) to compute the distances between the positions of pairs of individual source and target domain records in the common space, and delete any of said pairs of records that are closer together than some minimum distance (for example, some fixed fraction of the distance between the domain centroid positions). A related approach would be to compute and compare the distances between the positions of individual records in one domain and the position of the centroid of the other domain, in the common space. Records for which this distance is below some pre-determined value (i.e., some fixed fraction of the distance between the domain centroid positions) could be deleted. Either of these approaches will increase the semantic distance between the domains (thus modified) and cut down on the amount of overlap (if any existed). The modified domain-representative sets of records may then be employed in the practice of the instant invention, by designating one as the source domain and using it to set up the new training corpus.

Visualization techniques may optionally be used in order to identify "natural" domains or clusters of semantically similar records from a large mixed corpus, and a "common" semantic space. Individual clusters, which are semantically distant "by inspection", may then be scanned and selected for use (as source and target domain representative sets) for use in the instant invention.

These techniques, or other techniques known or used in the art, may be used in the selection of domains which are semantically distant, or for increasing the semantic distance between selected domains.

Methods may be used to generate quantitative visual representations of semantic distance between knowledge domains or sets of records which have been assembled to represent said domains. These alternative methods are less preferred than those discussed above for measurement of semantic distance, but they can be useful in the selection of source and target domain representative sets for use in the current invention. A preferred method which is readily adapted to the visual representation of semantic distance is a visualization method which can display clusters of records (according to their natural semantic similarity, or non-similarity) on a simple [two or three dimensional] set of coordinate axes on a computer monitor screen. This method is described in U.S. Pat. No. 5,794,178. This preferred visualization process uses vector representations to compute the relative positions of records from any selected set of records on the visual display. One may, for example, begin with a large set of records (perhaps many thousands of records, in principle) comprising a range of topics of potential interest. This initial set may be taken from another search, perhaps a "key word" based search similar to the types defined above. One might, for instance, use simple Boolean OR logic to create a large combined set of records dealing with "polyurethanes", "electronics", and "telecommunications" from an on-line (electronically stored) set of patent records (for example, all U.S. and European full-text patents from the present day back to Jan. 1, 1974). One might then use this combined set (or, more preferably, a suitable sampling thereof) as a training corpus. [Note again that the term "training corpus" in this hypothetical example is not the same as what we have defined in the context of the instant invention, since this example concerns information search and display methodology—which is used to represent a mixed domain corpus]. One may then choose any two or three terms which are well represented in said training corpus (and which are preferably not recognized synonyms of each other) in order to define two or three separate coordinate axes of the visual display. One may, for example, use any two or all three of the terms which were used to generate the original Boolean set (i.e., the key terms "polyurethanes", "electronics", and "telecommunications") to create coordinate axes, although it is not essential that any of these terms be used. Once a set of coordinate axes has been set up to visually display results, then the relative positions of all the records in the original Boolean set can be calculated (i.e., by calculation of vector dot products between the vectors of the terms which were used to define the coordinate axes, with the summary vectors obtained from the individual records in said combined Boolean set). The many documents in this original set will then "fall out" into natural clusters based on their (semantic) content. One may then visually inspect the distances between individual clusters within the space defined by the coordinate axes. This provides a low dimensionality visual representation (necessarily an approximation) of semantic distance, relative to the terms which were used to define the coordinate axes. One may optionally also display the positions of vectors representing each cluster (i.e., the domain centroids). This means of representation is necessarily approximate because the view obtained is in relation to certain terms used to define the axes. The "view" may change if different terms are used. Moreover, the axis defining terms, which are rendered "pseudo-orthogonal" in the low dimensionality (visual) display, may not be orthogonal in the high dimensionality semantic space.

If the terms used to construct the coordinate axes are well represented in the overall set then, if they truly define semantically distinct concepts, they are likely to "fall out" into distinct clusters of records. Other clusters may fall out which pertain to (i.e., consist of records which define) the combination(s) of the terms used to define the coordinate axes. This is especially likely if one selects the terms which were used to define the original set (noted above) as the terms used to define the coordinate axes. In this way, the semantic distances between these original (set defining) terms can be visualized. It is also possible as (especially if the number of records is large) that natural (visually recognizable) sub-categories may fall out as separate clusters, perhaps within the larger clusters. The content of the clusters may be scanned by consulting some of the individual records therewithin (i.e., by clicking on them in the visual field provided by the coordinate axes). Such scanning is preferably conducted by consulting (clicking on and opening) those records which are closest to the center of said cluster. This scanning process may be greatly facilitated by highlighting (or graphing, or ranking) the most axis-term-relevant portions within each of the individual records.

From the above description of the process of vector based semantic clustering of records, it becomes easy to see how it might be used in the context of the instant invention. One could consult the content of various clusters of records as indicated above (aided by the positions of said clusters with respect to the coordinate axes, said axes preferably representing attributes of user interest). Given that each cluster represents a unique position in the reduced dimensionality semantic space represented by the coordinate axes, it would not be necessary to consult all the records in any given cluster in order to determine the subject matter of said cluster (i.e., since it likely consists of similar records). One may then easily select a cluster of records to serve as a source domain (per the definitions of this invention), and one or more separate clusters, which are visually distant, in said space represented by said coordinate axes, and use the records in these latter clusters as target domains (according to the definitions of this invention). One may then use the records contained in the first cluster (the source domain) or a suitable sampling thereof as a separate training corpus (in accordance with the definitions of this invention). All the records in all the clusters selected as target domains could then be combined into a single search domain, separate from all other records. The search domain could be edited, in the manner described previously, to avoid overlap with records containing key terms (words or word stems) in the source domain which are desired for use as (or in constructing) queries against the target domains (said target domains together constituting the search domain). In other words, any records which contain such key terms from the source domain, for which it is desired to find analogies in the target domain(s), could be edited out of the search domain (by the methods described previously).

The clustering methodology described in U.S. Pat. No. 5,794,178 provides a methodology suitable for manipulating the semantic distance between source and target domains (clusters) used in this invention, in as much as it provides an approximate measure of relative semantic distance (between clusters of records). One may, for example, choose clusters which are farther apart (semantically more distant) in order to increase the tension between the semantic distance of the source and target domains, and the need for vector overlap (at the level of individual records or portions thereof) in finding useful and novel analogies. Ideally the source and target domains should be farther apart in the visual representation than any two records within any of the individual clusters chosen to represent the source and target domains.

In using the clustering methodology to generate source and target domains for use in the context of the instant invention it is preferable that at least one of the terms used to represent axes in the visual cluster display process is also one of the terms (or a known synonym of one of the terms) which will be used as a query (or in queries) against the target domains selected. As such, this term should be well represented in the source domain selected from the cluster display, but substantially absent from all the target domains which are selected from the cluster display. This "substantial absence" can be guaranteed by editing out all records which contain this term or its known synonyms from said target domains or from the final isolated search domain formed by combining all said target domains, as discussed above.

These cluster-visualization methods can also be used to verify that a particular set of records (i.e., for use as a primary source domain set) is a good ["well defined"] representation of a knowledge domain. A well defined domain will ideally show a symmetrical (i.e., spherical) pattern of dots, whereas a poorly defined domain set may tend to show multiple and widely separated clusters of dots.

Figure 3B:
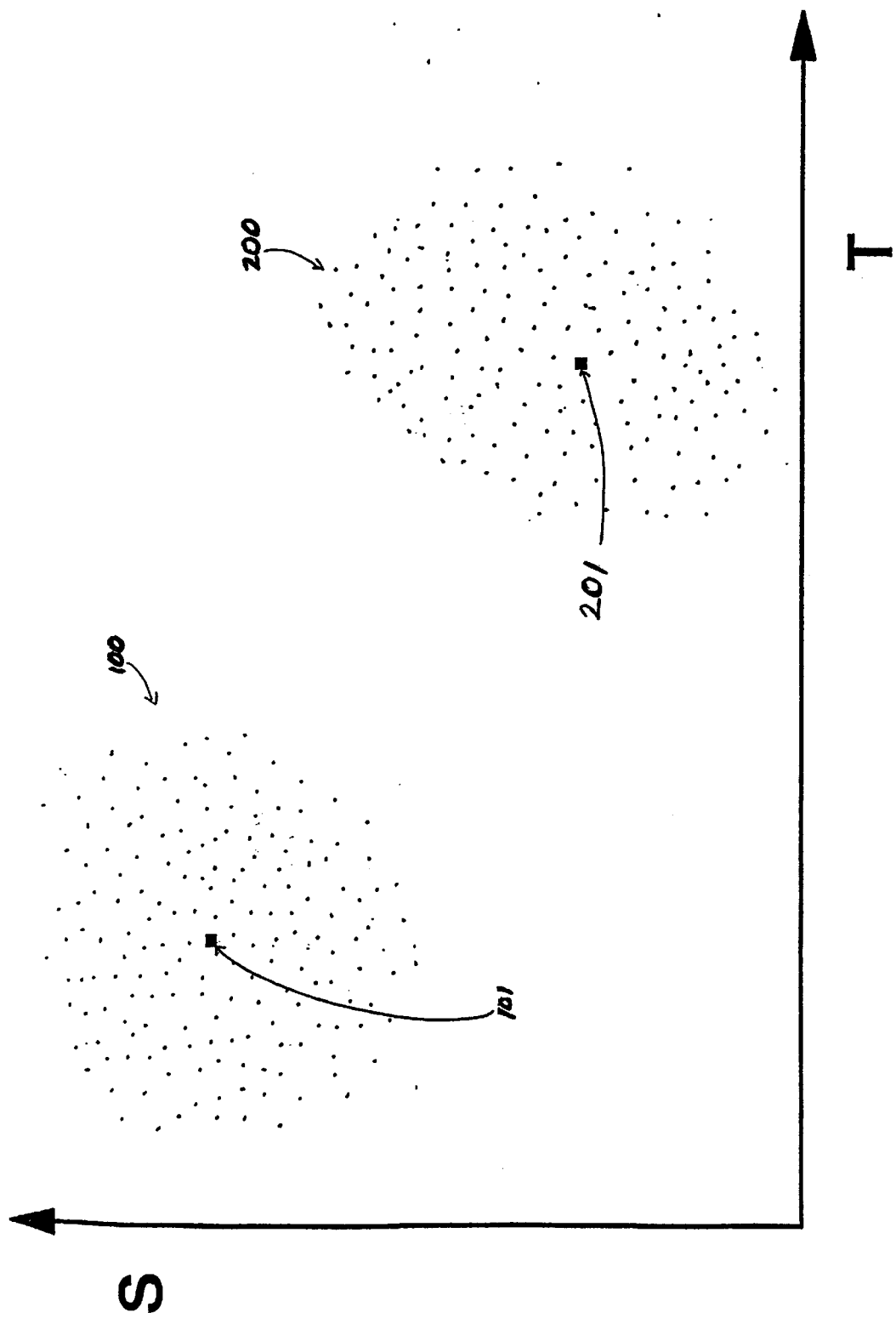
FIG. 3B is a schematic representation of a visual cluster display in two-dimensional space according to an embodiment of the invention.

FIG. 3B provides an example of what a visual cluster display might look like in a two dimensional space created by two pseudo-orthogonal axes. The axes, in this example, correspond to a "source domain defining term" S and a "target domain defining term" T. The two clouds of dots are clusters of individual records, from the mixed-domain corpus. The large dot at the center of each cloud is a representation of the cluster centroid (in the two-dimensional space).

Irrespective of the method used for establishing the source and target domains, the method of the invention calls for receiving at least one query (or, user-defined key term), preferably several. The preferred form for queries is not arbitrary (as compared to conventional text database searching). The queries preferably contain at least one term (or a known synonym thereof) which appears in the source domain but is substantially absent from all target domains (i.e., absent from the entire search domain), as described above. Preferably this key term or terms used in the queries is a key characteristic of the source domain (i.e., of the primary source domain, if there are also secondary source domains), or is closely related to such a key characteristic (i.e., as a specific item that belongs within, or is routinely associated with, the broader category). More preferably, the key term or terms used in all the queries is (or, in the case of multiple term queries, comprises) one of the terms (key words) used in establishing the body of records which make up the primary source domain. Still more preferably, all queries contain at least one such "domain defining" term (or a known synonym thereof) which term occurs in all the records within the primary source domain. Most preferably the queries consist of a single word, word pair, or short phrase wherein said word, word pair, or short phrase is or contains at least one of the terms (words) used to define the body of records which make up the primary source domain and said domain defining term (or a known synonym thereof) occurs in all the primary source domain records. In the preceding sentence the expression "short phrase" should be understood to mean a phrase of 10 words or less, and preferably 5 words or less. Although it is within the scope of the invention to use queries which contain more than 10 words, such relatively long queries (when used) are preferably lifted directly from the primary source domain (i.e., from one of the records therein) and should contain a key concept of interest to the user. "Words" as used herein may mean whole words or word stems, or any combination thereof, at user discretion. The most preferred type of query is a single word or stem which is highly characteristic of the primary source domain.

The "key concept" or "domain defining" word (or word pair or short phrase) described in the preceding paragraph represents a characteristic of the primary source domain for which the user wishes to find novel but relevant analogies in the target domains. This user-selected "characteristic" is the basis for the selection of the primary source domain (and for defining the body of records which make up the primary source domain). In this sense, the key query terms define the primary source domain (i.e., provide the reason why it exists). The primary source domain, in turn, provides a domain-specific meaning to all the key query terms, said domain specific meaning being captured in the generation of the term vectors. Thus a preferred method according to one embodiment of the invention comprises:

A) Receiving one or more characteristic terms which are specific to a given domain of interest to a user (said terms representing relationships, functions, materials, structures, compositions or combinations thereof, for which it is desired to find semantically distant analogies).

B) Assembling (by use of at least one of terms from step A and/or known synonyms thereof, using any of the various means discussed above) a well defined body of records which support the domain specific terms (denoting relationships, functions, etc.) of step A (i.e., by providing a domain specific context for them). This assembly corresponds to the primary source domain records, and may optionally be supplemented by related (supporting) secondary source domain records, as discussed previously. This assembly of records is stored in the computer in electronic form.

C) Receiving one or more target domains which are semantically distant from the domain represented by the terms (representing functions, relationships, etc.) of step A.

D) Assembling a representative body of domain specific records from the target domains of step C, in order to create a search domain (as previously defined), said search domain being substantially free of records containing the terms (or known synonyms thereof) used to construct the assembly of records of step B. This may be accomplished by means discussed previously. This search domain is stored in the computer in electronic form, in a separate location (separate file) from the assembly of records of step B.

E) Assembling a training corpus (as defined above) from the assembly of records in step B plus any optional minor (supplemental) portion of target domain records (as discussed hereinabove). This training corpus is stored in a separate location (separate file) in the computer from the search domain of step D.

F) Computing a set of term vectors for a large body of selected terms from the body of records in the training corpus of step E, and storing these in the computer, wherein said selected terms include (but is larger than) the set of characteristic terms received in step A.

G) Computing, using the term vectors of step F, a set of summary vectors for each record in said search domain (and optionally also for selected sub-portions within each of said records) and storing said summary vectors in a separate location in the computer.

H) Computing, for at least one (preferably each) of the source domain specific terms received in step A, the overlap [preferably the dot product] of its term vector with the summary vectors of step G.

I) For at least one (preferably each) of the source domain specific terms received in step A, either displaying a relevance ranked list of records (and/or sub-sections thereof) from said search domain or else displaying a visual cluster diagram thereof, by using the dot product information from step H in order to conduct the relevance ranking of the records (and/or sub-sections) from said search domain or to compute their relative positions on the visual cluster diagram.

In step "I" above, a relevance-ranked list is preferred to a cluster diagram, although both may be used if desired. If a cluster diagram is used it should most preferably contain only the most highly relevance ranked records retrieved (i.e., about the top 200, from the relevance ranked list of the output records).

As before, the search domain is isolated and is substantially free (as defined previously) of records containing terms (or known synonyms thereof) from the source domain (i.e., in this case, the terms received in step A). In this embodiment the most preferred terms (for step A) are single words (or word stems), especially single words (or stems) which have a domain specific meaning. For example, in the case of the polyurethanes domain, an example of a preferred term in step A might be "polyurethane", or one of its known synonyms such as "PU". Small groups of words having (as a group) a domain specific meaning are also preferred as individual terms in step A. Said small groups of words generally have a precise, domain specific, order which is characteristic. For example, within the polyurethanes domain, the following expressions are a few examples of multi word terms which have a natural (characteristic) domain specific meaning:

"polyurethane foam",
"one component urethane adhesive",
"polyisocyanurate foam",
"polyisocyanurate adhesive",
"polyoxyalkylene polyol",
"polyalkylene oxide polyol",
"polyurethaneurea elastomer",
"polyisocyanate prepolymer".

All of the expressions above (and many more) would be immediately recognizable to a person of ordinary skill in the domain of polyurethanes technology as representing characteristic, domain specific, categories of entities (i.e., product types). These expressions would therefore be particularly appropriate as single "terms" in the sense of step A above, wherein the user wishes to find semantically distant analogies for these domain entities within the semantically distant target domains. Such finding of semantically distant analogies may be particularly important for generating substitution opportunities (i.e., new product applications). Moreover, vector based information "retrieval" technology (such as described in U.S. Pat. No. 5,619,709) provides convenient means for the generation of unique term vectors (from a training corpus) representing the compound expressions. Such compound expressions may optionally be singled out in advance of the term vector generation process by inputting a list of said compound expressions (known in the art as a "phrase list"). During pre-processing of the training corpus (as described) the compound expressions (short phrases) on the phrase list will be identified for treatment as single terms and will therefore receive term vectors as if they were single words. The individual words that make up the compound expressions may, of course, themselves be treated independently as single words when used outside the exact phrase (concurrently with but separately from the compound expressions) and assigned term vectors of their own which are different from the term vectors of the exact phrase. Phrase lists may optionally be employed in any embodiment of this invention.

Thus in a preferred embodiment of the method of the invention discussed above, a list of domain specific words, word stems, and/or compound expressions [together constituting the "terms" referred to in step A above] are received and processed through the subsequent steps shown in order to generate a ranked list (and/or a cluster display) of analogies to each of said terms, from the isolated body of target domain materials in the search domain.

The temporal ordering of the steps in practicing this preferred formulation of the invention is not particularly important, as long as those steps which depend on other steps are performed subsequent to the steps upon which they depend.

As discussed above, the method of the invention is very useful for the identification of new (undiscovered) applications of known products. It identifies analogous products (as likely substitution opportunities) and analogous applications in the target domains, automatically, without any requirement for explicit knowledge of the target domains by the user of the system. The system does this by creating a representation of the terms characteristic of the source domain, in a high dimensionality semantic space which is specific to the source domain. Each of the source domain terms (and higher order text structures composed thereof) has a unique position in this space. Target domain records (and/or sub-portions thereof) are then, in effect, "projected" into this source domain semantic space and compared (as to their relative positions) with source domain terms (i.e., by computation of dot products between source domain term vectors and the document vectors of target domain records). This is, in effect, a "force-fitting" (or cross mapping) process, for which a schematic representation is provided in FIG. 4. No direct term matches (as in key word searching)

are required. Even single-term queries (our preferred embodiment) work well in this environment because the semantic space is unique to the source domain. No disambiguation is necessary because the domain terms have only their source domain specific meanings. Other possible meanings (as may exist within the target domains) are not "seen" by the system. Recall that the "PU" query in the Working Example retrieved only records from the target domains which were relevant (in an analogical sense) to the "polyurethanes" domain (and said retrieved materials did not contain any explicit term matches on the term "PU" itself), even though there were records in the target domains in which the acronym "PU" was explicitly present—and meant something totally different (i.e., "processing unit"). Use of a broad-based dictionary of term vectors from multiple domains would not be of much help in this type of situation because a system based on such a dictionary would just return any and all records from the target domain that matched whatever meanings of the term were available in the dictionary. In the case of the telecommunications and microelectronics domains from the Working Example, the only "meanings" available for the term "PU" is "processing unit". But these meanings are not of any interest in this example. This invention provides a practical automated means for the examination of one (or several) distinct domains of knowledge from the "perspective" of another selected domain.

Other potential applications of the invention include innovative problem solving, wherein it is desired to find new (novel) approaches to the solution of difficult problems. This often involves looking for analogies to the problem (or components thereof) outside the domain of the problem itself. The instant invention provides a simple automatic method for doing this. One can, for example, determine what other structures are performing the role of a given "known" component (of a machine or system) in other areas of technology. Such information can also be useful in the innovative design of new machines or systems. One can also envision using this invention in business applications, wherein the retrieval of analogies to different business functions and practices between different organizations may yield valuable insights.

From the above description, it will be apparent that the invention disclosed herein provides a novel and advantageous system and method for retrieving semantically distant analogies. The foregoing description discloses and describes merely exemplary methods and embodiments of the present invention. As will be understood by those familiar with the art, the invention may be embodied in other specific forms without departing from the spirit and scope of the invention. Accordingly, the disclosure of the present invention is intended to be illustrative, but not limiting, of the scope of the invention, which is set forth in the following claims.

What is claimed is:

1. A method for selectively retrieving records or portions of records which contain information relative to at least one chosen term, said method comprising:
  a) receiving a well defined first body of records selected from a first knowledge domain;
  b) computing by means of a processing unit an abstract representation of terms from said well defined first body of records, said abstract representation encoding the characteristic co-occurrence relationships between terms in said first domain, and storing said abstract representation in a storage unit;
  c) employing said stored abstract representation of term co-occurrence relationships to retrieve records relevant to one or more terms from said first body of records, said relevant records retrieved from within a second body of records stored in the storage unit; wherein said second body of records is selected from at least one other knowledge domain which is semantically distant from said first knowledge domain and wherein said second body of records is substantially free of records containing said chosen terms or any synonyms of said chosen terms; and
  d) displaying said relevant records as retrieved in step c as an output, said output indicating the relative degree of relevance of each retrieved record with respect to at least one of said chosen terms
    wherein each of said chosen terms or synonym thereof, from said first knowledge domain is represented in a majority of the records in said first body of records and said abstract representation of terms from said first knowledge domain is a set of term vectors in a single multi-dimensional vector space, said set of term vectors computed from said well defined first body of records representing said first domain; the relative orientations of said term vectors in said multi-dimensional space collectively encoding the term co-occurrence relationships characteristic of said first domain.

2. The method according to claim 1 wherein said multi-dimensional vector space has from about 100 to about 1000 dimensions, and each term vector therein contained has a component in each of said dimensions.

3. The method according to claim 2 wherein said term vectors, in said set of term vectors collectively encoding the term co-occurrence relationships characteristic of said first domain, are of a fixed and equal length.

4. The method according to claim 3 wherein said records are ASCII text documents written in a single human language and said terms are words, word stems, or exact phrases in said human language.

5. The method according to claim 4 wherein said second body of records is entirely devoid of records containing said chosen terms or synonyms of said chosen terms.

6. The method according to claim 1 wherein the relative relevance of each record in said second body of records to said chosen terms, or to query statements prepared from said chosen terms, is computed by calculation and comparison of the degree of vector overlap in said multi-dimensional vector space of the summary vectors of said records from said second body of records with the term vectors or query vectors corresponding to said chosen terms or queries; wherein said term vectors for said chosen terms are computed from said first body of records, said record summary vectors from said second body of records and said query vectors are calculated from term vectors computed from said first body of records.

7. The method according to claim 1 wherein the semantic distance between said first domain and any other one of said knowledge domains is greater than the sum of the respective domain radii as measured in a common semantic space, wherein:
  the semantic distance between the domains is the Euclidean distance between the positions of the respective domain centroids in common semantic space;
  the domain radii are the respective averages of the absolute values of the Euclidean distances between the positions of the respective domain centroids and the positions of the individual records representing the respective domains in the common semantic space;
  each domain in the common semantic space is represented by a well defined body of records, together constituting a mixed-domain corpus of records;

each of said well defined domain representative bodies of records in said mixed domain corpus contains at least about 100 individual records;

the common semantic space being a multi-dimensional vector space in which each record in said mixed-domain corpus of records is assigned a unique position based on its content;

the position of each record in the common semantic space is determined by computation of term vectors from the mixed-domain corpus and calculation of a summary vector for each record in the mixed domain corpus by use of the term vectors as computed from the mixed-domain corpus;

said summary vectors derived from said mixed corpus are such that for any subset of summary vectors corresponding to a subset of records from the mixed corpus there is a single logical relative orientation of the summary vectors that defines the relative meaning of the records in said mixed domain corpus;

each record in the mixed-domain corpus of records is uniquely assignable to one of the domains represented in the common semantic space.

8. The method according to claim 7 wherein the common semantic space is a vector space of about 100 to about 1000 dimensions, records represented in the common semantic space are ASCII text documents, said documents are written in the same human language, and each of said well defined domain representative bodies of records in said mixed domain corpus contain between about 1000 and about 50,000 individual records, each record containing a plurality of terms.

9. The method according to claim 8 wherein the semantic distance between said first domain and any other one of said knowledge domains is at least twice the sum of the respective domain radii as measured in the common semantic space.

10. A method for efficiently retrieving semantically distant analogies, said method comprising:

a) assembling a first body of records according to a single consistent method of sampling;

b) computing an abstract representation of terms from said first body of records, said abstract representation encoding the characteristic co-occurrence relationships between terms in said first body, said co-occurrence relationships being stable with respect to sample size, and storing said abstract representation in a storage unit;

c) employing said stored abstract representation of term co-occurrence relationships to selectively retrieve records relevant to any of two or more terms chosen from said first body of records, said relevant records retrieved from within a second body of records stored in the storage unit; wherein said second body of records is substantially devoid of records containing said two or more chosen terms or synonyms of said chosen terms; and d) displaying said relevant records as an output, said output indicating the relative degree of relevance of each record retrieved with respect to at least one of said chosen terms wherein each of said two or more chosen terms, or synonyms thereof, from said first body of records are represented in at least about 70% of the records in said first body of records; and wherein said first body of records contains at least about 100 records, each record containing a plurality of terms and said abstract representation of terms from said first body of records is a set of term vectors in a single multi-dimensional vector space, said set of term vectors computed from said first body of records; and wherein relative orientations of said term vectors in said multi-dimensional space collectively encode the term co-occurrence relationships characteristic of said first body of records.

11. The method according to claim 10 wherein said multi-dimensional vector space has from about 100 to about 1000 dimensions, and each term vector therein contained has a component in each of said dimensions.

12. The method according to claim 11 wherein the term vectors, in said set of term vectors collectively encoding the term co-occurrence relationships characteristic of said first body of records, are of a fixed and equal length.

13. The method according to claim 12 wherein said records are ASCII text documents written in a single human language and said terms are words, word stems, or exact phrases in said human language.

14. The method according to claim 10 wherein the dot products between the term vectors of any pair of said two or more chosen terms from said first body of records is not changed by more than about 15% if the sample size, in bytes, of said first body of records is doubled using the same method of sampling.

15. The method according to claim 10 wherein the dot products between the term vectors of any pair of said two or more chosen terms from said first body of records is not changed by more than about 5% if the sample size, in bytes, of said first body of records is doubled using the same method of sampling.

16. The method according to claim 10 wherein the relative relevance of each record in the said second body of records to said chosen terms, or to query statements prepared from said chosen terms, is computed by calculation and comparison of the degree of vector overlap in said multi-dimensional vector space of the summary vectors of said records from said second body of records with the term vectors or query vectors corresponding-to said chosen terms or queries; wherein said term vectors for said chosen terms are computed from said first body of records, and wherein said record summary vectors from said second body of records and said query vectors are calculated from term vectors computed from said first body of records.

17. The method according to claim 10 wherein the relative relevance of each record in said second body of records to said chosen terms is computed by calculation and comparison of the vector dot products of the summary vectors of said records from said second body of records with the term vectors corresponding to said chosen terms; and wherein said term vectors for said chosen terms are computed from said first body of records, and wherein said record summary vectors from said second body of records are calculated from term vectors computed from said first body of records.

18. A method for selective retrieval of semantically distant analogies, said method comprising:

a) receiving one or more characteristic terms specific to a given knowledge domain of interest to a user;

b) assembling by use of at least one of the characteristic terms or a synonym thereof, a well defined body of records which support the characteristic terms by providing a domain specific context, and storing the body of records in a storage unit;

c) receiving one or more target domains which target domains are semantically distant from the domain represented by the characteristic terms of step a;

d) assembling a representative body of domain specific records from each of the target domains of step c, each record containing a plurality of terms, and combining said representative bodies of target domain records to create a search domain, wherein said search domain is substantially free of records containing characteristic terms or synonyms of characteristic terms received in step a, and storing the representative body of target domain records in the storage unit in a location separate from the body of records of step b;

e) computing by means of a processor a set of term vectors in a single multi-dimensional vector space for a body of selected terms from the body of records in step b, and storing the term vectors in the storage unit, wherein said body of selected terms includes and is greater than the set of characteristic terms received in step a, and further wherein the relative orientation of said term vectors corresponding to said body of selected terms collectively encodes characteristic co-occurrence relationships between the terms in the domain represented by the well defined body of records of step b;

f) computing a normalized summary vector using the term vectors of step e for each record in said search domain and storing the resulting set of summary vectors in the storage unit;

g) computing for at least one of the characteristic terms received in step a or a synonym thereof, the relative overlap of the term vector of said term or said synonym with each of the summary vectors obtained in step f and storing the results in the storage unit;

h) comparing the relative degree of vector overlap, as obtained from step g, between the term vector of said domain specific term or said synonym thereof and the summary vectors of the records in the search domain;

i) generating a relevance ranked list from said search domain; and j) displaying by means of a suitable output device said relevance ranked list of records from said search domain for at least one of the domain specific terms received in step a or synonym thereof.

19. The method of claim 18 wherein the assembly of records of step d is entirely devoid of records containing any of the characteristic terms received in step a or any synonyms of the characteristic terms received in step a.

20. The method of claim 19 wherein each of the characteristic terms received in step a are present in at least about 80% of the records in said body of records of step b and wherein said body of records of step b contains at least about 1000 different records.

21. A method for selective retrieval of semantically distant analogies, said method comprising:

a) receiving one or more source domains;

b) assembling a well defined first body of records form said source domains, wherein each record contains a plurality of terms, and storing said records in the storage unit;

c) receiving one or more target domains, said target domains being semantically distant from said source domains;

d) assembling a second body of records from said target domains, wherein each record contains a plurality of terms, and storing said second body of records in the storage unit of the computer in a location separate from said first body of records;

e) assembling a single training corpus comprising records from said first body of records and optionally in addition a lesser proportion of records from said second body of records, and storing said training corpus separately within the storage unit;

f) computing a set of term vectors in a single multi-dimensional vector space for a body of selected terms in the training corpus of step e, wherein the relative orientation of said term vectors corresponding to said selected terms collectively encode domain specific co-occurrence relationships between the terms within the training corpus, and storing said set of term vectors in the storage unit;

g) computing a set of normalized summary vectors for each record in said second body of records using the term vectors of step f and storing said summary vectors in the storage unit;

h) receiving one or more queries, each query containing one or more chosen terms from said first body of records which chosen terms are substantially absent from said second body of records and for which there are substantially no synonymous terms in said second body of records, further wherein said chosen terms form a subset within the body of selected terms in step f and said body of selected terms in step f is larger than said subset of chosen terms;

i) computing a query vector for at least one of the queries received in step h using the term vectors of step f and storing the resulting query vector in the storage unit;

j) computing, for at least one of the queries received in step h, a measure of the relative overlap of the query vector corresponding to said query with each of the summary vectors from step g, and storing the results in the storage unit;

k) for at least one query received in step h, displaying a relevance ranked list of records from said second body of records by comparing the relative degree of vector overlap, as obtained from step j, between the query vector of said query and the individual summary vectors of the records in said second body of records in order to conduct the relevance ranking.

22. The method of claim 21 wherein each of the queries of step h contains at least one chosen term from said first body of records, said chosen term being entirely absent from and having no synonyms in any of the records within said second body of records.

23. The method of claim 22 wherein each of said chosen terms from said first body of records are individually present in at least about 80% of the records in said first body of records, and wherein said first body of records contains at least about 1000 different records, each record containing a plurality of terms other than said chosen terms.

24. The method of claim 23 wherein the queries of step h each contain 5 terms or less, including said chosen terms from said first body of records.

25. A method for selectively retrieving records or portions of records which contain information relative to at least one chosen term said method comprising the steps of:

a) inputting to a storage unit a training corpus consisting essentially of a plurality of records wherein a majority of said records in said training corpus contain said chosen term, and wherein each of said records in said training corpus further contains a plurality of other terms;

b) inputting to the storage unit a second body of records consisting essentially of a plurality of records wherein said second body of records is substantially free of records containing said chosen term or synonyms of said chosen term;

c) processing the records in said training corpus to compute a body of term vectors in a single multi-dimensional vector space for at least a portion of the terms in said training corpus, wherein said portion of terms processed includes and is greater than said chosen term, and wherein the relative orientation of the term vectors in said body of term vectors encodes co-occurrence relationships between terms in the training corpus, and storing said set of term vectors in the storage unit;

d) computing, by means of the term vectors of step c and the operation on said second body of records, a set of normalized summary vectors for the records in said second body of records, and storing said set of summary vectors in the storage unit;

e) computing by the operation on the summary vectors of step d and the term vector of said at least one chosen term as computed in step c, a measure of the relative amount of overlap between said term vector of said chosen term with each of the summary vectors of the records in said second body of records, and storing the results in the storage unit;

f) computing from the vector overlap results of step e, an ordered list of the vector overlap measures computed in step e, said ordered list arranged according the relative amount of vector overlap; and g) displaying an ordered output list of records from said second body of records, said output list corresponding to the ordered list computed in step f, wherein said output list contains only records from said second body of records.

26. The method according to claim 25 wherein said second body of records is devoid of records containing said at least one chosen term or synonyms of said chosen term.

27. In a computer having a storage unit and a processing unit, a computer implemented method suitable for selectively retrieving records which contain information relative to at least one chosen term said method comprising:

a) inputting to the computer storage unit by means of an input device a training corpus consisting of a plurality of records wherein a majority of said records in said training corpus contain said at least one chosen term, and wherein each of said records in said training corpus further contains a plurality of other terms;

b) inputting to the computer storage unit by means of an input device a second body of records consisting of a plurality of records wherein said second body of records is devoid of records containing said chosen term or synonyms of said chosen term;

c) processing by means of the processing unit the records in said training corpus in order to compute a body of term vectors in a single multi-dimensional vector space for at least a portion of the terms in said training corpus, wherein said portion of terms processed includes and is greater than said chosen term, and wherein the relative orientation of the term vectors in said body of term vectors encodes co-occurrence relationships between terms in the training corpus, and storing said set of term vectors in the storage unit;

d) computing, by means of the term vectors of step c and the processing unit operating on said second body of records, a set of normalized summary vectors for the records in said second body of records, and storing said set of summary vectors in the storage unit;

e) computing by means of the processing unit operating on the summary vectors of step d and the term vector of said at least one chosen term as computed in step c, a measure of the relative amount of overlap between said term vector of said chosen term with each of the summary vectors of the records in said second body of records, and storing the results in the storage unit;

f) computing by means of the processing unit operating on the vector overlap results of step e an ordered list of the vector overlap measures computed in step e, said ordered list arranged according the relative amount of vector overlap; and g) displaying by means of an output device an ordered list of records from said second body of records, said output list corresponding to the ordered list computed in step f, wherein said output list contains only records from said second body of records.

28. The method according to either of claims 25, 26, or 27 wherein the amount of overlap between two vectors is determined by computation of the dot product between the two vectors.

29. The method according to claim 28 wherein the training corpus constructed according to any one consistent method of sampling is such that the dot product of the term vector of said chosen term with the term vector of any other term in said training corpus does not change by more than about 15% if the size of the training corpus in bytes is doubled using the same method of sampling, and wherein said other term appears in a majority of the records in said training corpus, and is included among the portion of terms for which term vectors have been computed.

30. The method of claim 29 wherein said dot products of term vectors in the training corpus do not change by more than about 5%.

31. The method according to either of claims 25, 26 or 27 wherein the semantic distance between said training corpus and said second body of records is greater than the sum of the respective average distances between the positions of centroids of each body of records and the positions of the individual records within each body of records, as measured in a common semantic space and wherein said average distances are determined for each body of records by summing the absolute values of the Euclidean distances in the common semantic space between the respective centroid positions and the positions of all the records in the respective body of records and then dividing the total by the number records in the respective body of records; and wherein the semantic distance between the two bodies of records is the Euclidean distance between the positions of their respective centroids in the common semantic space; and wherein the common semantic space is a multi-dimensional vector space in which each record in the mixed corpus of records, said mixed corpus consisting of all records from said training corpus plus all records from said second body of records, is assigned a unique position based on its content;

and wherein the position of each record in the common semantic space is determined by computation of term vectors from said mixed corpus and computation of a summary vector for each record in the mixed corpus by summing all said term vectors for the terms in each record and normalizing, said term vectors as obtained from the mixed corpus;

and wherein said summary vectors derived from said mixed corpus are such that for any subset of summary vectors corresponding to a subset of records from the mixed corpus there is a single logical relative orientation of the summary vectors that defines the relative meaning of the records in said mixed domain corpus.

32. The method according to claim 28 wherein the semantic distance between said training corpus and said second body of records is greater than the sum of the respective average distances between the positions of centroids of each body of records and the positions of the individual records within each body of records, as measured in a common semantic space and wherein said average distances are determined for each body of records by summing the absolute values of the Euclidean distances in the common semantic space between the respective centroid positions and the positions of all the records in the respective body of records and then dividing the total by the number records in the respective body of records; and wherein the semantic distance between the two bodies of records is the Euclidean distance between the positions of their respective centroids in the common semantic space; and wherein the common semantic space is a multi-dimensional vector space in which each record in the mixed corpus of records, said mixed corpus consisting of all records from said training corpus plus all records from said second body of records, is assigned a unique position based on its content;

and wherein the position of each record in the common semantic space is determined by computation of term vectors from said mixed corpus and computation of a summary vector for each record in the mixed corpus by summing all said term vectors for the terms in each record and normalizing, said term vectors as obtained from the mixed corpus;

and wherein said summary vectors derived from said mixed corpus are such that for any subset of summary vectors corresponding to a subset of records from the mixed corpus there is a single logical relative orientation of the summary vectors that defines the relative meaning of the records in said mixed domain corpus.

33. A method comprising automated generation of an abstract representation of terms from a first knowledge domain, said representation encoding the co-occurrence relationships between terms characteristic of said first domain; storing said representation in the storage unit of the computer; receiving at least one chosen term from said first domain; and applying said abstract representation of term co-occurrence relationships to facilitate the selective automated discovery of one or more objects, different from but analogous to said at least one chosen term, in one or more knowledge domains semantically distant from the first, wherein said abstract representation of terms from said first knowledge domain is a set of term vectors in a single multi-dimensional vector space, said set of term vectors generated from a well defined body of records representing said first domain, and wherein the relative orientations of said term vectors in said multi-dimensional vector space collectively encode the term co-occurrence relationships characteristic of said first domain.

34. The method according to claim 33 wherein all said knowledge domains are represented by separate bodies of records stored within the storage unit of the computer.

35. The method according to claim 34 wherein said chosen terms from said first domain are absent from, and have no synonymous terms in, any of the records in said stored bodies of records representing said semantically distant domains.

36. The method according to claim 35 wherein said multi-dimensional vector space has from about 100 to about 1000 dimensions, and each term vector therein contained has a component in each of said dimensions.

37. The method according to claim 36 wherein all the term vectors, in said set of term vectors collectively encoding the term co-occurrence relationships characteristic of said first domain, are of a fixed and equal length.

38. The method according to claim 37 wherein all records are ASCII text documents written in a single human language and all terms are words, word stems, or exact phrases in said human language.

39. The method according to claim 35 wherein said chosen terms from said first domain are unique to said first domain and all said chosen terms individually occur in a majority of the records in said well defined body of records representing said first domain.

* * * * *